United States Patent
Suzuki et al.

(10) Patent No.: US 10,245,515 B2
(45) Date of Patent: Apr. 2, 2019

(54) GAME MANAGEMENT DEVICE, GAME SYSTEM, AND COMPUTER-READABLE STORAGE MEDIUM HAVING PROGRAM RECORDED THEREON

(71) Applicant: KONAMI DIGITAL ENTERTAINMENT CO., LTD., Tokyo (JP)

(72) Inventors: Masayoshi Suzuki, Tokyo (JP); Nobuya Kitamura, Tokyo (JP); Hiroyuki Tomita, Tokyo (JP); Takehiro Tsutsumi, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 925 days.

(21) Appl. No.: 14/499,627

(22) Filed: Sep. 29, 2014

(65) Prior Publication Data

US 2015/0018091 A1 Jan. 15, 2015

Related U.S. Application Data

(63) Continuation of application No. PCT/JP2012/079607, filed on Nov. 15, 2012.

(30) Foreign Application Priority Data

Mar. 30, 2012 (JP) .................................. 2012-078619

(51) Int. Cl.
  *A63F 13/85* (2014.01)
(52) U.S. Cl.
  CPC ........ *A63F 13/85* (2014.09); *A63F 2300/406* (2013.01)

(58) Field of Classification Search
  CPC ....................................................... A63F 13/85
  See application file for complete search history.

(56) References Cited

U.S. PATENT DOCUMENTS

2001/0016516 A1  8/2001  Takatsuka et al.
2003/0008714 A1  1/2003  Tajiri et al.
(Continued)

FOREIGN PATENT DOCUMENTS

JP  2001-129240 A  5/2001
JP  2001-300144 A  10/2001
(Continued)

OTHER PUBLICATIONS

"Dragon Collection", Dengeki Game Appli, Dec. 14, 2011, pp. 6-13, vol. 15, No. 2, Whole No. 187, cited in the ISR.
(Continued)

*Primary Examiner* — Corbett B Coburn
(74) *Attorney, Agent, or Firm* — Westerman, Hattori, Daniels & Adrian, LLP

(57) ABSTRACT

A game management device includes a game information storage control unit for storing in a storage device, an each user's game information, the game information storage control unit including an owned object information storage control unit for storing in a storage device, an object owned by each user; a priority setting unit for setting a priority for an object owned by a first user according to a first user's gift destination selecting operation of selecting a second user as a gift destination, the priority setting unit setting the priority based on a second user's game information for recommending the object owned by the first user for a gift to the second user; and a priority notification unit for transmitting to a terminal device of the first user, an information for notifying the priority set for the object owned by the first user.

10 Claims, 31 Drawing Sheets

(56) References Cited

U.S. PATENT DOCUMENTS

| | | | |
|---|---|---|---|
| 2008/0147625 A1* | 6/2008 | Altounian | G06Q 10/087 |
| 2009/0100076 A1* | 4/2009 | Hamilton, II | G06Q 30/02 |
| 2011/0124415 A1 | 5/2011 | Shimono | |
| 2011/0251925 A1* | 10/2011 | Savilia | G06Q 30/06 |
| | | | 705/27.1 |
| 2012/0015733 A1* | 1/2012 | Carroll | A63F 13/798 |
| | | | 463/40 |
| 2012/0178515 A1* | 7/2012 | Adams | G07F 17/3295 |
| | | | 463/17 |
| 2013/0226731 A1* | 8/2013 | MacNeille | G06Q 10/00 |
| | | | 705/26.8 |
| 2014/0004955 A1* | 1/2014 | Nahari | A63F 13/12 |
| | | | 463/42 |
| 2016/0026736 A1* | 1/2016 | Natarajan | G06F 17/30997 |
| | | | 707/694 |
| 2016/0117754 A1* | 4/2016 | DeStefano | G06Q 30/0633 |
| | | | 705/26.8 |
| 2017/0148046 A1* | 5/2017 | Akbarpour Mashadi | |
| | | | G06Q 30/0239 |

FOREIGN PATENT DOCUMENTS

| | | |
|---|---|---|
| JP | 2003-340143 A | 12/2003 |
| JP | 2011-110139 A | 6/2011 |

OTHER PUBLICATIONS

International Search Report dated Feb. 12, 2013, issued in corresponding application No. PCT/JP2012/079607.

* cited by examiner

FIG. 7

| USER ID | 000001 | | | |
|---|---|---|---|---|
| USER INFO. | LOG-IN ID | PASSWORD | USER NAME | TEAM NAME |
| | x x x x | x x x x | x x x x | x x x x |
| LEVEL INFO. | Lv. 115 | | | |
| PL. CARD | PLAYER CARD ID | CAPABILITY 1 | CAPABILITY 2 | CAPABILITY 3 | FIRST-STRING PLAYER FLAG |
| | 0001 | 350 | 410 | 315 | 1 |
| | 0005 | 180 | 230 | 210 | 0 |
| | ⋮ | | | | |
| POINT | EMPIRICAL VALUE | ACTION POINT | OPERATING COST | REIN-FORCEMENT POINT | COMMUNI-CATION POINT |
| | 150 | 100 | 120 | 3000 | 2000 |
| COIN | 2000 | | | | |
| ITEM | RECOVERY ITEMS | PUZZLE CARD PIECES | | | | | FAKE CARDS |
| | | P1 | P2 | P3 | P4 | P5 | P6 | |
| | 10 | 2 | 1 | 0 | 1 | 0 | 0 | 5 |
| WISH OBJECT | CARD ID | ITEM ID |
| | 0100 | 0008 |
| | ⋮ | ⋮ |
| USER'S WISH ATTRIBUTE | TEAM 1 |

F I G. 1 2

| FELLOW USER INFO.ID | USER ID REQUESTING FELLOW USER | APPROVED USER ID |
|---|---|---|
| 1 | 000001 | 000002 |
| 2 | 000001 | 000005 |
| 3 | 000001 | 000035 |
| 4 | 000002 | 000032 |
| 5 | 000002 | 000038 |
| 6 | 000012 | 000001 |
| ⋮ | ⋮ | ⋮ |

FIG. 21

| GAME HISTORY | | | | | |
|---|---|---|---|---|---|
| USER ID | | | 000002 | | |
| HISTORY ID | OBTAINED CARD | USED CARD | DELETED DARD | GAME MODE | TIME |
| 1 | 0010 | | | LOTTERY | 2012/1/10 8:30 |
| 2 | 0038 | | | GIFT | 2012/1/10 8:40 |
| 3 | | 0007 0010 | 0010 | REIN-FORCEMENT | 2012/1/11 7:35 |
| 4 | 0145 | | | LOTTERY | 2012/1/11 18:45 |
| 5 | | | 0145 | SELL | 2012/1/11 18:46 |
| 6 | 0158 | | | LOTTERY | 2012/1/12 8:10 |
| 7 | | 0007 0158 | 0158 | REIN-FORCEMENT | 2012/1/12 8:11 |
| 8 | 0187 | | | LOTTERY | 2012/1/13 12:15 |
| 9 | | | 0187 | GIFT | 2012/1/13 12:15 |
| ⋮ | ⋮ | | ⋮ | | ⋮ |

FIG. 28

═PRIORITY SETTING═

WHEN YOU WISH TO GIVE A GIFT, YOU WILL BE NOTIFIED PRIORITIES SET TO YOUR PLAYER CARDS.

LET'S GIVE PLAYER CARD EXPECTED TO BE WISHED BY GIFT DESTINATION (G/D) REFERRING TO PRIORITY DISPLAYED IN GIFT SELECTION SCREEN.

SEE THE FOLLOWING CRITERIA FOR SETTING PRIORITY.
( PARTIALLY CHANGEABLE )

H ↑

- PLAYER CARD WISHED BY G/D

- PLAYER CARD NOT OWNED BY G/D
    PLEASE SELECT EITHER ONE !

111 — ● PRIORITY BASED ON G/D GAME HITORY
    1. USED FOR REINFORCEMENT IN THE PAST
    2. NOT EVER OBTAINED
    3. NOT EVER USED FOR REINFORCEMENT

112 — ○ PRIORITY BASED ON RARITY IN THE ORDER FROM THE HIGHEST RARITY

↓ L

- PLAYER CARDS OWNED BY G/D
    PLEASE SELECT EITHER ONE !

113 — ○ DISPLAY IN GIFT SELECTION SCREEN
114 — ● NOT DISPLAY IN GIFT SELECTION SCREEN

GAME MANAGEMENT DEVICE, GAME SYSTEM, AND COMPUTER-READABLE STORAGE MEDIUM HAVING PROGRAM RECORDED THEREON

TECHNICAL FIELD

This application is based on Japanese Patent Application Serial No. 2012-078619, filed in the Japan Patent Office on Mar. 30, 2012, the contents of which are hereby incorporated by reference.

The present invention relates to a game management device, a game system, and a computer-readable recording medium having recorded thereon program, which manage game information for each user.

BACKGROUND ART

Traditionally, known is a game system which allows a user to receive various game services provided by a game server by connecting that user's terminal device (personal computer, portable phone terminal or the like) to the game server installed online.

Conventionally, a game system where users playing a common game via the internet can send a gift such as an item or the like from one user to the other user has been proposed. (refer to Japanese Laid-open Patent Publication No. 2001-129240, and Japanese Laid-open Patent Publication No. 2011-110139).

Meanwhile, in recent years, a so-called social game that is provided as one type of social networking service (SNS) by incorporating the foregoing game system into a community-type SNS service for promoting and supporting the relationships among people is gaining popularity. In this kind of social game, each user establishes a fellow user's relationship with another user, and exchanges gifts between them, or the like, thereby allowing the users to communicate with one another.

In a conventional game system, in a case where a user gives a gift to a fellow user, the user cannot grasp what are owned by the fellow user. Therefore, though the user gives a gift, the fellow user may already have the same item as the gift, and therefore the fellow user who received the gift may not be pleased with the gift. Namely, it is possible that the user may give a gift which the follower user does not wish to have (will not be pleased by receiving the gift).

However, it is not realistic to confirm to the user of gift designation deliberately whether the item or the like which the user of gift source is going to give is what the user of gift designation wishes. Particularly, for such games to be performed with simple operations, such as social games, demanded is a game environment in which the user of gift source can recognize what gift to be sent to make the user of gift destination be pleased without requiring a complex operation.

SUMMARY OF THE INVENTION

An object of this invention is to provide a game management device, a game system, and a computer-readable storage medium having a program recorded thereon that can provide a user who is going to give an item or the like owned by the user, with such a desirable game environment that the user can recognize with ease if the item or the like is what the user of gift destination is likely to wish (or what the user of the gift destination is not likely to wish).

A game management device according to one aspect of the present invention is a game management device for managing a game, which communicates with a terminal device, and which permits a user to give an object owned by the user in the game to other user, the game management device comprising: a game information storage control unit for storing in a storage device, an each user's information, the game information storage control unit including an owned object information storage control unit for storing in a storage device, an object owned by each user; a priority setting unit for setting a priority for an object owned by a first user according to a first user's gift destination selecting operation of selecting a second user as a gift destination, the priority setting unit setting the priority based on a second user's game information for recommending the object owned by the first user for a gift to the second user; and a priority notification unit for transmitting to the terminal device of the first user, an information for notifying the priority set for the object owned by the first user.

A game system according to another aspect of the present invention is a game system which includes a game management device for managing a game, which permits a user to give an object owned by the user in a game to other user, and a terminal device for communicating with the game management device, wherein either the game management device or the terminal device comprises: a game information storage control unit for storing in a storage device, an each user's information, the game information storage control unit including an owned object information storage control unit for storing in a storage device, an object owned by each user; a priority setting unit for setting a priority for an object owned by a first user according to a first user's gift destination selecting operation of selecting a second user as a gift destination, the priority setting unit setting the priority based on a second user's game information for recommending the object owned by the first user for a gift to the second user; and a priority notification unit for transmitting to the terminal device of the first user, an information for notifying the priority set for the object owned by the first user.

The game management device and the game system according to the present invention can also be realized by a computer, in that case, by causing the computer to function as the foregoing respective units, a program and a computer-readable storage medium having recorded thereon the program, that enable the foregoing game management device and the game system by means of a computer would fall under the scope of the present invention.

The object, characteristics and advantages of the present invention become more evident by the detailed explanation and the attached diagrams below.

BRIEF DESCRIPTION OF THE DRAWINGS

FIG. 7 is an explanatory diagram showing an example of game information;

FIG. 12 is an explanatory diagram showing an example of the fellow user's information;

FIG. 21 is an explanatory diagram showing an example of game history;

FIG. 28 is a flowchart showing another example of the priority setting processing;

BEST MODE FOR CARRYING OUT THE INVENTION

In the following, a game management device, a game system, and a computer-readable recording medium having recorded thereon program, according to one embodiment of the present invention are described with reference to the accompanying drawings.

[Outline of Game System]

Figure 1:
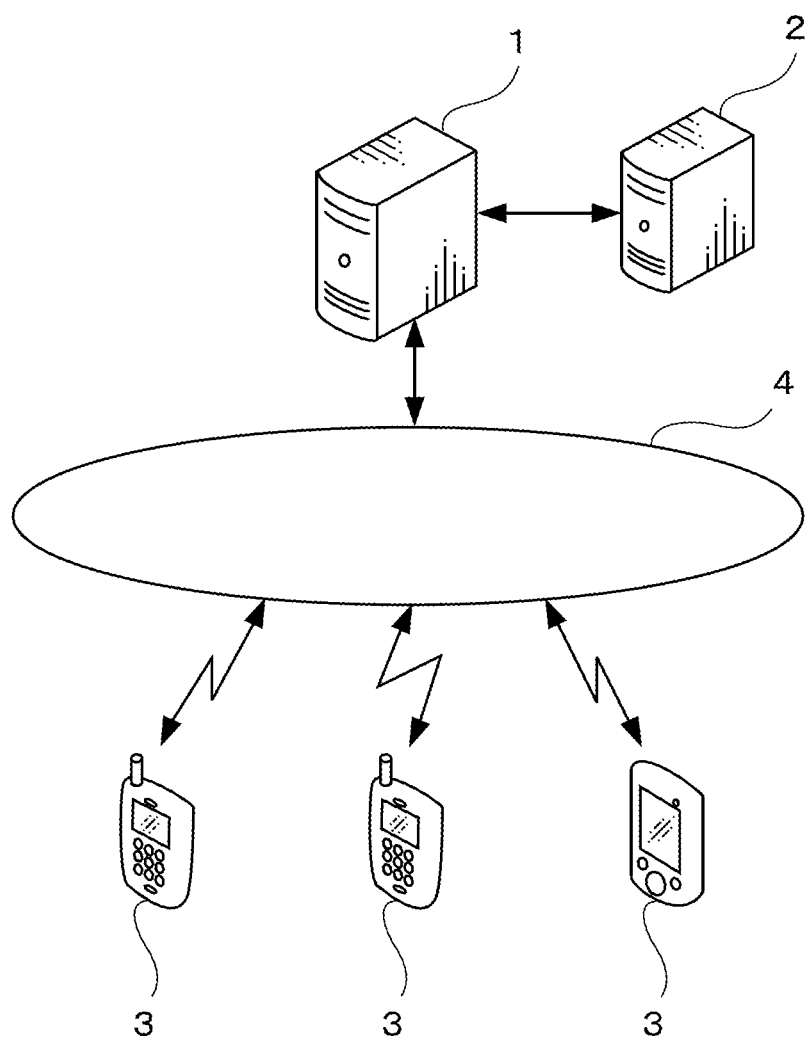
FIG. 1 is an explanatory diagram showing a configuration example of the game system according to an embodiment of the present invention.

A configuration example of the game system comprising the game management device according to an embodiment of the present invention is shown in FIG. 1. As shown in the diagram, this game system is configured from a game server 1 disposed on a network 4 such as the internet, a database server 2 communicably connected to the game server 1, and a terminal device 3 of each game user that can be communicably connected to the game server 1 via the network 4.

The network 4 of this embodiment is not limited to the internet, and may also be, for instance, a dedicated line, a public line (phone line, mobile communication line or the like), wired LAN (Local Region Network), wireless LAN or the like so as long as the game server 1 and the terminal device 3 of each game user can be connected to each other communicably, or the network may be a combination of these with the internet.

In the example of this game system, the game management device according to an embodiment of the present invention is configured from the game server 1 and the database server 2. The game server 1 receives, via the network 4, the access from the terminal device 3 of each game user to receive the game service, accumulates and manages the game information of each game user in the database server 2 (storage device), and provides the game service to each game user via the network 4.

In this embodiment, as one mode of the provision of the game service by the game server 1, explained is a case of providing a so-called browser game in which the game can be played using the web browser loaded in the terminal device 3 of each game user. In the service mode of providing this browser game, there is no need to download or install game-dedicated software to the terminal device 3 of the game user, and, so as long as the environment enables the terminal device 3 to be connected to the network 4, the game user can casually enjoy the game service provided by the game server 1 anywhere.

With this game system, a browser game program (application software) is loaded in the game server 1, and the game server 1 executes arithmetic processing and data processing for advancing the game according to the input operation in the terminal device 3 of each game user. In addition, the game server 1 updates the game information of each user in the database server 2 on the basis of the execution result of the arithmetic processing and the like, and sends the web page information (game screen data) to the terminal device 3 of each game user for displaying the execution result on the screen of the terminal device 3 of the game user.

Moreover, the game provided by this embodiment has factors of a so-called social game that can be played by a game user while communicating with another game user who is also receiving the game service. For instance, by incorporating the game server 1 and the database server 2 of this embodiment into a system of a social networking service (SNS), it is possible to configure a game system that provides a social game service as one of the SNS services. While it is also possible to provide the game user with a game service on the basis of a game system that runs on an SNS platform as described above, it is also possible to create an independent game system without incorporating the game server 1 and the database server 2 into the SNS system.

In this game system, each user can create a special relationship of becoming a "fellow user" with one or more other users who are receiving the game service. As one mode for a certain user to become a fellow member with another user, considered may be a fellow user request/approval operation performed between the users where one user sends a fellow user request to the other user via the game server 1, and the user who received the fellow user request approving such request to become a fellow member via the game server 1.

Each user can enjoy various kinds of exchanges with other users (fellow users or other users than the fellow users) such as exchanging gifts in the game. Then, when the first user is going to give a gift to the second user, the game server 1 according to the present embodiment sets priorities for the items or the like owned by the first user for making a recommendation of a gift to the second user, and notifies the priority to the terminal device 3 of the first user. This priority is set by surmising an object which is likely to be wished by the second user in such a manner that the more the object is likely to be wished by the second user, the higher the priority set to the object is. With the foregoing characteristic configuration of the present embodiment, it is possible for the first user to recognize with ease if an item or the like is likely to be wished (or not likely to be wished) by the user of gift destination by taking the notified priority into consideration. In the following, explained is the detailed configuration of the game management device (the game server 1, etc.) according to the present embodiment, which has the function of informing priorities set to objects.

Furthermore, all the users can be both a gift sender and a gift receiver. However, in the following explanations, the gift sender is referred to as a first user, and the gift receiver is referred as a second user to conceptually distinguish the gift sender and the gift receiver. Furthermore, for the users having specific user IDs, given is a reference numeral for identifying each user such as a user A, a user B, or the like.

[Configuration of Game Management Device]

Figure 2:
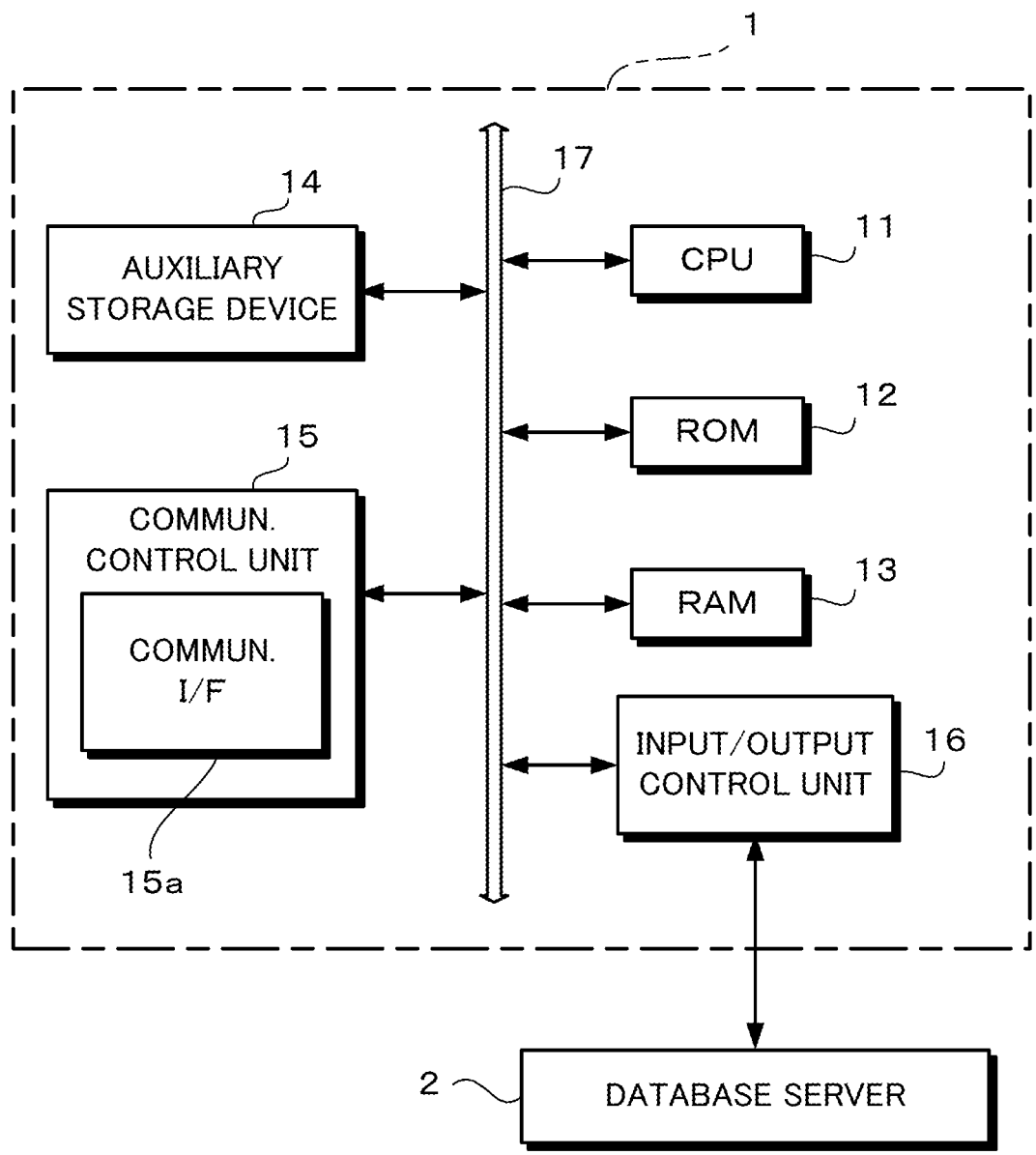
FIG. 2 is a block diagram showing an example of the hardware configuration of the game management device.

As described above, in this embodiment, the game management device is configured from the game server 1 and the database server 2. FIG. 2 shows an example of the hardware configuration of the game server 1. As shown in the diagram, the game server 1 mainly comprises a CPU (Central Processing Unit) 11, a ROM (Read Only Memory) 12 and a RAM (Random Access Memory) 13 as the main storage devices, an auxiliary storage device 14, a communication control unit 15, and an I/O control unit 16, and these components are mutually connected via a bus line 17 including an address bus, a data bus, a control bus and the like. Note that an interface circuit is interposed between the bus line 17 and the respective constituent elements as needed, but the illustration of such interface circuits is omitted in the drawing.

The CPU 11 interprets and executes commands of application software such as system software and game programs, and controls the overall game server 1. The ROM 12 stores programs and the like required for the basic operational control of the game management device 1. Moreover, the RAM 13 stores various programs and data, and ensures the work area for the CPU 11.

The auxiliary storage device 14 is a storage device for storing application software such as game programs and various types of data. As the auxiliary storage device 14, for instance, a hard disk drive or the like may be used. The program of this embodiment for causing the game server 1 (computer) to operate as the game management device is also stored in the auxiliary storage device 14, and the program is loaded from the auxiliary storage device 14 to the RAM 13 via the bus line 17 upon starting the game server 1, and executed by the CPU 11.

The communication control unit 15 comprises a communication interface 15a that is connected to the network 4, and controls the communication with the terminal device 3 of each user via the network 4. Moreover, the communication control unit 15 also controls the communication with a server (not shown) that is connected to the network 4. For instance, in the case of a system configuration where the game server 1 is incorporated into SNS, the communication control unit 15 of the game server 1 controls the communication with the SNS server (not shown) via the network 4.

The I/O control unit 16 is communicably connected to the database server 2, and is a database interface for controlling the I/O when the CPU 11 executes the reading and writing of data (records) from and to the database server 2.

The database server 2 comprises, as the storage device having a region for storing the game information of each user managed by the game server 1, for example, a large-capacity hard disk device of a RAID (Redundant Arrays of Inexpensive Disks) configuration. The database server 2 can be configured as a relational database, an object database, an object relationship database or the like which associates identifying information (user ID) for uniquely identifying each user and various game information of each user (user name, level, game points, owned item and so on), and stores the association.

In this embodiment, a case where the game management device is configured from the game server 1 and the database server 2 is explained, but the configuration is not limited thereto. For example, the game management device may be configured only with the game server 1 by causing the game server 1 to comprise the function of the database server 2. Moreover, the respective functions of the game server 1 may be distributed to a plurality of servers, and configure the game server 1 as a plurality of servers. For example, an authentication server with an authentication function of determining, when a user operates the terminal device 3 and accesses the game server 1, whether that user is an official user may be provided separately from the main server of the game server 1, and configure the game server 1 with the main server and the authentication server. As another configuration example, a billing management server for performing billing management when a user purchases a charged item within the game may be provided separately from the main server of the game server 1, and configure the game server 1 with the main server, the authentication server and the billing management server.

Moreover, if the number of users that use this game service becomes over hundred thousand or million or even more, the creation of a server system capable of withstanding enormous access from the terminal devices 3 of numerous users will be required. Thus, a load-balancing system configuration may be adopted by providing a plurality of game servers 1 on the network 4 to achieve redundancy (multiplexing). In the foregoing case, it is desirable to provide a load balancer for adjusting the load among a plurality of game servers 1.

The configuration of the user's terminal device 3 which accesses the game server 1 according to this embodiment and receives the provision of the game service is now explained.

[Configuration of Terminal Device]

As the terminal device 3 to be operated by the game user, various terminals including the foregoing portable terminal comprising the web site browsing function may be used, and in this embodiment a portable terminal is taken as an example and the configuration thereof is explained. Note that, with the terminal devices 3 other than a portable terminal, the basic configuration required for playing the game, such as the input operation for displaying the game screen or executing the game by using the web site browsing function is the same as the configuration of a portable terminal.

Figure 3:
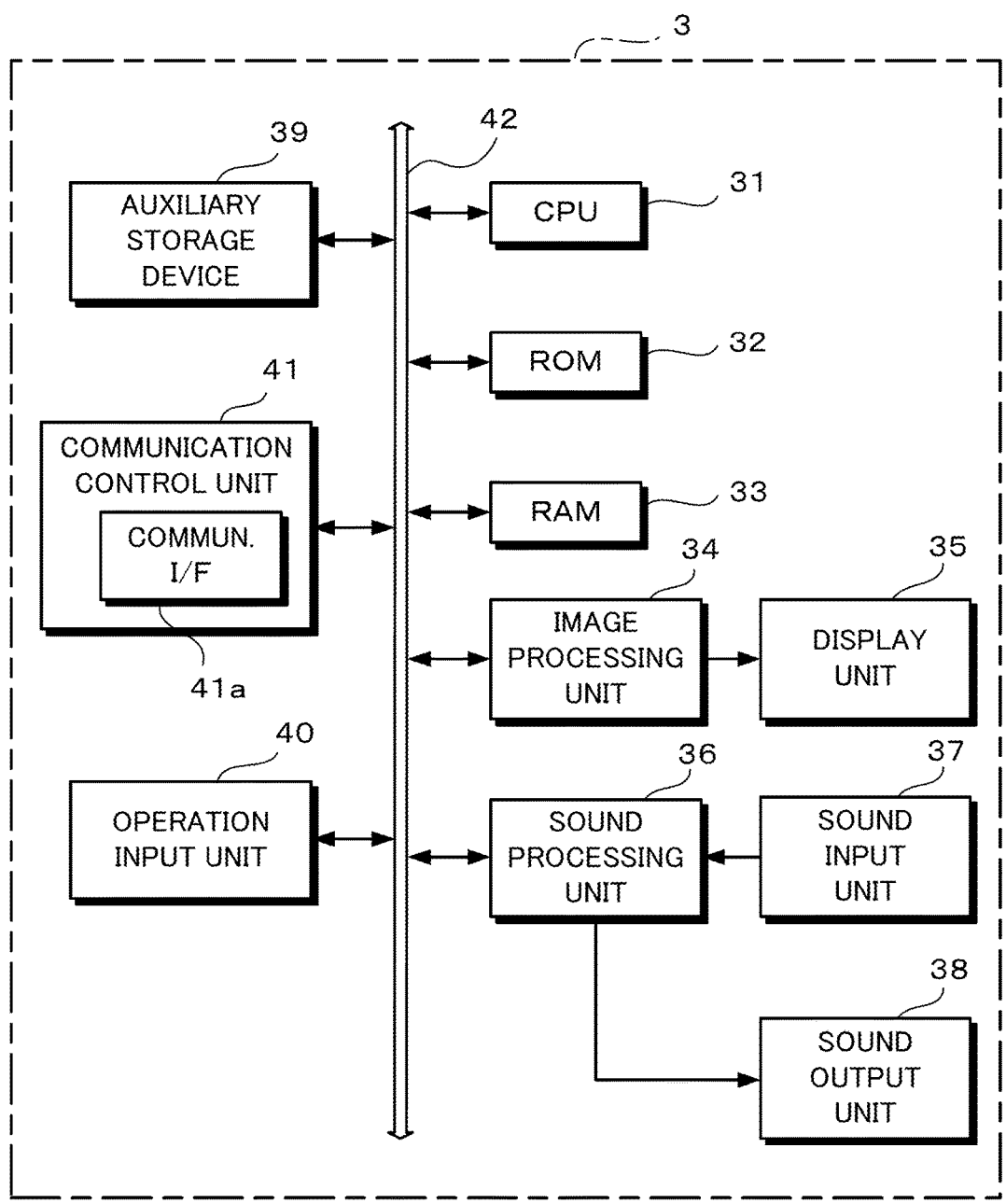
FIG. 3 is a block diagram showing an example of the hardware configuration of the terminal device.

A portable terminal comprising the web site browsing function is referred to as a feature phone or a smartphone, and FIG. 3 shows a configuration example thereof. As shown in the diagram, the terminal device 3 mainly comprises a CPU 31, a ROM 32 and a RAM 33 as the main storage devices, an image processing unit 34, a display unit 35, a sound processing unit 36, a sound input unit 37, a sound output unit 38, an auxiliary storage device 39, an operation input unit 40, and a communication control unit 41, and the constituent elements 31 to 34, 36 and 39 to 41 are mutually connected via bus line 42. Note that an interface circuit is interposed between the bus line 42 and the respective constituent elements as needed, but the illustration of such interface circuits is omitted in the drawing.

The CPU 31 interprets and executes commands of various programs including the web browser, and controls the overall terminal device 3. The ROM 32 stores programs and the like required for the basic operational control of the terminal device 3. Moreover, the RAM 33 stores various programs and data that are loaded from the ROM 32 or the auxiliary storage device 39, and ensures the work area for the CPU 31. The web browser that displays game screen data described in HTML or the like is stored in the ROM 32 or the auxiliary storage device 39, and loaded into the RAM 33 and then executed by the CPU 31. Moreover, various types of plug-in software for expanding the browser function of the web browser may also be stored in the ROM 32 or the auxiliary storage device 39 together with the web browser.

The image processing unit 34 drives the display unit 35 based on the image display command from the CPU 31, and displays an image on the screen of the display unit 35. Applied as the display unit 35 may be various types of known display devices such as a liquid crystal display or an organic EL (Electro-Luminescence) display.

The sound processing unit 36 converts an analog voice signal into a digital voice signal when a voice is input from the sound input unit 37, and generates an analog voice signal based on pronunciation instructions from the CPU 31 and outputs the generated analog voice signal to the voice output unit 38. The voice input unit 37 is configured from a microphone built into the terminal device 3 and is used for phone communication or recording. The voice output unit 38 is configured from a phone receiver speaker during a phone communication or a speaker that outputs ring tones and sound effects during game execution.

The auxiliary storage device 39 is a device for storing various programs and data. As the auxiliary storage device 39, a flash memory drive or the like may be used an internal memory of the portable terminal, and a memory card reader/writer or the like may be used as an external memory of the portable terminal.

The operation input unit 40 is used for receiving the game user's operation input and outputting an input signal corresponding to the operation input to the CPU 31 via the bus line 42. As examples of the operation input unit 40, there are physical buttons such as a direction button, enter button, and a one-byte character input button provided to the body of the terminal device 3. Moreover, in cases of the terminal device 3 where the display unit 35 is configured as a so-called touch screen by mounting a touch panel (contact input-type interface) on the screen of the display unit 35, the foregoing touch panel also becomes the operation input unit 40.

The communication control unit 41 comprises a communication interface 41*a*, and has a communication control function for data communication during the game operation and the like, and a communication control function for sending and receiving voice data as a portable terminal. Here, the communication control function for data communication includes, for example, a wireless LAN connecting function, internet connecting function via a wireless LAN or portable phone line network, and a near-field wireless communication function using a predetermined frequency band (for example, a 2.4 GHz frequency band). The communication control unit 41 emits connection signals for connecting the terminal device to the wireless LAN or internet based on a command from the CPU 31, and receives information sent from the communication opponent side and supplies the received information to the CPU 31.

Note that the terminal device 3 may also be provided with a GPS (Global Positioning System) signal reception circuit, an imaging device (camera) such as a CCD (Charge Coupled Device) image sensor, or a triaxial acceleration sensor, and, for example, the GPS position information may be utilized in the game.

In the terminal device 3 configured as described above, the game user who wishes to receive a game service launches the web browser and accesses the game site managed by the game server 1. When this access is authenticated by the game server 1, the communication control unit 41 of the terminal device 3 receives game screen data described in HTML or the like which is sent from the game server 1, and the CPU 31 executes the web browser and displays the game screen on the display unit 35. Here, the game user operates the operation input unit 40 and selectively inputs the selectable button objects or hyperlinks displayed on the game screen. The game server 1 advances the game according to this selective input, and sends new game screen data to the terminal device 3. In addition, the new game screen is displayed on the display unit 35 of the terminal device 3, and, similar to the above, the game user can play the game provided by the game server 1 by selectively operating the button objects that are selectable on the game screen displayed on the display unit 35.

[Functional Configuration of Game Management Device]

Figure 4:
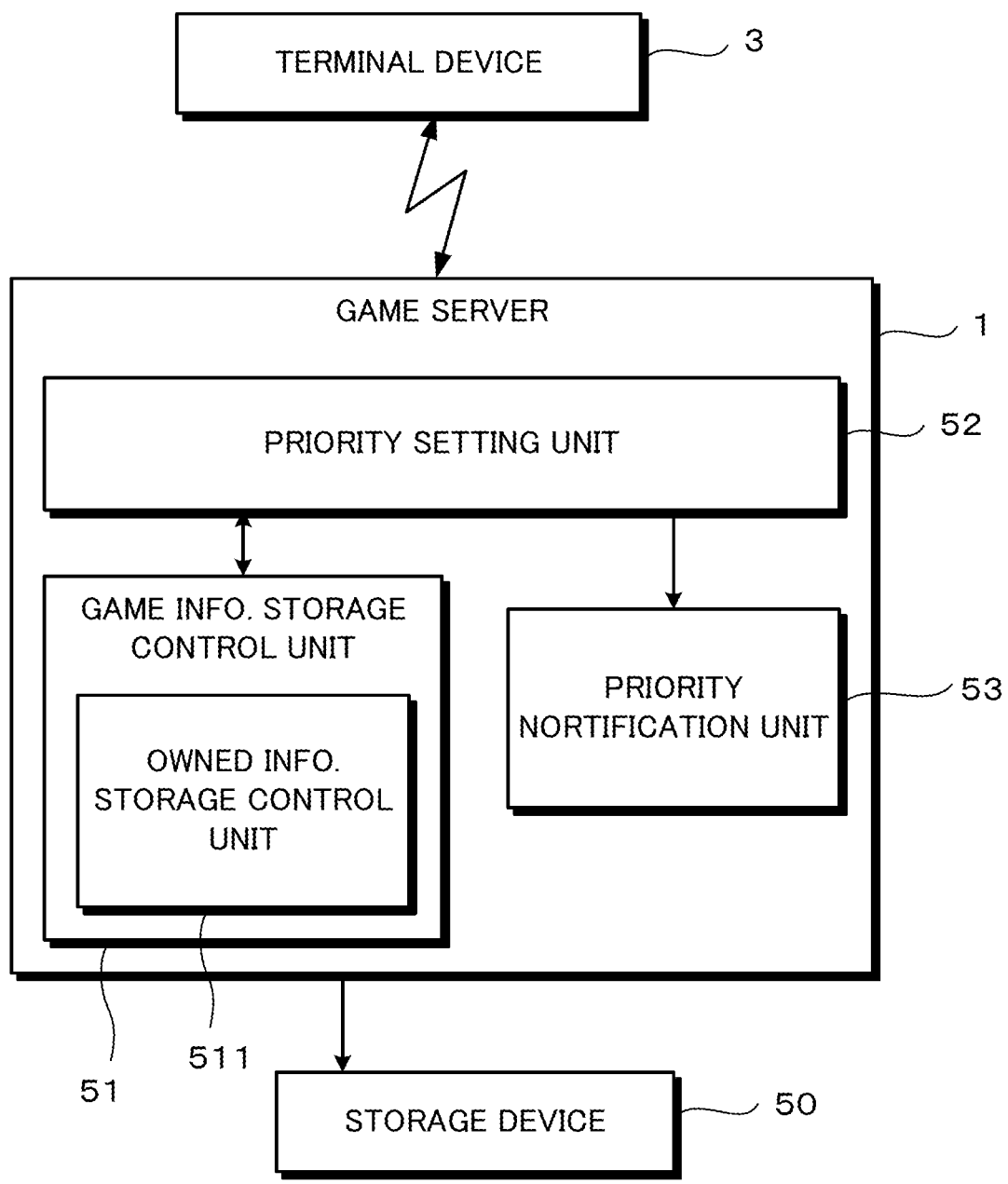
FIG. 4 is a functional block diagram showing an example of the functional configuration of the game management device.

The main functions of the game management device (game server 1 and database server 2) configured as described above are now explained. FIG. 4 is a main functional block diagram of the game management device.

The game management device mainly comprises a game information storage control unit 51, a priority setting unit 52 and a priority notification unit 53. These respective units 51 to 53 are realized by the CPU 11 of the game server 1 executing the programs according to this embodiment.

The game information storage control unit 51 has the function of storing each user's game information in the storage device 50 (the database server 2, etc.). For the storage device 50 itself, it may be provided irrespective of inside or outside the game management device (or the game system). For instance, the storage device 50 can be the RAM 13 or the auxiliary storage device 14 of the game server 1, or a file server or the like having other configuration from the game management device or the server device 3. The items of the game information stored in the storage device 50 and managed by the game information storage control unit 51 differ depending on the contents of the game service provided by the game server 1 to users.

As examples of games provided by this game server 1, considered may be various games such as a sports game based on various sports such as baseball, soccer, golf or the like, combat games based on battles, music simulation games, other various roll-playing games, training games, and simulation games, regardless of the game format and category. As one such example, in this embodiment, explained is a case of the game server 1.

Figure 5:
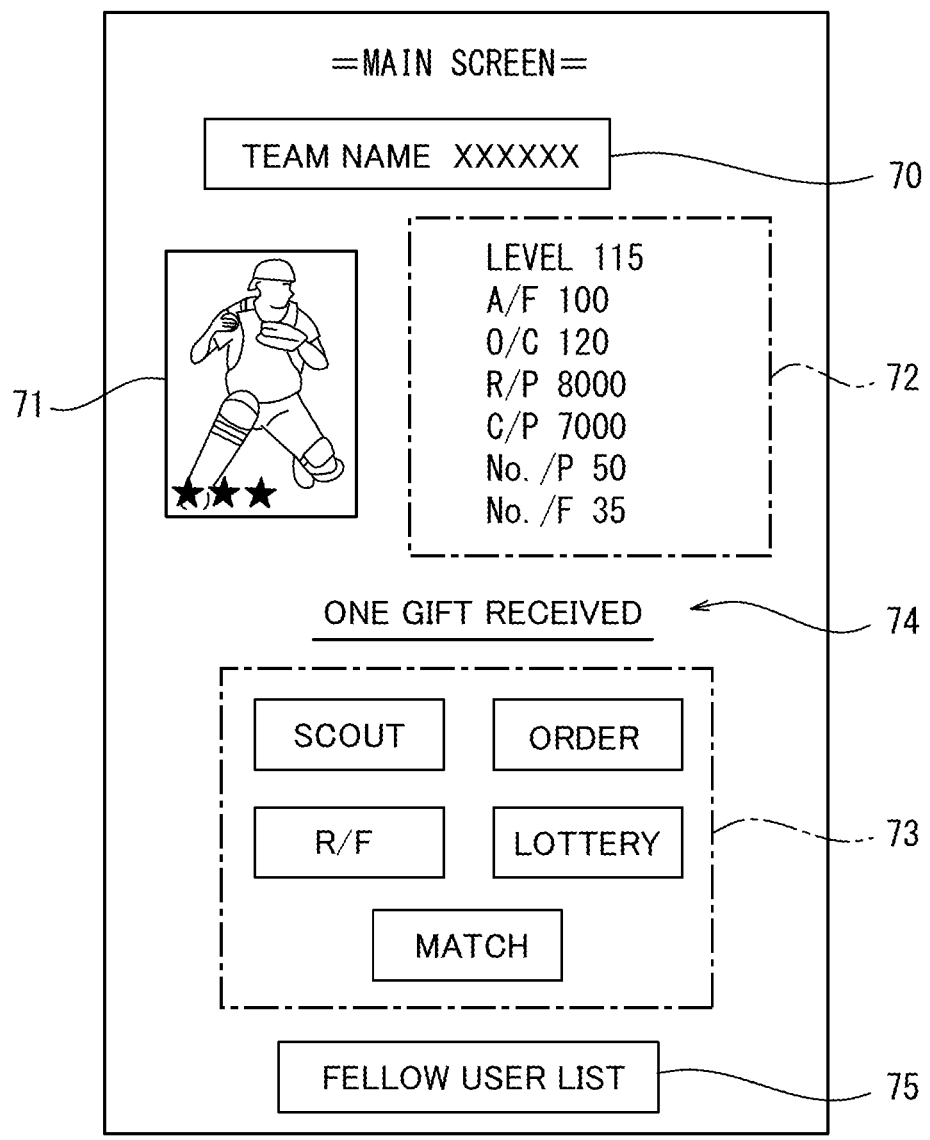
FIG. 5 is an explanatory diagram showing an example of the main screen.

In this embodiment, explained as an example is a baseball game where a user owns player characters in the game and can play a match (compete) with another user in the game by using one's player characters. The player characters owned by the user may be in a card format in which the mode of the player characters can be visually recognized on the screen of the terminal device 3. In other words, the player characters are managed as digital player cards by the game server 1, and displayed on the screen of the user's terminal device 3. FIG. 5 illustrates a player card 71 displayed on the screen of the user's terminal device 3, and this is displayed on the screen as a digital player card indicating the player character's mode and the card's rarity level. In the example of FIG. 5, the rarity level is shown by the number of stats visually and intelligibly (for instance, the higher the rarity level is, the larger the number of displayed stars is). The user can collect the player cards while advancing the game, form one's own original team, and play the game with another user and compete for ranking. Moreover, the user can improve the capability of the player card (player character) (that is, train the player) by synthesizing the collected player cards, and enjoy the game while aiming to create a stronger team.

Figure 6:
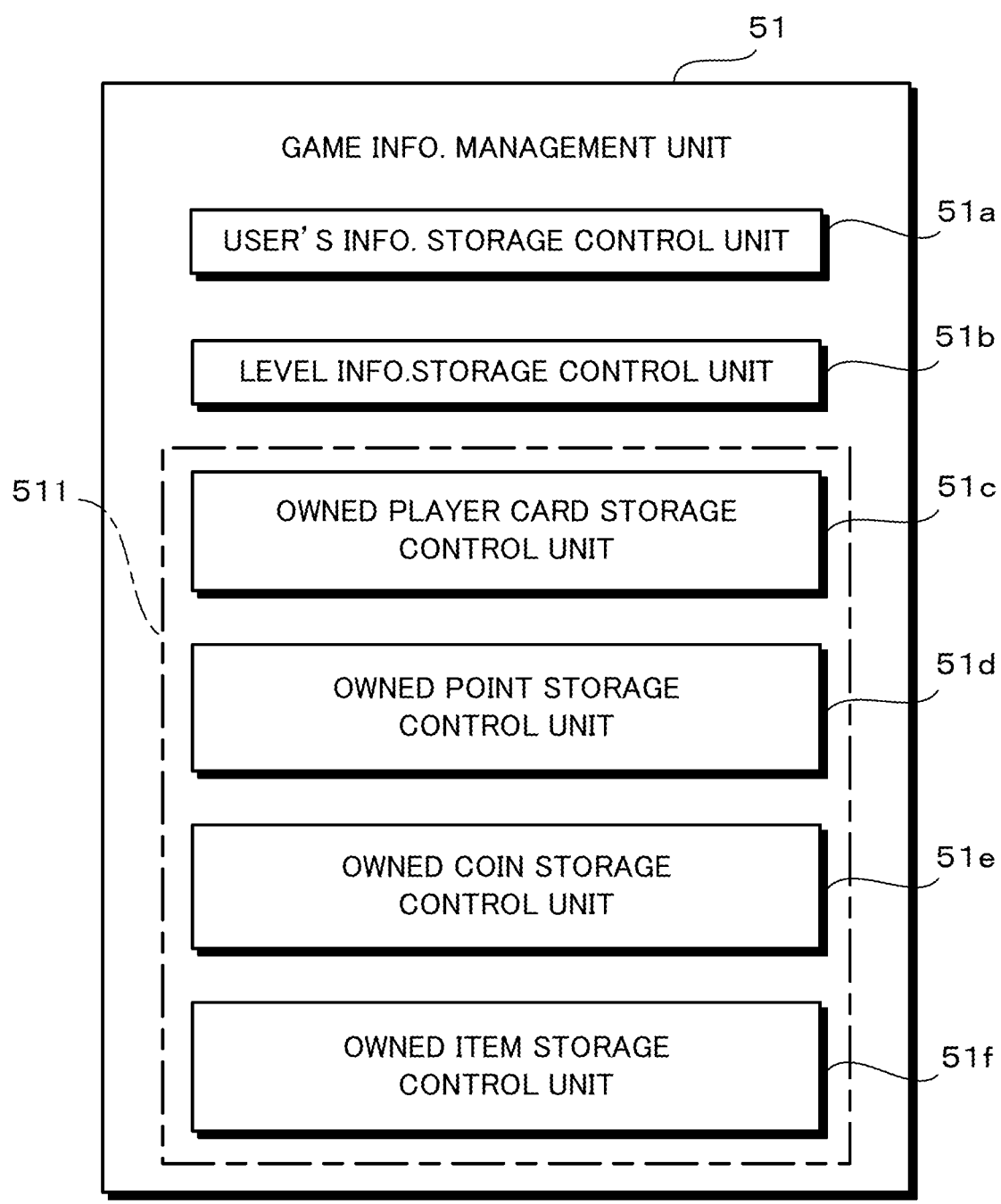
FIG. 6 is a functional block diagram showing an example of the functional configuration of the game information storage control unit.

In this kind of baseball game, the game information management units 51 which manages the game information on each user comprises an owned information storage control unit 11 for storing the information on items owned by each user in a storage device 50 (a database server 2, etc.), etc. FIG. 6 shows the detailed example configuration of the game information storage control unit 51. As shown in FIG. 6, the game information storage control unit 51 comprises a user's information storage control unit 51*a*, a level information storage control unit 51*b*, and the owned object information storage control unit 511 (an owned player card storage control unit 51*c*, an owned point storage control unit 51*d*, an owned coin storage control unit 51*e*, and an owned item storage control unit 510, etc. FIG. 7 shows an example of the game information of each user (in this example, game information of one user having a user ID="000001") that is stored and managed in the database server 2 by the respective storage control units 51*a* to 51*f* of the game information management unit 51.

The user's information storage control unit 51*a* associates the user's information related to each user such as the log-in ID, password, user name (nickname or the like used in the game), and team name with a user ID for uniquely identifying each user, and stores the association in a predetermined storage area of the database server 2 for each user ID. Here, the log-in ID and the password are used for the log-in authentication when each user operates the terminal device 3 and accesses the game server 1. The user name and the team name are arbitrary information that is independently set by the user upon the user registering as a member to receive the game service, or playing the game for the first time. The user name and the team name are displayed on the game screen as needed.

The level information storage control unit 51*b* associates level information such as the user level or affiliated league level with the user ID, and stores the association in a predetermined storage area of the database server 2 for each user ID. In this baseball game, for example, the empirical value is accumulated by the user advancing the game, and the user's level is enhanced when the empirical value reaches a specific amount.

The owned player card storage control unit 51*c* associates information of the player cards (characters) acquired and owned by the user in the game with the user ID, and stores the association in a predetermined storage area of the database server 2 for each user ID. As examples of player card information, there are identifying information (player card ID) for uniquely identifying the player cards, a capability value showing the capability level of the player, a first-string player flag and so on.

FIG. 7 shows an example of setting the player's capability value to three capability items (capability 1 to capability 3). As examples of capability items, when the player card is a fielder, capability 1 to capability 3 can be set to "batting", "running", "fielding" or the like, and when the player card is a pitcher, capability 1 to capability 3 can be set to "ball power", "ball control", "breaking ball" or the like. The capability items are not limited to the foregoing examples, and may be increased or decreased. The first-string player flag is a flag for distinguishing whether the player card owned by the user is a first-string player (player included in the team order) who will play in the match with the team of another user, or a second-string player other than the first-string player, and when the flag is "1" this shows that the player card is registered as the player card of a first-string player. By operating the terminal device 3, the user can select the first-string players from one's owned player cards and set the team order.

Moreover, the database server 2 includes a player card database which stores, by being associated with the player card ID, the player card's image data, player name, position, affiliated club (affiliated team), capability value (initial value that is not reinforced via synthesis), rarity level and the like, and the game information storage control unit 51 acquires image data and the like of the player card corresponding to the player card ID based on the player card ID stored in the owned player card storage control unit 51*c*.

In the present embodiment, each user is set with an upper limit regarding the number of player cards that can be owned in the game, and the game server 1 manages that the number of player cards owned by each user does not exceed the upper limit. The upper limit to the number of player cards owned by each user is set to an arbitrary number, for instance, 30, 60, 100, etc.

The owned point storage control unit 51*d* associates various points (including values equivalent to points) owned by the user in the game with the user ID, and stores the association in a predetermined storage area of the database server 2 for each user ID. In this game, there are various game modes, and various points are acquired according to the game mode and the acquired points can be used.

As shown in FIG. 7, as examples of points, in addition to the empirical value described above, there are action points, operating costs, reinforcement points, communication points and the like. The action points are used in a "scout mode" of searching for a player card and scouting a player while consuming such action points. The operating costs are used in a "match mode" of designating another user and playing individual matches, and are considered as the cost (points) required for operating the match and which are consumed by playing the individual matches. For instance, the action points and operating costs that were consumed and decreased during the game can be recovered by the lapse of time (for instance, 1 point is recovered for every lapse of 3 minutes), or recovered by the empirical value reaching a given amount and the user enhancing one's level.

Moreover, foregoing reinforcement points are used in a "reinforcement mode" of improving the capability of the player card by synthesizing the player cards owned by the user, and are consumed as a result of performing the synthesis. The reinforcement points can be acquired, for instance, by executing the scout mode or executing the match mode.

Moreover, the communication points are points that can be acquired by a user sending a message or the like to another user and communication up (supporting) that user. The communication points can be used, for example, in a "player drawing acquirement mode" of being able to acquire a predetermined number of player cards (for instance, 1 player card) by drawing based on a random number or the like among all player cards that are being managed by the game server 1, and one playing card drawing is offered for predetermined communication points.

The owned coin storage control unit 51e associates the coins (game coins that are separate from the points) owned by the user in the game with the user ID, and stores the association in a predetermined storage area of the database server 2 for each user ID. The coins are used, for example, upon acquiring charged items.

The owned item storage control unit 51f associates the items acquired by the user in the game with the user ID, and stores the association in a predetermined storage area of the database server 2 for each user ID. As shown in FIG. 7, as examples of items there are recovery items, puzzle card pieces, fake cards, and so on. A recovery item is an item for instantaneously recovering, up to a maximum value, the foregoing action points and/or operating costs that were consumed and reduced during the game without having to wait for the lapse of time. For example, a recovery item can be purchased by consuming the coins, or acquired by satisfying predetermined bonus conditions in the game.

A puzzle card piece is an item that can be used to acquire a powerful player card (player card with a high capability value) by collecting a predetermined number of pieces (for example, six pieces P1 to P6) and completing the puzzle card. For example, a puzzle card piece can be acquired when the user wins a drawing based on a random number or the like upon the execution of the scout mode, and can be seized from the opponent user upon winning a match against that opponent in the match mode that was fought for the piece owned by the other user.

A fake card is an item where, by setting it in the puzzle card piece, the seizure of the intended piece can be prevented just one time even upon losing the match against the other user in the match mode. For example, a fake card can be purchased by consuming the coins, or acquired by satisfying predetermined bonus conditions in the game.

The items that can be acquired and owned by the user in the game are not limited to the foregoing items, but various other items may be owned, for instance, treasure items which can be acquired when winning a match, equipment to characters such as weapons and defense tools, magic items and special items which generate various effects and performances, or the like.

Next, the priority setting unit 52a and the priority notification unit 53 are explained. A user (first user) can give an object owned by the user to the second user of gift destination as a gift by performing an operation of selecting the second user as the user of gift destination in the terminal device 3 of the user. Then, the priority setting unit 52 has a function of setting a priority for an object owned by the first user according to a first user's gift destination selecting operation of selecting the gift destination, and the priority setting unit sets the priority based on a second user's game information for recommending the object owned by the first user for a gift to the second user. This priority is set by surmising an object which is likely to be wished by the second user in such a manner that the more the second user is likely to desire the object, the higher the priority of the object is. Then, the priority notification unit 53 has the function of sending to the terminal device 3 of the first user, the information for notifying the priority set for the object owned by the first user. The detailed functions of the priority setting unit 52 and the priority notification unit 53 are explained below.

Figure 8:
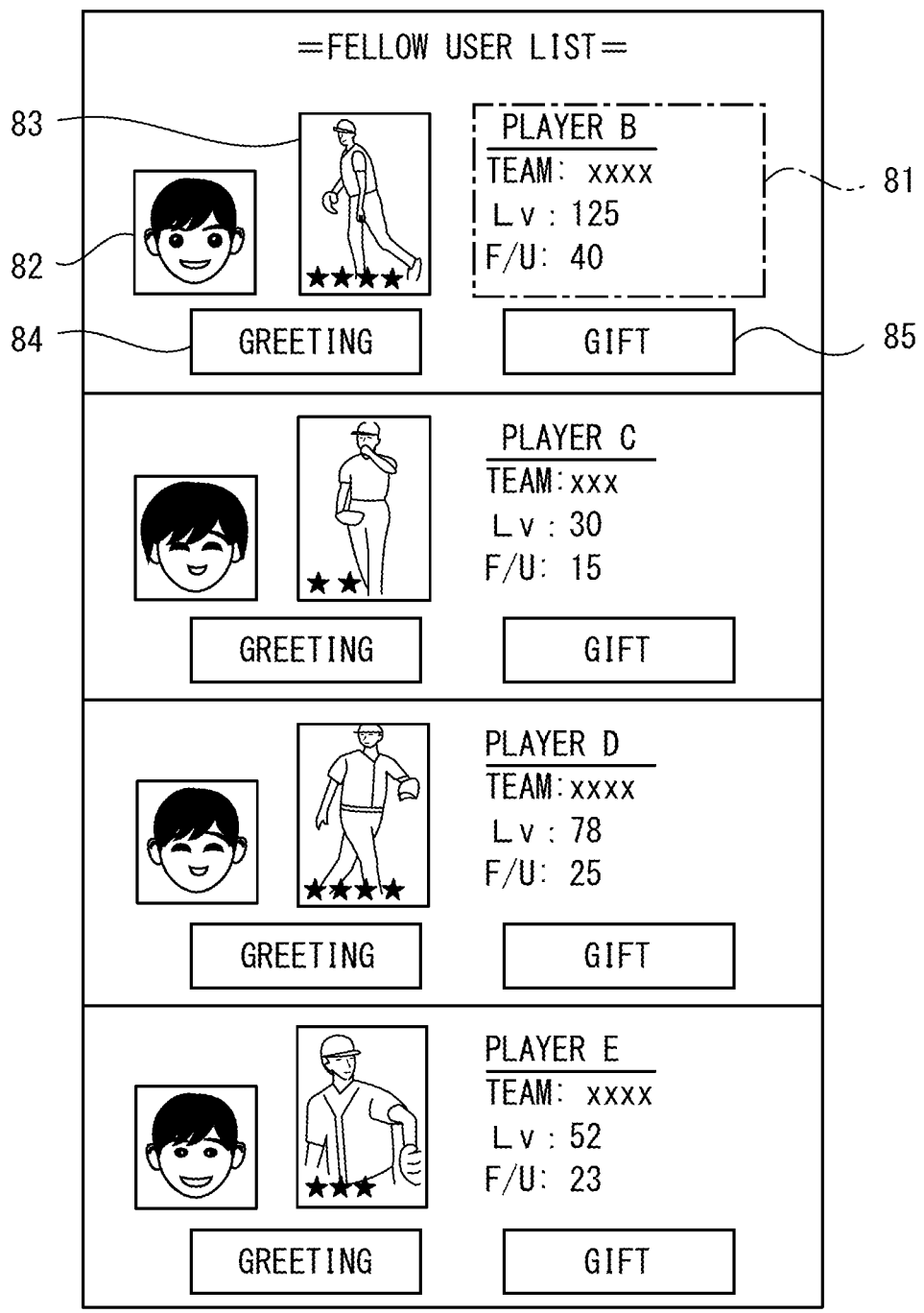
FIG. 8 is an explanatory diagram showing an example of the fellow player list screen.

Here, first, explained is an example of the user's operation of giving a gift to the user's fellow user. For instance, when the user performs an operation of selecting a "fellow user list" in the main screen of FIG. 5 using the terminal device 3, a request for fellow user list is sent from the terminal device 3 to the game server 1. The game server 1 receives this request from the terminal device 3 of the user, and sends the information for displaying the user's fellow user list to the terminal device 3. As a result, for instance, the fellow user list screen shown in FIG. 8 is displayed in the terminal device 3. In this fellow user list screen, the information of the fellow user in the fellow user's relationship with the user is listed up and displayed. Note that the information on the fellow users who cannot be displayed on the screen due to space restrictions can be displayed by scrolling the screen, or requesting the game server 1 to display the 2nd page onward of the fellow user list on a separate screen.

In this fellow user list screen, provided is an information display region for each of the listed fellow users. Each information display region displays fellow user's game information 81 (user name, team name, user level, number of fellow users, affiliated league level, and so on), an avatar 82 as the visual self of the user, a player card 83 of the leader owned by the fellow user, and objects referred to as a greeting button 84 and a gift button 85.

For example, when the user A (first user) performs an operation of pressing the gift button 85 of the fellow user B (second user) to select the fellow user B as the present destination, the information on this operation is transmitted from the terminal device 3 to the game server 1. In the game server 1 which received the information on the above gift destination selecting operation, the priority setting unit 52 sets priorities for the objects (player cards in the present embodiment) owned by the user A for recommendation for a gift based on the user B's game information.

Here, examples of the second user's game information for use in setting the priority include the information on "second user's owned objects". In the case of this second user's game information, the priority setting unit sets the priority of the objects owned by the first user based on the second user's owned object information such that the priority of an object owned by the first user which is not owned by the second user is given a higher priority than the priority of an object owned by the first user which is owned by the second user. The priority is set in this manner for the following reason. That is, it is more likely that the second user wishes to have the object not owned by the second user than the object already owned by the second user.

The second user's game information used for setting the priority is not limited to the information on "the object owned by the second user", and various other information such as including the information on "second user's wish object", the information "the second user's game history" to be explained later may be used. Other examples for setting the priority will be explained later.

Figure 9:
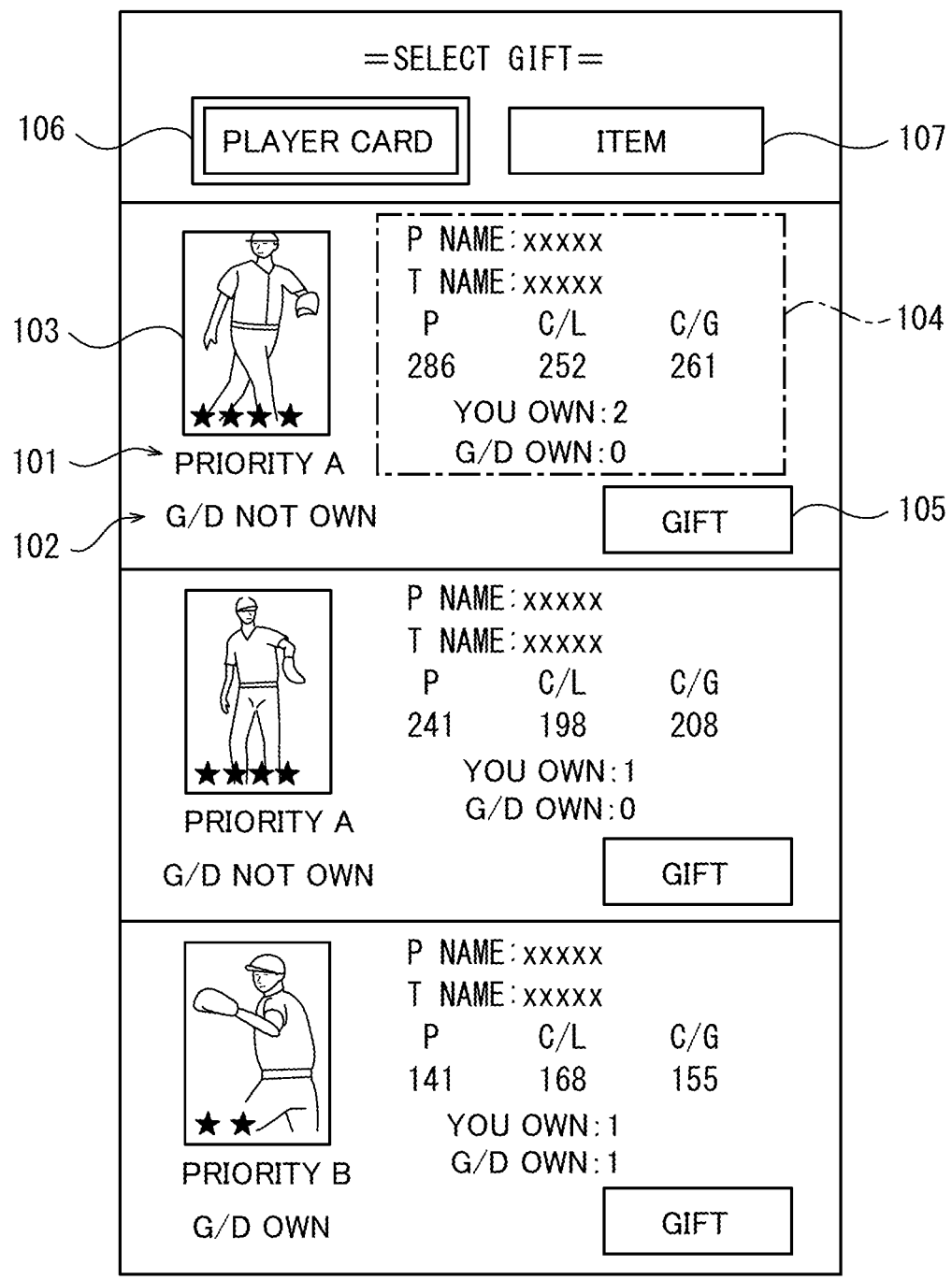
FIG. 9 is an explanatory diagram showing an example of the gift selection screen.

Then, for the information for notifying the priority set to the player card of the user A, the priority notification unit 53 transmits to the terminal device 3, the data on the gift selection screen shown in FIG. 9. This gift selection screen is, for instance, a screen on which displayed is a list of player cards 10 owned by the user A in the priority order. Note that the information which cannot be displayed on the screen due to space restrictions can be displayed by scrolling the screen, or requesting the game server 1 to display the 2nd page onward on a separate screen.

In the screen of FIG. 9, displayed is a priority information 101 indicating the priority set by the priority setting unit 52 in association with the player character 103 owned by the user A. In the example of FIG. 9, the priority information 101 indicating "priority A", "priority B", . . . is displayed in the region below each player character 103 of the user A. The information for notifying the priorities is not limited to this example, and any information may be adopted, which permits users to recognize the relationship between the objects owned by the user A (the first user) and the priorities set therefor.

In the present embodiment, capital letters "A", "B", . . . are used for showing the levels of priorities. However, other symbols, or numbers "1", "2", . . . , or wordings "High", "Low" (or "High", "Middle", "Low") may be used. Alternatively, it may be configured to notify respective priorities by changing colors of backgrounds, characters depending on the level of priorities, or by displaying some objects indicative of the levels of priorities.

In the example of the priority notification screen of FIG. 9, not just the priorities "priority A" and "priority B" but also the corresponding criteria information 102 for setting these priorities is displayed together. For instance, for the criteria information 102 for setting the "priority A", displayed is a message "the player card is not owned by the gift destination", and for the criteria information 102 for setting the "priority B", displayed is a message "the player card is owned by the gift destination".

By taking the priorities set for the player cards owned by the user A, it is possible for the user A to recognize whether the player card is what the user of gift destination is likely to wish (or what the user of gift destination is not likely to wish).

Indeed, whether or not the user of the gift destination wishes is based on factors including a subjective factor. Therefore, it is not guaranteed that the recommended order based on the priorities, set by the priority setting unit 52, 100% agrees with the order wished by the user B. However, since the game server 1 manages each user's game information, it is possible to recognize what are owned by the user B, etc., in the game. Therefore, by taking into consideration the priorities set by the game server 1 based on the user B's game information, it is possible to significantly increase the possibility that the user A, who cannot grasp the user B's game information, is able to give an object wished by the user B as a gift as compared to the case where the user A, who cannot grasp the user B's game information, does not take anything into consideration.

In the gift selection screen of FIG. 9, provided is an information display region 104 for each of the player cards 103 listed up, and in the information display region 104, displayed is the information including player name, team attribute (team name), ability value, capability value, number owned by the user, number owned by the gift destination, etc. In this screen, displayed is a gift button 105 corresponding to each player card 103. Then, by selectively operating the gift button 105 for the player card 103 which the user A wishes to give as a gift to the user B, it is possible to virtually give the player card 103 in the game.

In the gift selection screen, displayed are buttons (a player card button 106 and an item button 107) for selecting one of the kinds of gift. For instance, in the default state, the player cards owned by the first user are listed in the gift selection screen. However, by selecting the item button 107, the screen is switched to the list of items (recovery items or the like) owned by the first user. In this screen, the user is allowed to specify an item for a gift target.

Figure 10:
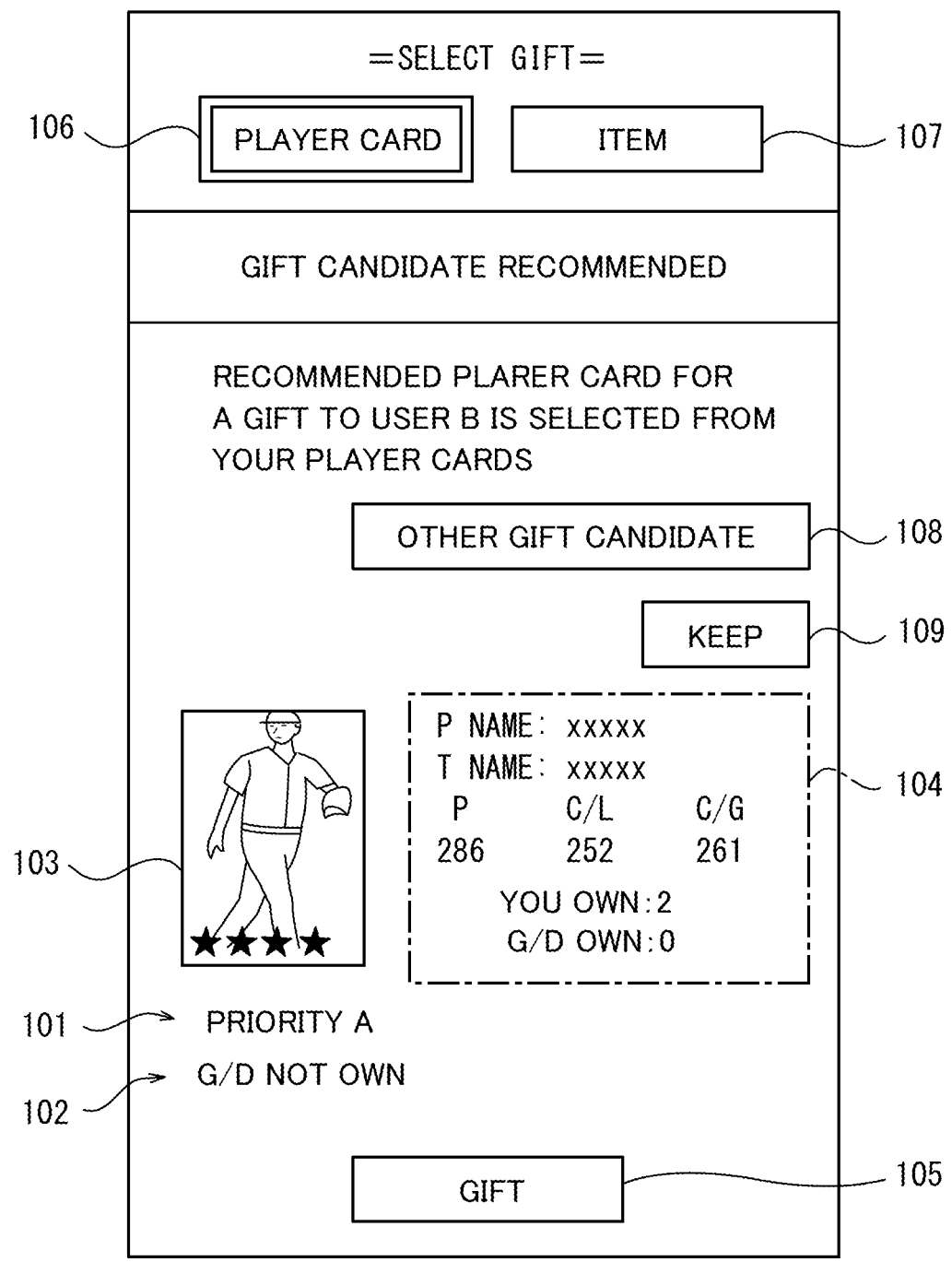
FIG. 10 is an explanatory diagram showing another example of the gift selection screen.

In the above example, explanations have been given through the case in which player cards of the first user are listed in the order from the highest priority. However, other configuration of notifying the priorities may be adopted. For example, like the screen of FIG. 10, it may be configured to select one player card having the highest priority from among the player cards owned by the first user to be displayed in the gift selection screen. In the example of FIG. 10, the player card having the highest priority is displayed in the screen for a "recommenced gift candidate". The above priority information 101, etc., are displayed also in this screen. In this screen, it is desirable to display "other gift candidate" button 108 as well. Here, depending on the user A, the player card A currently displayed as a gift candidate is not wished to be released. In this case, when the user A performs an operation of selecting the "other gift candidate" button 108, the information on that operation is sent to the game server 1. The game server 1 which receives the information on this operation selects player cards one by one from the player card having the highest priority to the second gift candidate, the third gift candidate, . . . , to be set to the terminal device 3 of the user A. As a result, in the terminal device 3, for instance, the player cards of the second gift candidate (the third gift candidate, . . . ,) are additionally displayed in the screen with the first gift candidate (the player card having the highest priority). It may be also configured such that the player card of the second gift candidate is displayed in the screen in replace of the first gift candidate, and every time the "other gift candidate" button 108 is pressed, the display of the gift candidate is changed in order of the third gift candidate, the fourth gift candidate, . . . . Here, it may be configured such that when the number of gift candidates is five, for instance, the first gift candidate will be displayed again after the fifth gift candidate is displayed, or a return button may be provided to allow the user to return the screen to display the previously displayed gift candidate by operating the return button.

In the gift selection screen of FIG. 10, a "keep" button 109 may be displayed. With this configuration, when the player card which the player A does not wish to release is displayed in the gift selection screen, by pressing the "keep" button 109, the keep request can be sent from the terminal device 3 of the player A to the game server 1. Then, the game server 1 which receives the keep request registers the player card as a player card which the player A wishes to keep according to the keep request. Hereinafter, this registered player card will not be displayed in the gift selection screen. As a result, it becomes easy for the user A to perform a gift giving operation. A similar "keep" button may be provided in the gift selection screen of FIG. 9.

Figure 11:
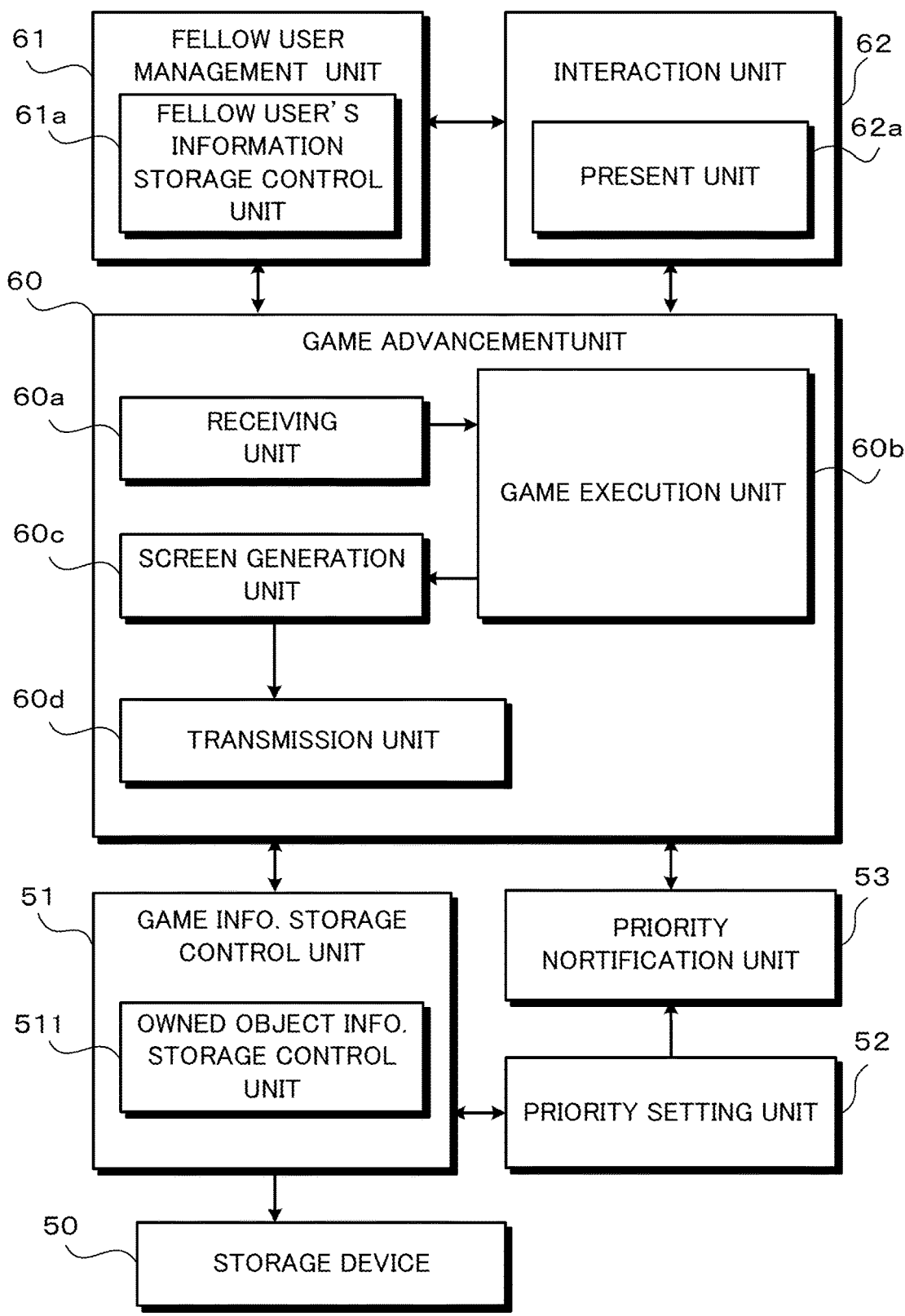
FIG. 11 is a functional block diagram showing another example of the functional configuration of the game management device.

As shown in FIG. 11, the game server 1 comprises the game advancement unit 60. As shown in FIG. 11, the game advancement unit 60 functionally includes a receiving unit 60a, a game execution unit 60b, a screen generation unit 60c, a transmission unit 60d, etc. The game advancement unit 60 basically has the function of executing the game according to a user's operation performed using the terminal device 3, generating a game screen data according to the result of execution, and advancing the game by displaying a game screen according to the user's operation on the terminal device 3.

When a game screen is displayed with the web browser of the game user's terminal device 3 and the user performs an operation for selecting the selectable object or hyperlink on the game screen, the operation information according to this information (a game screen request or the like) is sent to the game server 1 by the web browser of the terminal device 3. In the game server 1, when the receiving unit 60a receives the operation information, the game execution unit 60b executes the game by reading the game user's game information according to the operation information and performing arithmetic processing and data processing.

For example, taking an example where the user performs an operation of playing a match with the team of another use in the match-up mode, the game execution unit 60b reads, from the database server 2, the player card information (player card information of the first character and the second character playing in the match) of both teams corresponding to the user IDs of both users who are playing the match. In addition, the game execution unit 60b performs the computation of determining the win/loss of the match based on the capability values of the player cards of both teams. As an example of the computation of determining the win/loss of the match, the team with the higher total capability value of the player cards may be the winning team, or the winning probability of the team with the higher total capability value of the player cards may be increased and the winning team may be obtained based on probability computation. Moreover, before the computation of determining the win/loss of the match, the game execution unit 60b may perform the computation of determining whether to generate various effects that will affect the win or loss based on the combination of player cards configuring the team.

The game screen generation unit 60c generates game screen data from, for example, HTML data according to the execution result of the game execution unit 60b. The HTML data may include the image data of player cards and the like read from the database server 2. And the HTML data may also be embedded with a script (program) that is operated based on a plug-in of the web browser of the terminal device 3.

The transmission unit 60d sends, to the user's terminal device 3, the game screen data (HTML data and the like) generated by the game screen generation unit 60c as a response to the game screen request. The game user's terminal device 3 that received the foregoing game screen data displays the game screen on the display unit 35 using the web browser.

Furthermore, as shown in FIG. 11, the game server 1 comprises a fellow user management unit 61. As one mode for a certain user to become a fellow user with another user, considered may be a fellow user request/approval operation performed between the users where one user sends a fellow user request to the other user via the game server 1, and the user who received the fellow user request approving such request to become a fellow user via the game server 1. As another mode, when a user, who has already been registered in the game server, invites an unregistered user, and the invited user registers in the game service, these two users who invited and who was invited are considered to be fellow users.

The fellow user management unit 61 comprises a fellow user information storage control unit 61a which stores, in the storage device 50 (database server 2, etc.), the fellow user's information correlating the two users whose fellow player relationship has been established. FIG. 12 shows an example of the fellow user's information that the fellow player information storage control unit 61a stores in the database server 2.

As shown in FIG. 12, when the fellow user relationship between certain two users is established, the fellow user's information storage control unit 61a stores in the database server 2, the fellow user information associating the user ID of the user who made the fellow user request with the user ID of the user who approved the fellow user request. Subsequently, the fellow user management unit 61 assigns a fellow user information ID to each fellow user's information for uniquely identifying the fellow user's information, and performs fellow user management on the basis of the fellow user information ID.

In the example of FIG. 12, the fellow user information associating the two users; namely, the user A of the user ID="000001" who made the fellow user request and the user B of the user ID="000002" who approved that request is stored in the database server 2 as the fellow user information of the fellow user information ID="1". Consequently, for the user A, the user B will be a fellow user in a fellow user relationship and, for user B also, the user A will be a fellow user.

Moreover, each user can create a plurality of fellow users, and configure a fellow user group centered around each user. In the example of FIG. 12, the user A of the user ID="000001" has also establish a fellow user relationship with the users of the user IDs="000005", "000012" and "000035".

As shown in FIG. 11, the game server 1 comprises an interaction unit 62. This interaction unit 62 has a function of receiving information from the terminal device 3 of the user 3 for making a predetermined interaction with other users (in particular, fellow users) and executing an interaction from the user to the other user. Examples of interaction include exchanging gifts, greetings or messages, having a chat, cooperation for a match, etc.

Here, the gift giving processing unit 62a of the interaction unit 62 is explained. The gift giving processing unit 62a has a function of receiving the information on gifts to other users from the terminal devices 3 of respective users and executing the gift giving processing for sending a gift to other user. Examples of gift target include player cards or various kinds of items owned by the user in the game.

For instance, when the user A performs an operation of giving a player card A as a gift to the user B, the gift giving processing unit 62a receives the information on the gift, and updates the information stored in the owned player character storage control unit 51c. Namely, the gift giving processing unit 62a deletes the player card A which was given from the user A to the user B from the player cards owned by the user A. In the meantime, the gift giving processing unit 62a adds the player character A which received from the player A to the player cards owned by the user B. In this case, the gift giving processing unit 62a informs the terminal device 3 of user A of that the gift to the user B has been completed. The gift giving processing unit 62a further informs the terminal device C of user B that the player card A has been given from the A. For instance, in the main screen shown in FIG. 5, displayed is a message 74 (for instance, a message "one gift is received") indicating that a gift has been received. Then, in the terminal device 3, by performing an operation of selecting this message 74, the screen is switched to the gift receiving screen in which the user is allowed to confirm the content of the gift (the player card A is given as a gift from the user A).

[Operation of Game System]

Figure 13:
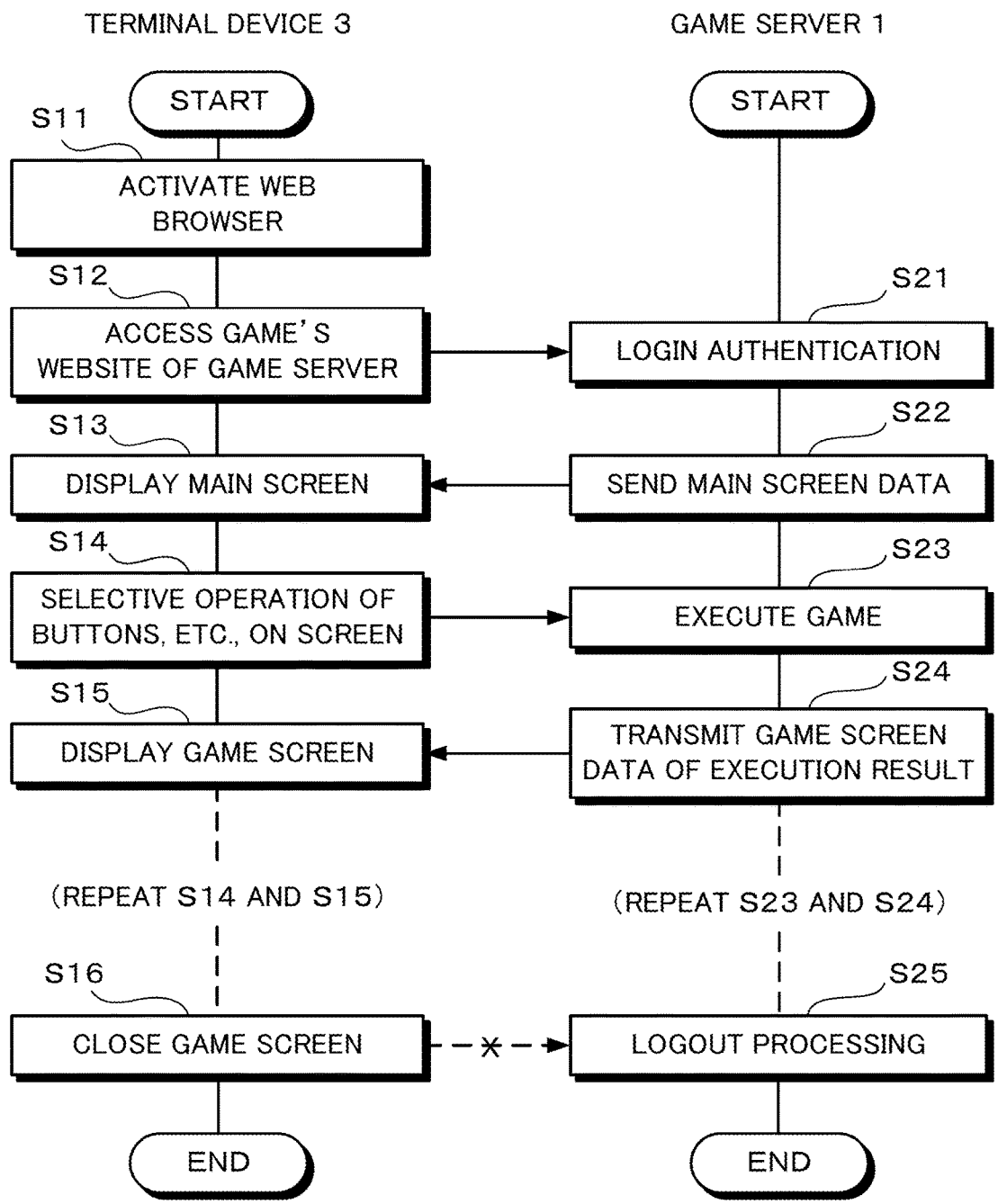
FIG. 13 is a flowchart showing an example of the operation of the game system.

An operation example of the game system according to an embodiment of the present invention configured as described above is now explained with reference to the flowchart of FIG. 13. FIG. 13 shows the processing flow of the terminal device 3 and the game server 1 when the game user operates the terminal device 3 and accesses the game server 1 to receive the game service.

When the game user is to receive the game service, foremost, the game user operates the operation input unit 40 of the terminal device 3 and launches the web browser (S11). Subsequently, the game user performs operations for accessing the game site managed by the game server 1, and an access request is thereby sent from the terminal device 3 to the game server 1 (S12). Here, the game server 1 performs log-in authentication to the access from the terminal device 3 (S21), and confirms that the access is from a game user who is registered for using the game service. Subsequently, the game server 1 sends main screen data described in HTML or the like to the terminal device 3 (S22). In a case where there is a top screen apart from a main screen, the top screen may be transmitted first. In addition, in the terminal device 3 that received the main screen data, the web browser interprets the received data, and displays the main screen on the display unit 35 (S13).

As shown in FIG. 5, the main screen displays the user's team name 70, image of the player card 71 selected as the leader among the player cards owned by the user, and user's game information 72 (user level, action points, operating costs, reinforcement points, communication points, number of owned player cards, number of fellow players). Moreover, a button group 73 for selecting the respective modes of scout, order, reinforcement, drawing, and match is also displayed. In addition, by operating the arrow key or touch panel of the terminal device 3 and scrolling the screen, the main screen can also display various objects and information such as various menu buttons, fellow player movement information, and messages from other users (all not shown).

Here, when the game user performs the operation of selecting an object such as selectable buttons or a hyperlink displayed on the screen, a screen request according to the operation is sent from the terminal device 3 to the game server 1 (S14). The game server 1 that received the foregoing request executes the game by performing arithmetic processing and data processing according to the game user's operation (S23), and sends the game screen data reflecting the execution result to the terminal device 3 (S24). In addition, with the terminal device 3 that received the screen data, the web browser interprets the received data, and displays the game screen on the display unit 35 (S15).

Thereafter, in the game user's terminal device 3, S14 and S15 are repeated, and in the game server 1, S23 and S24 are repeated, and, consequently, each time the game user selects the selectable button or the like displayed on the screen of the terminal device 3, the game screen of the terminal device 3 is switched in succession so as to advance the game.

Subsequently, when the game user operates the terminal device 3 and closes the game screen (S16), the game server 1 performs log-out processing (S25). For example, when the game user closes the web browser, the game server 1 performs the log-out processing after a session time-out.

Meanwhile, in this game system, even when the game user logs out from the game server 1, the game server 1 side can read the game information on that game user and advance the game. For example, there are cases where another logged-in user challenges the team of a logged-out user for a match (individual match), and the game advancement unit 60 of the game server 1 reads each user's game information from the database server 2 and executes the match, and updates each user's game information upon reflecting the execution result regardless of whether the user is logged in. Accordingly, the results of a match that is executed while the user is logged off from the game server 1 can be later confirmed on the screen when the user subsequently accesses the game server 1.

[Operation of Game Management Device]

Figure 14:
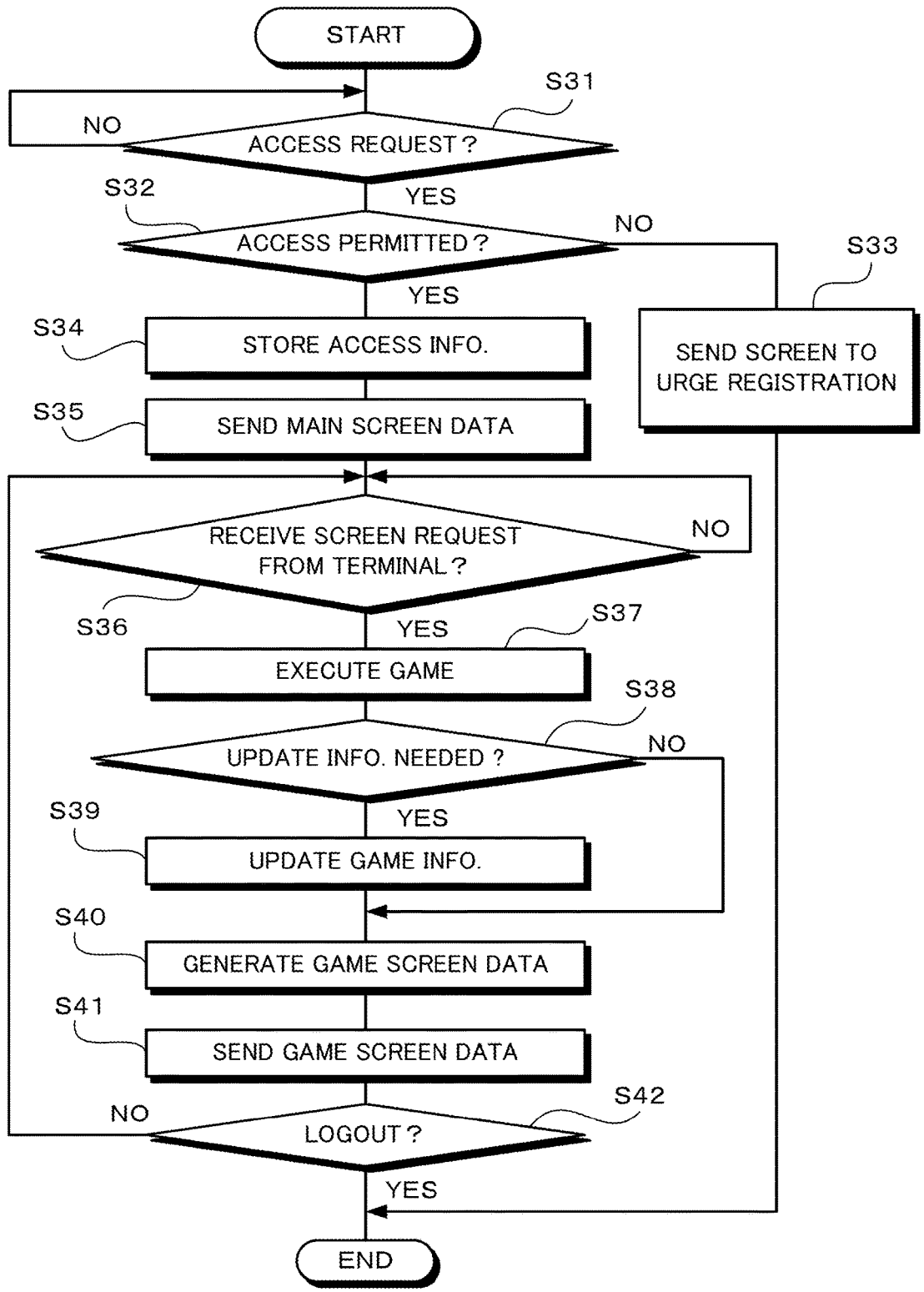
FIG. 14 is a flowchart showing an example of the game advancement processing.

A more detailed operation example of the game management device according to an embodiment of the present invention is now explained with reference to the flowcharts of FIG. 14, etc. FIG. 14 shows the processing flow of the game server 1 targeting a certain single user, and similar processing is performed to the respective users being managed by the game server 1.

As shown in FIG. 14, upon receiving an access request from the user's terminal device 3 (S31; YES), the authentication means 53 of the game server 1 performs log-in authentication of determining whether to permit access based on the log-in ID, password, or individual recognition number of the portable phone terminal sent from the terminal device 3 (S32). Here, when access is not permitted (S32; NO), the game server 1 sends screen data to the terminal device 3 which urges registration for using the game service (S33). Meanwhile, when access is permitted (S32; YES), access information (log) is stored (S34).

Subsequently, the game server 1 sends the main screen data (or top screen data) to the user's terminal device 3 that was permitted access (S35). Upon subsequently receiving a screen request according to the user's game operation that is sent from the user's terminal device 3 (S36; YES), the game execution unit 60b executes the game by performing the arithmetic processing or data processing according to the screen request (S37).

Subsequently, the game server 1 determines whether it is necessary to update the user's game information due to the execution of the game (S38), and when an update is required (S38; YES), updates the user's game information stored in the database server 2 (S39). For example, when the user's game operation is an operation of individually competing with another user, as a result of the competition being executed, the user's game information such as the game result information, operating costs, reinforcement points, and items will be updated. Meanwhile, for example, when the user's game operation is an operation of confirming the results of the league competition, the game execution processing according to that operation will only be the data processing of reading the result information on the league competition from the database server 2, and, since there is no change in the user's game information before and after the processing, there is no need to update the user's game information (S38; NO).

Subsequently, the game screen generation means 60c generates game screen data by reflecting the game execution result (S40), and the transmission means 60c sends the game screen data to the user's terminal device 3 (S41). Subsequently, whether the user's terminal device 3 has logged out is determined (S42), and the game is advanced by repeating the processing of S36 to S41 until the terminal device 3 logs out.

An example of the processing of the game server according to the present embodiment is explained with reference to the flowcharts of FIG. 15 and FIG. 16.

In this example, the following explanations are given below through the case of performing an operation of selecting the user B in the terminal device 3 of the user A as an operation of selecting a user of gift destination. As shown in FIG. 15, upon receiving the information on the operation of selecting the gift destination (S51), the game server 1 sets priorities for recommendation for a gift to the user B to the objects owned by the user A based on the user B's game information (S52). Here, shown is an example for setting proprieties for the player characters as the objects owned by the user A. An example of the sub-routine of this step S52 is explained with reference to the flowchart of FIG. 16.

Figure 16:
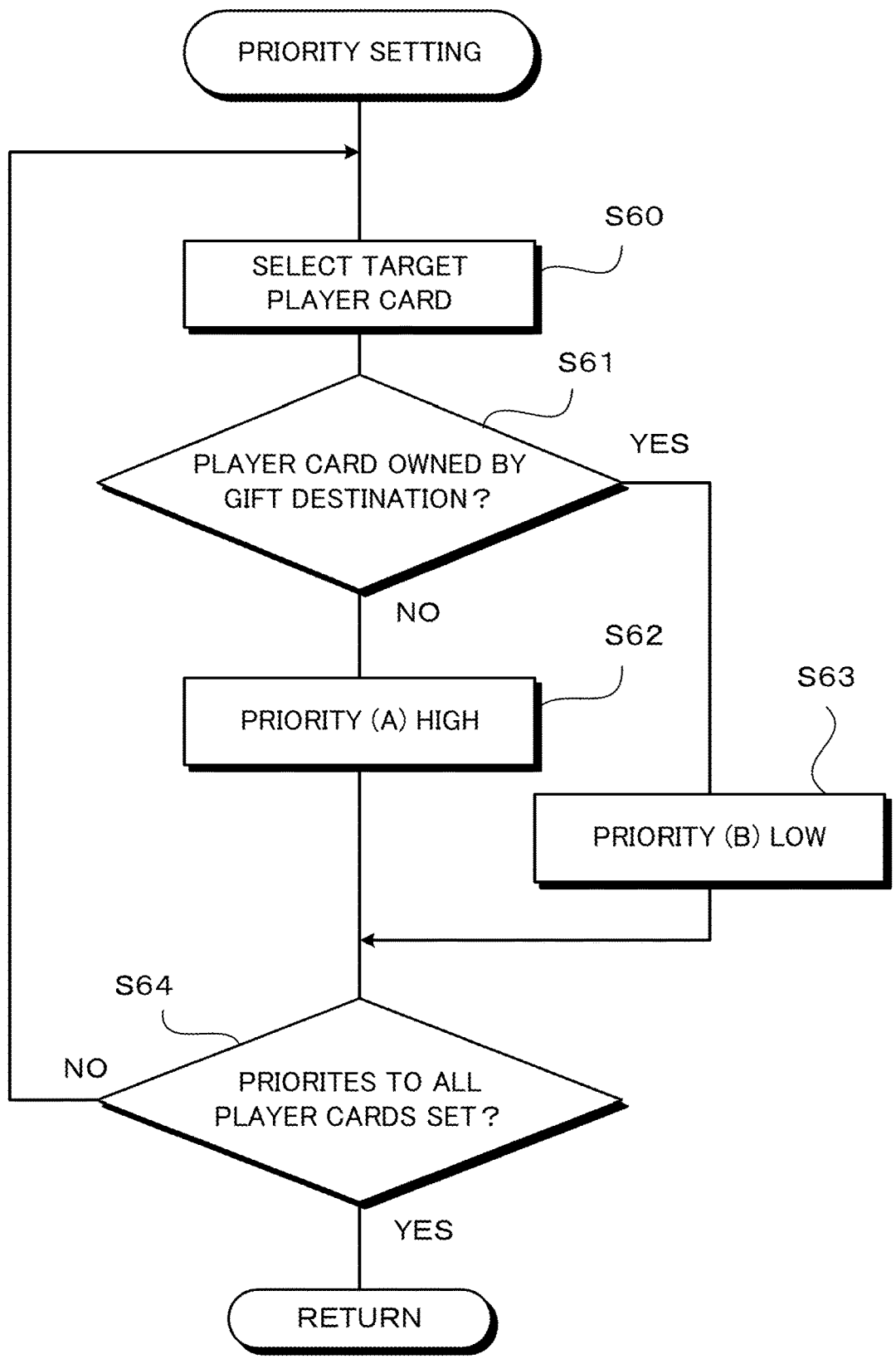
FIG. 16 is a flowchart showing an example of the priority setting processing.

As shown in FIG. 16, the priority setting unit 52 selects an arbitrary target player card for the priority setting processing from all player cards owned by the user A (S60). Then, for the selected player card of the user A, the processing in steps S61 to S63 is executed.

The priority setting unit 52 determines based on the information on the player cards owned by the user B, if each player card of the user A (the target player card for the priority setting processing) is the player card owned by the user B (S61). If the player card of the user A is a player card not owned by the user B (S61; NO), the priority setting unit 52 sets the priority of the player card of the user A to "(A) high" (S62). On the other hand, if the player card of the user A is a player card also owned by the user B (S61; YES), the priority setting unit 52 sets the priority of the player card of the user A to "(B) low" (S63). As described, the priority setting unit 52 sets the priority of the player card not owned by the users B to be higher than the priority of the player card owned by the user B.

Thereafter, it is determined if the priority setting process has been completed for all player cards owned by the user A (S64). If NO in this step S64, the priority setting unit 52 goes back to step S60, and the processing in steps S60 to S64 is repeated until the priority setting process has been completed for all player cards owned by the user A. Then, if YES in step S64, the sub routine is ended. Then, the sequence goes back to step S53 of FIG. 15.

The information on the priorities respectively set to the player cards of the user A as set in the foregoing manner is stored in the storage device 50 (for instance, the RAM 13, the auxiliary storage device 14 or the database server 2 of the game server 1).

The priorities respectively set to the player cards of the user A are the priorities set based on the user B's game information, and these priorities respectively set for the player cards of the user A can be changed according to the gift destination. When the user B performs a game, the user B's game information is also changed (for instance, the number of player cards owned by the user B increases or decreases). Therefore, even when the gift destination is the same user B, the priority currently set for the object may differ, for instance, from the priority set a week after. Therefore, the priority setting unit 52 of the game server 1 executes the priority setting process for setting a priority for each player card each time the information on the operation of selecting a gift destination is received.

Referring back to S53 of FIG. 15, explanations are continued. The priority notification unit 53 sends the information for notifying the priority set for each of the player cards of user A to the terminal device 3 of the user A (S53). For example, as shown in FIG. 9, the priority notification unit 53 sends to the terminal device the gift selection screen data for displaying the player cards owned by the user A listed in the order from the player character having the highest priority. Or as shown in FIG. 10, the priority notification unit 53 selects one player character having the highest priority (or n player characters in the order from the highest priorities) from among the player characters owned by the users A to be displayed in the gift selection screen to inform the polarities set therefor. In this case, by operating the "other gift candidate" button 108, the user A will be informed of the priority of other player cards in the order from the highest priority.

The priority thus notified is used for an index for determining if the player card is what the user B is likely to wish (or what the user B is not likely to wish). Therefore, by taking the priority thus notified into consideration, it is possible for the user A to select a player card for a gift to the user of gift destination, which is likely to be wished by the user of gift destination.

Here, when a gift giving operation of pressing the gift button 105 in the screen of FIG. 9 or FIG. 10 is performed by the user A, the information on the operation is sent from the terminal device 3 to the game server 1. Then, upon receiving the information on the gift giving operation (S54; YES), the game server 1 executes a gift giving processing (S55), and the processing is terminated. When another operation (for instance, an operation of returning to the main screen, etc.) is performed in the gift selection screen (S56; YES), the processing according to the operation is executed (S57), thereby terminating the processing.

In the present embodiment, explanations have been given through the case where either the priority "(A) high" or the priority "(B) low" is set for each of the objects owned by the first user. However, the present invention is not intended to limited to this, and it may be further configured that when a plurality of objects having the same priority exist, a priority is set based on prescribed criteria to each of these objects having the same priority as will be described later.

As described, the game management device according to the present embodiment manages a game, which communicates with the terminal device 3, and which permits a user to give an object owned by the user in the game to other user, and as shown in FIG. 4, the game management device comprises: a game information storage control unit 51 for storing in a storage device 50, an each user's information, the game information storage control unit 51 including the owned object information storage control unit 511 for storing in the storage device 50, an object owned by each user; the priority setting unit 52 for setting a priority to an object owned by a first user according to a first user's gift destination selecting operation of selecting a second user as a gift destination, the priority setting unit 52 setting the priority based on a second user's game information for recommending the object owned by the first user for a gift to the second user; and a priority notification unit 53 for transmitting to the terminal device 3 of the first user, an information for notifying the priority set for the object owned by the first user.

According to the foregoing configuration, when the first user is going to give a gift to the second user, the game management device sets the priorities to player cards or the like owned by the first user for making a recommendation of a gift to the second user, and the game management device further notifies the first user of the set priorities. With this configuration, by taking the priorities set by the game management device into consideration, it is possible for the first user to determine if the player card or the like owned by the first user is what the second user is likely to wish. The foregoing processing of notifying the priorities for making a recommendation of a gift to the second user is performed automatically by the game management device which manages the second user's game information without requiring the first user to perform complicated operations of contacting the second user and the like. Namely, according to this configuration, it is possible to provide a user with such a desirable game environment, who is going to give an item or the like owned by the user, that the user can recognize with ease if the item or the like is what the user of gift destination is likely to wish (or what the user of the gift destination is likely to wish).

The priority setting unit 52 according to the present embodiment is further configured such that when priorities are set for player cards or the like owned by the first user, based on the second user's owned object information of the second user's game information, the priority of the object owned by the first user which is not owned by the second user is set higher than the priority of the object owned by the first user which is owned by the second user.

It is more likely that the second user wishes to obtain objects which are not owned than objects already owned. Therefore, by taking the priority set based on the second user's owned object information into consideration, it is possible to increase the possibility for the first user to give an object as a gift to the second user along what the second user wishes. It is also possible for the first user to avoid giving an object such as an item or the like to the second user for a gift, which is the same as the object already owned by the second user.

Figure 17:
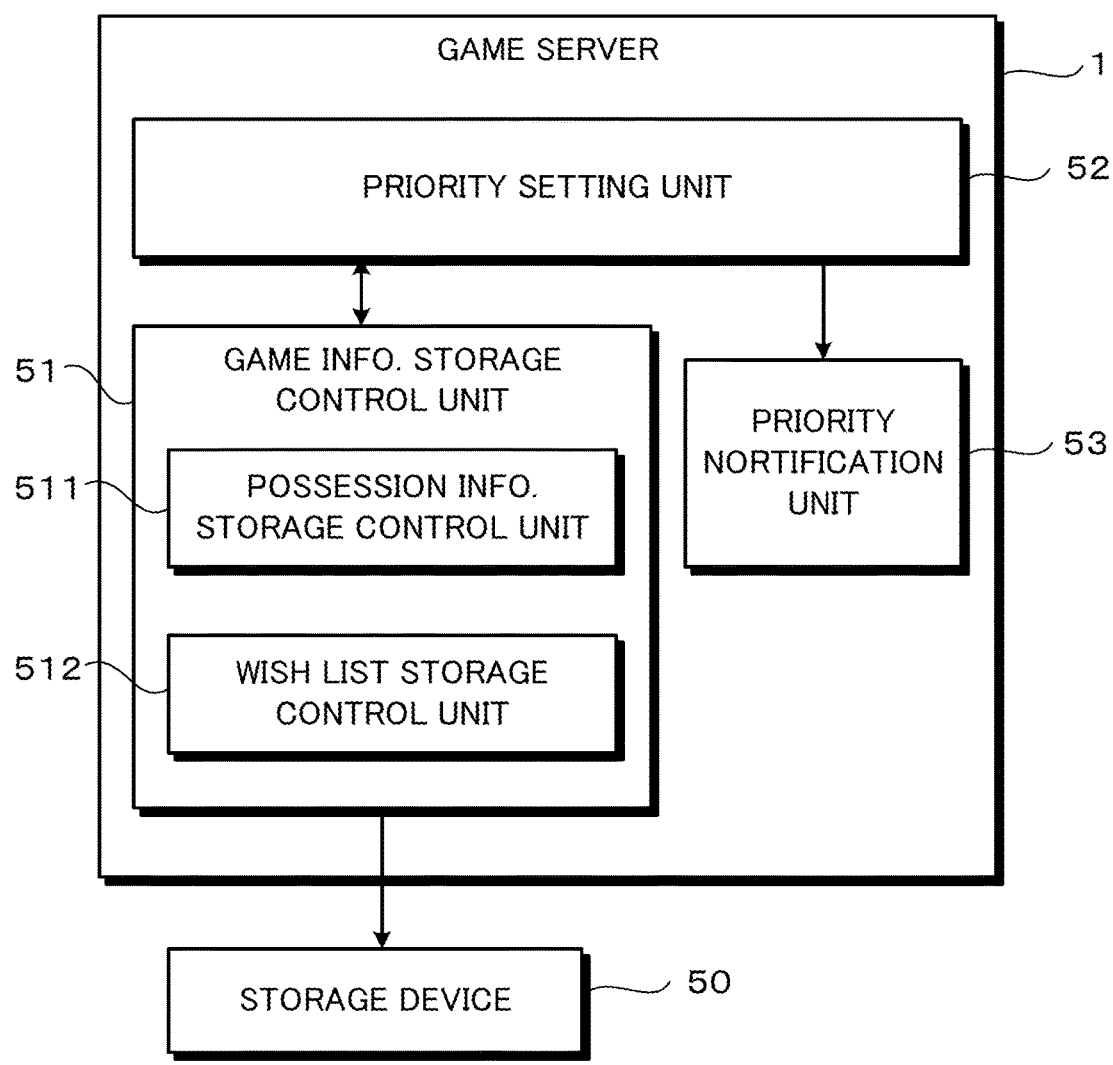
FIG. 17 is a functional block diagram showing another example of the functional configuration of the game management device.

Next, explained is the configuration of the game management device provided with the function of allowing each user to register user's wish objects, in which priorities are set using the user's wish object information of the user's game information By operating the terminal device 3 of the user, the user can register the user's wish objects (the user's wish objects such as player cards, items, etc., which can be owned by the user). As shown in FIG. 17, the game information storage control unit 51 according to the present embodiment includes a wish list storage control unit 512. This wish list storage control unit 512 has a function of storing each user's wish object in the storage device 50 (the database server 2, etc.) based on an information on an operation of registering the user's wish object. Namely, as shown in FIG. 7, the storage control unit 512 associates the player card ID or the character ID of the player card or the character which are requested to be registered for wish objects in association with the user ID, and stores the association in a predetermined storage region of the database server 2.

For the wish objects registered by the user, other user can check them by viewing the page displaying the user's information. However, in the present embodiment wherein the game server 1 reflects the information on the second user's wish object in the priorities, by taking the priorities into consideration, it is possible for the first user to give a gift to the second user along what the second user wishes without taking the trouble of viewing the second user's wish objects of the gift destination.

Namely, the priority setting unit 52 according to the present embodiment sets priorities for the player cards, etc., owned by the first user in the following manner. That is, based on the second user's wish object information and the second user's owned object information of the second user's game information, the priorities are set in the order from the highest priority of: a second user's wish object, an object not owned by the second user, and an object owned by the second user. The priority of the second user's wish object is set higher than the priorities of other objects for the following reason. That is, since the second user's wish object is an object which is clearly indicated by the second user beforehand as a wish object, the possibility of the object actually being wished by the second user is extremely high as compared with other objects.

The objects owned by the first user also include the objects which are the second user's wish objects and which are the object owned by the second user (or the objects not owned by the second user). In this case, these objects are considered as the second user's wish objects as a matter of course.

An example of the priority setting processing according to the configuration of the present embodiment is explained with reference to the flowchart of FIG. 18. This flowchart shows another example of the step S52 of FIG. 15. Also in this example, explanations are given through the case of performing an operation of selecting the user B in the terminal device 3 of the user A as an operation of selecting a user of gift destination.

Figure 18:
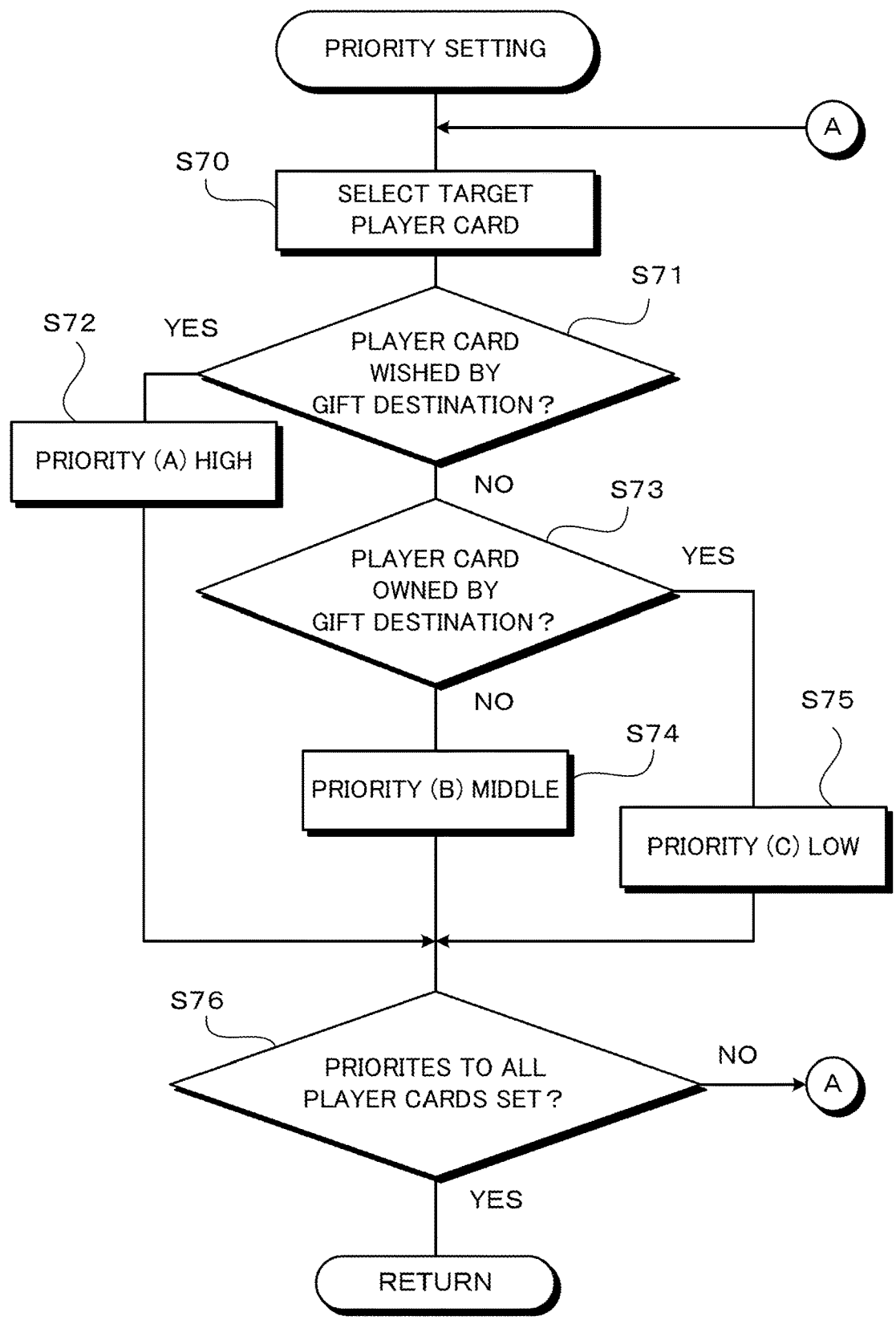
FIG. 18 is a flowchart showing another example of the priority setting processing.

As shown in FIG. 18, the priority setting unit 52 selects an arbitrary target player card for the priority setting processing from all player cards owned by the user A (S70). Then, for the selected player card of the user A, the processing in steps S71 to S75 is executed.

The priority setting unit 52 determines based on the user B's wish information of the user B's game information, if each player card of the user A (the target player card for the priority setting processing) is the player card registered as a wish player card by the user B (S71). If YES in this step S71, the priority setting unit 52 sets the priority of the player card of the user A to "(A) high". On the other hand, if NO in step S71, the priority setting unit 52 determines based on the information on the player cards owned by the user B of the user B's game information, if the player card owned by the user A is a player card also owned by the user B (S73). If the player card of the user A is a player card not owned by the user B (S73; NO), the priority setting unit 52 sets the priority of the player card of the user A to "(B) middle". On the other hand, if the player card owned by the user A is a player card also owned by the user B (S73; YES), the priority setting unit 52 sets the priority of the player card of the user A to "(C) low". As described, the priority setting unit 52 sets priorities for the player cards of the user A in the order from the highest priority of; the second user's wish object, the object not owned by the second user, and the object owned by the second user.

Thereafter, it is determined if the priority setting process has been completed for all player cards owned by the user A (S76). If NO in this step S64, the priority setting unit 52 goes back to step S71, and the processing in steps S71 to S76 is repeated until the priority setting process has been completed for all player cards owned by the user A. Then, if YES in step S76, the sub routine is ended. Then, the sequence goes back to step S53 of FIG. 15.

Figure 19:
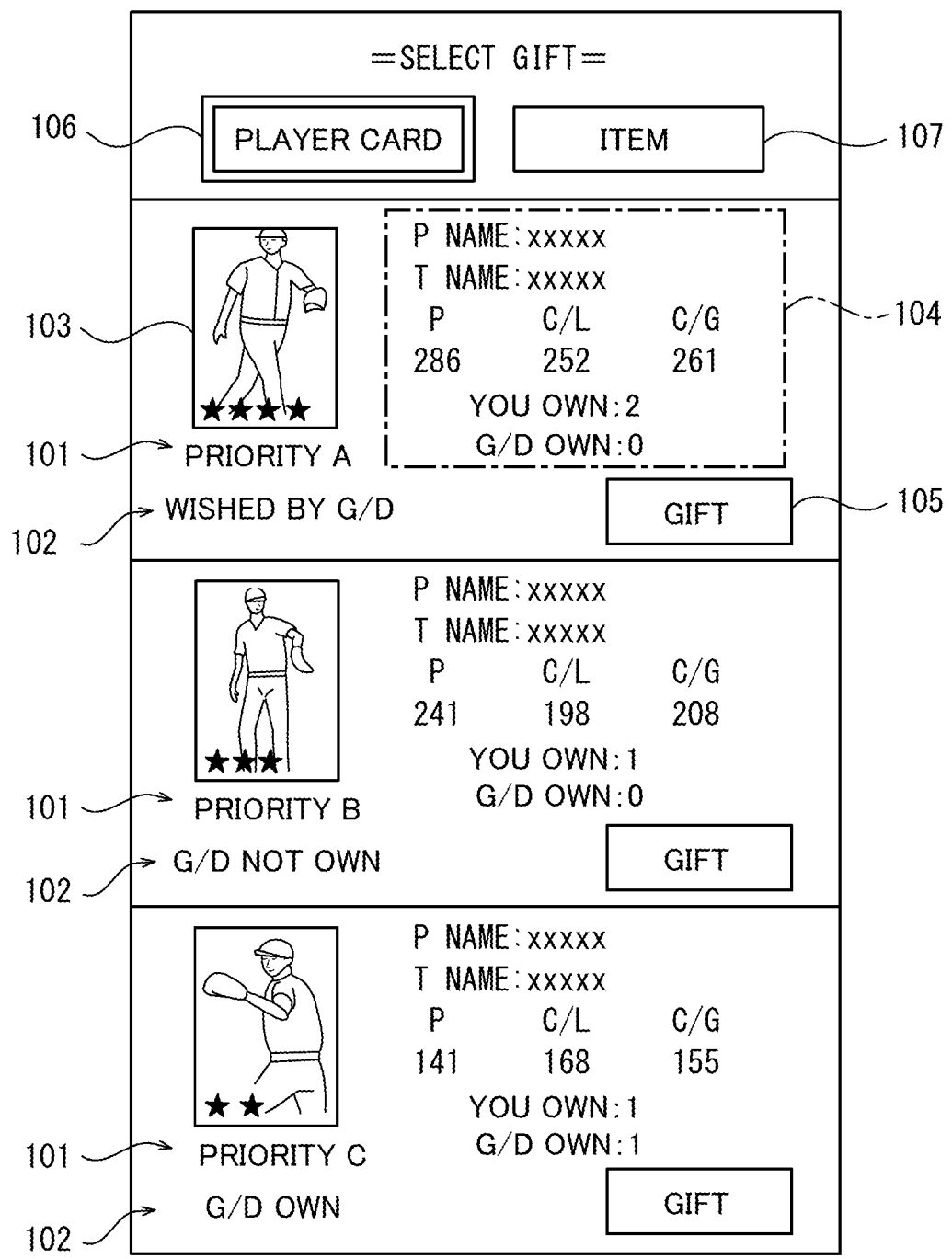
FIG. 19 is an explanatory diagram showing another example of the gift selection screen.

FIG. 19 shows an example of notifying the set priorities according to the present embodiment. FIG. 19 shows the gift selection screen for displaying a list of player cards owned by the user A in the order from the highest priority. In this screen, displayed are a priority information 101 ("priority A", "priority B", and "priority C" in this order from the highest priority) set for each of the player cards owned by the user A, and a criteria information 102 indicative of the criteria for setting the priority. In this example, for the criteria information 102 for setting the "priority A", displayed is a message "the player card is a wish object of the gift destination"; for the criteria information 102 for setting the "priority B", displayed is a message "the player card is not owned by the gift destination"; for the criteria information 102 for setting the "priority C", displayed is a message "the player card is owned by the gift destination".

In the list display screen of FIG. 19, the player cards respectively having the "priority A", the "priority B" and the "priority C" are displayed one card each for convenience sake. However, in the case where a plurality of player cards having "priority A", first all player cards having "priority A" are displayed first, followed by the player cards of the "priority B" and the "priority C" (the same can be said for the screen of FIG. 23 and the screen of FIG. 26 as will be described later).

As described, as shown in FIG. 17, the game management device according to the present embodiment is configured such that the game information storage control unit 51 includes the wish list storage control unit 512, wherein the priority setting unit 52 sets priorities for the objects owned by the first order based on the second user's wish object information and the second user's owned object information of the second user's game information, in the order from the highest priority of a second user's wish object, an object not owned by the second user and an object owned by the second user. As described, by setting a priority for an object registered in a wish list by the user of gift destination among objects owned by the first user higher than a priority of any other object owned by the first user, it is possible to accurately reflect in the priority, the possibility of the object being wished by the user of gift destination.

Figure 20:
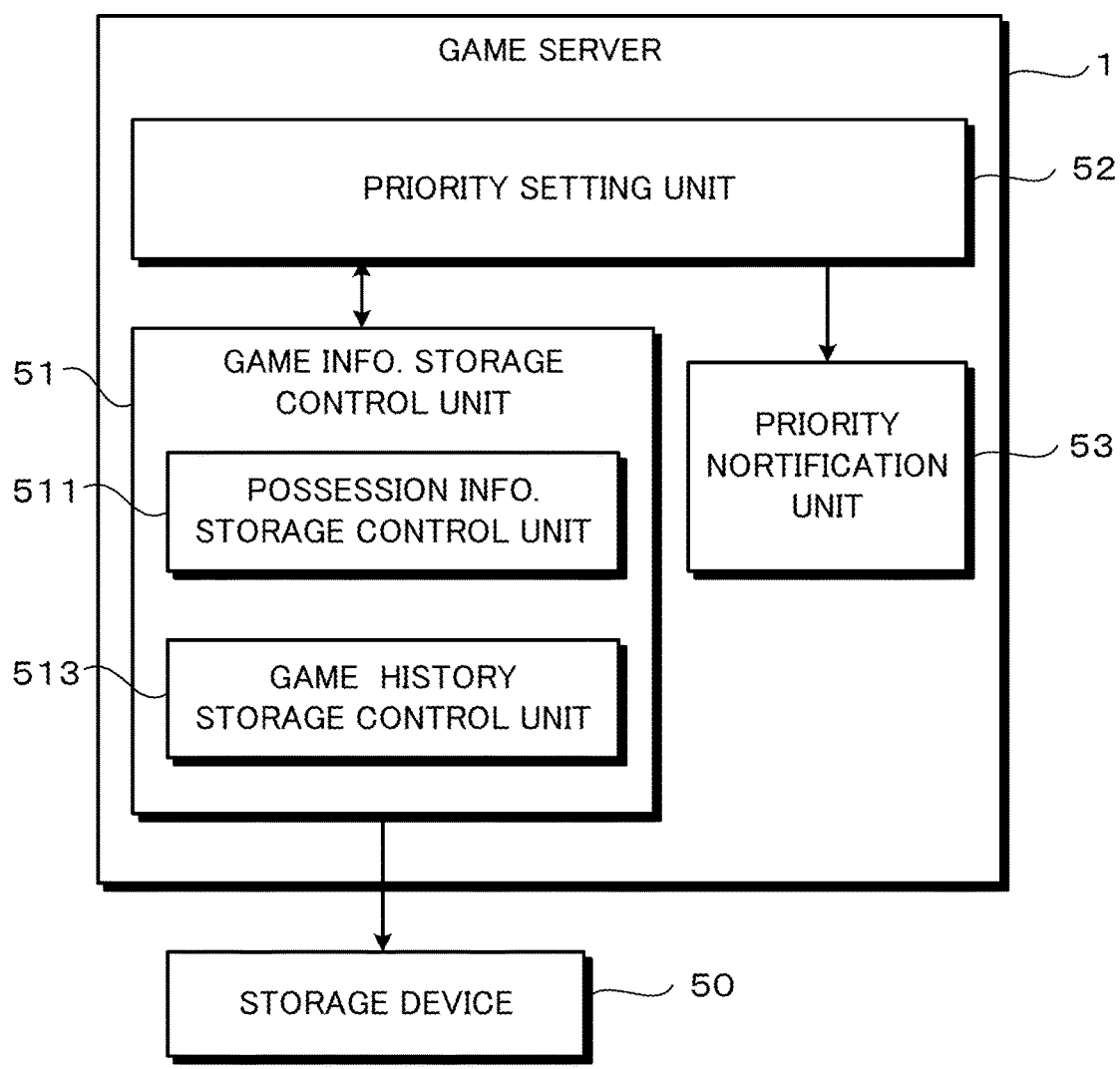
FIG. 20 is a functional block diagram showing another example of the functional configuration of the game management device.

Next, the configuration of setting priorities using the game history of the user's game information is explained. As shown in FIG. 20, the game information storage control unit 51 according to the present embodiment comprises a game history storage control unit 513. This game history storage control unit 513 has a function of storing each user's game history in the storage device 50 (the database server 2, etc.). Examples of the game history of the user include information on characters or items obtained in the game, information on characters or items used in the game, information deleted from the objects owned by the user as a result of being used in the game, and the like.

FIG. 21 shows an example of the game history (the game history for one user; in this example, the user with the user ID="00002") stored in the storage device 50 by the game history storage control unit 513. The game history storage control unit 513 associates the game history of the user with the user ID, and stores the association in a predetermined storage region of the storage device 50. FIG. 21 shows an example in which the game history information including various information such as the history ID, the obtained player card, the used player card, the deleted player card, the game mode, the time, etc.

The history ID is the information for uniquely identifying each user's game history, and the game server 1 manages each game history based on this history ID. The obtained card information is the player card ID of the player card obtained in the game by the user. The used card information is the player card ID of the player card used in the game by the user. The deleted card information is the player card ID of the player card deleted from the cards owned by the user as a result of being used in the game by the user. The game mode information is the information on the game mode (for instance, lottery, reinforcement, gift giving or selling mode) in which the player card is obtained, used or deleted. Time information is the information on time at which the processing in the target game mode is executed.

Like the case of history ID="1", in the case where a player card is obtained in the lottery mode, the corresponding player card ID is stored as an obtained player card. Like the case of history ID="2", in the case where a player card is obtained as a gift from other player, the corresponding player card ID is stored as an obtained player card. In this case, the information on the gift source user may be stored as well. Like the case of history ID="3", in the case where a player card is used by the user in the reinforcement mode, the corresponding player card ID is stored as a used player card. As will be explained later, in the reinforcement mode, the target player card for reinforcement and the player card of the reinforcing member are used, and both of these player cards are stored as the used cards. Here, the player card of the reinforcing member is deleted as a result of being used for reinforcement. Therefore, this player card is also stored as a deleted card. Like the case of history ID="5", in the case where a player card is sold without being used in the game by the user, the corresponding player card ID is stored as a deleted player card. Here, the action of selling indicates the action of exchanging the player card with points (reinforcement points, etc.) which can be sued in the game. Like the case of history ID="9", in the case where a player card is given as a gift to other user without being used in the game by the user, the corresponding player card ID is stored as a deleted player card. In this case, the information on the gift source user may be stored as well.

In this example, shown is the game history on player cards. However, a game history on other items may be adopted in the same manner.

The priority setting unit 52 according to the present embodiment sets priorities for player cards owned by the first user which are not owned by the second user based on the second user's game history of the second user's game information, such that the priority of an object which is used in the game in the past by the second user is set higher than the priority of an object not ever used in the game in the pasts by the second user. The priorities are set in the foregoing manner for the following reason.

Namely, it can be assumed that the second user wishes to use again the player card obtained and used in the game by the second user in the past but is not currently owned by the second user. On the other hand, for the object not ever used in the game in the past by the second user (for instance, an object not ever obtained in the past), it is unclear if the second user wishes to have it. Therefore, it is more likely that the second user is pleased with the former object (with higher possibility) than the latter object when the second user receives it as a gift. Therefore, the priority of the former object is set higher than the priority of the latter object.

An example of the priority setting processing according to the configuration of the present embodiment is explained with reference to the flowchart of FIG. 22. This flowchart shows another example of the step S52 of FIG. 15. This flowchart shows another example of the step S52 of FIG. 15. Also in this example, explanations are given through the case of performing an operation of selecting the user B in the terminal device 3 of the user A as an operation of selecting a user of gift destination.

Figure 22:
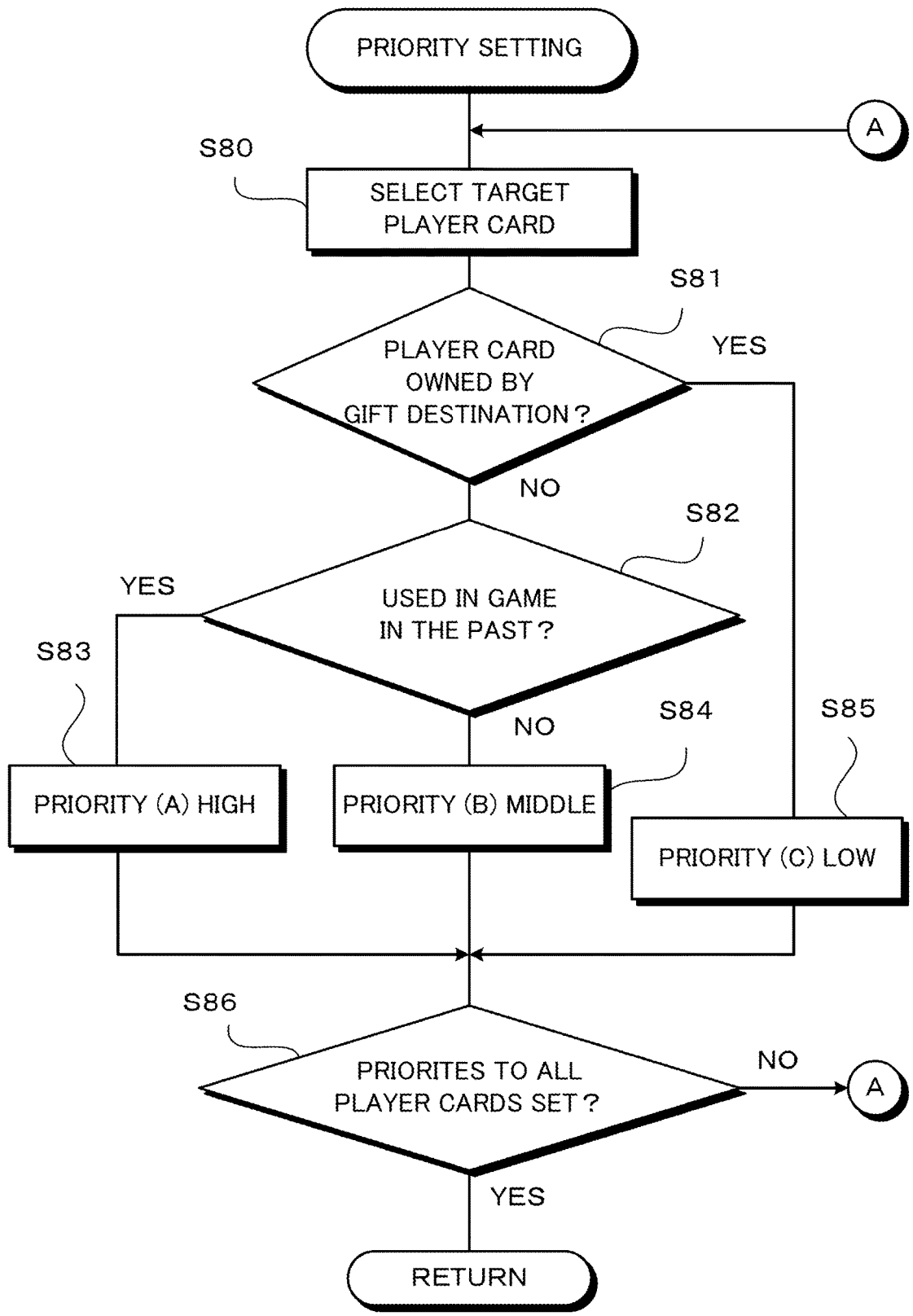
FIG. 22 is a flowchart showing another example of the priority setting processing.

As shown in FIG. 22, the priority setting unit 52 selects an arbitrary target player card for the priority setting processing from all player cards owned by the user A (S80). Then, for the selected player card of the user A, the processing in steps S81 to S85 is executed.

The priority setting unit 52 determines based on the information on the player cards owned by the user B, if each player card of the user A (the target player card for the priority setting processing) is the player card owned by the user B (S81). If the player card of the user A is a player card not owned by the user B (S81; NO), the priority setting unit 52 determines based on the game history of the user B (see FIG. 21), if the player card of the user A is a player card used in the game in the past by the user B (S82). If the same player card as the player card of the user A was used in the game in the past by the user B (S82; YES), the priority setting unit 52 sets the priority of the player card of the user A to "(A) high" (S83). On the other hand, if the same player card as the player card of the user A is a player card not ever used in the game in the past by the user B (S82; NO), the priority setting unit 52 sets the priority of the player card of the user A to "(B) middle" (S84).

Furthermore, if the player card of the user A is a player card owned by the user B (S81; YES), the priority setting unit 52 sets the priority of the player card of the user A to "(C) low". As described, the priority setting unit 52 sets the priority of the player card used in the game in the past by the user B to be higher than the priority of the player card not ever used in the game in the past by the user B.

Thereafter, it is determined if the priority setting process has been completed for all player cards owned by the user A (S86). If NO in this step S86, the priority setting unit 52 goes back to step S80, and the processing in steps S80 to S86 is repeated until the priority setting process has been completed for all player cards owned by the user A. Then, if YES in step S86, the sub routine is ended. Then, the sequence goes back to step S53 of FIG. 15.

Figure 23:
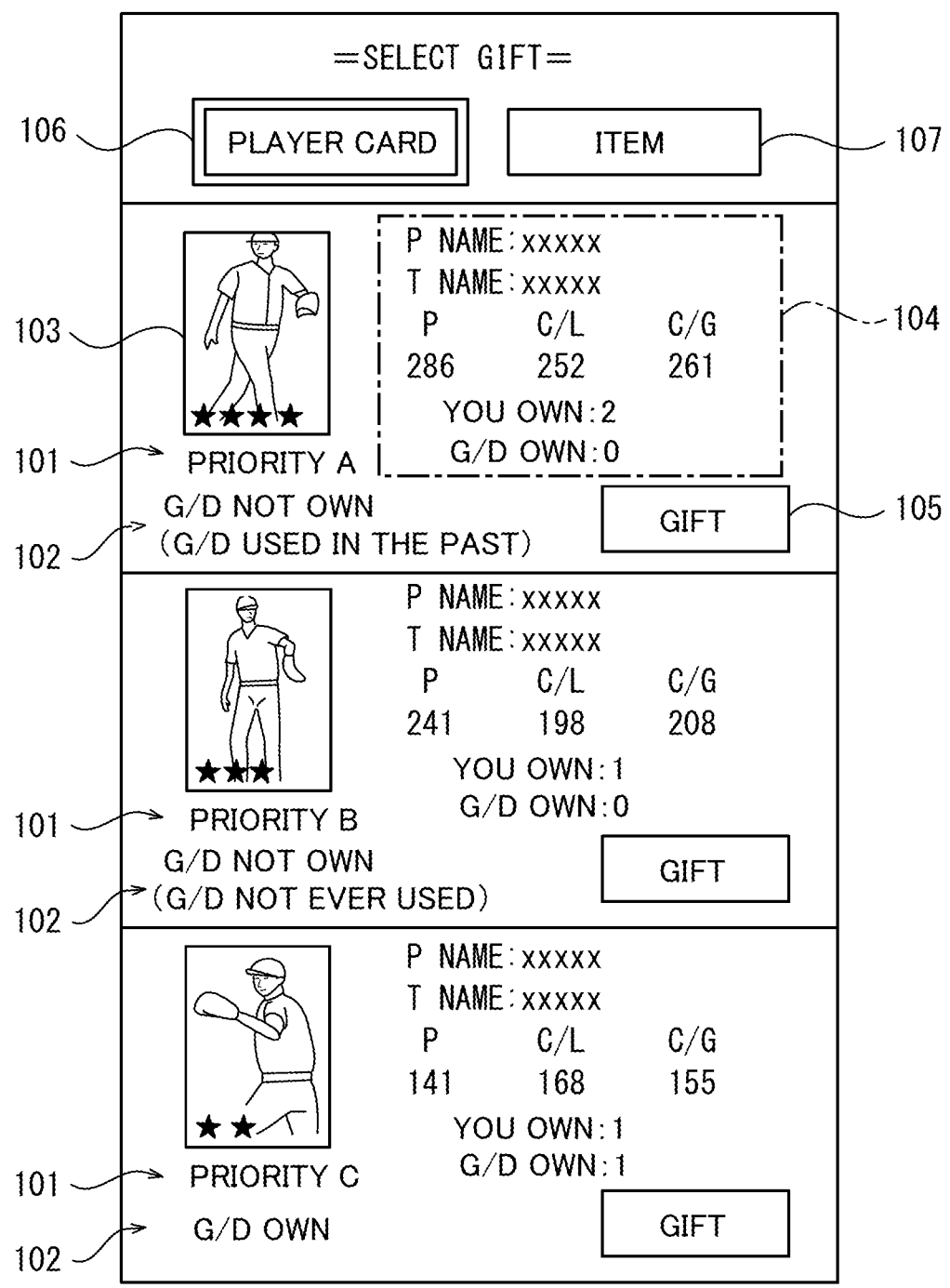
FIG. 23 is an explanatory diagram showing another example of the gift selection screen.

FIG. 23 shows an example of notifying the set priorities according to the present embodiment. FIG. 23 shows the gift selection screen for displaying a list of player cards owned by the user A in the order from the highest priority. In this screen, displayed are a priority information 101 ("priority A", "priority B", and "priority C" in this order from the highest priority) set for each of the player cards owned by the user A, and a criteria information 102 indicative of the criteria for setting the priority. In this example, for the criteria information 102 for setting the "priority A", displayed is a message "the player card is not owned by the gift destination" (used by the gift destination in the past); for the criteria information 102 for setting the "priority B", displayed is a message "the player card is not owned by the gift destination (not ever used by the gift destination in the past); and for the criteria information 102 for setting the "priority C", displayed is a message "the player card is owned by the gift destination".

As described, as shown in FIG. 20, the game management device according to the present embodiment is configured such that the game information storage control unit 51 includes the game history storage control unit 513, wherein the priority setting unit 52 sets, based on the second user's game history of the second user's game information, the priorities of the objects owned by the first user, which are not owned by the second user such that the priority of an object used in the game in the past by the second user is set higher than the priority of an object not ever used in the game in the pasts by the second user. With this configuration, it is possible to accurately reflect in the priority, the possibility of the object being wished by the user of gift destination.

This configuration can be combined with each of the foregoing configurations of the embodiment. For instance, the configuration in which the priority of "the second user's wish object" is given the highest priority can be applied to this embodiment. In this case, priorities are set to objects in the order from the highest priority of; "the second user's wish object", "the object not owned by the second user which was used by the second user in the past", "the object not owned by the second user which has not ever used in the game by the second user", and "the object owned by the second user".

Figure 24:
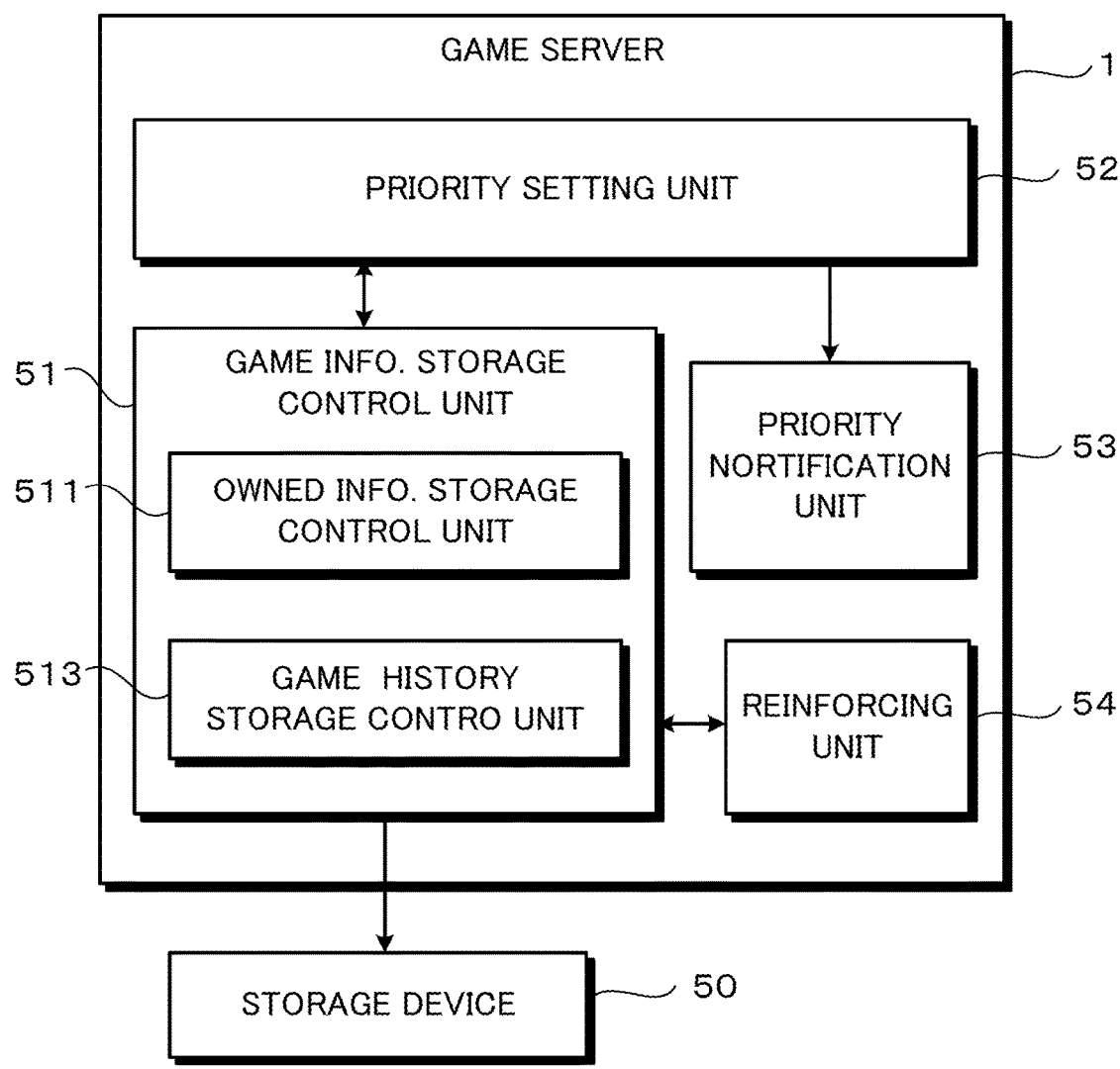
FIG. 24 is a functional block diagram showing another example of the functional configuration of the game management device.

Next, the configuration of setting priorities using the game history of the game is explained in which the target player card for reinforcement can be reinforced using the player card as the reinforcing member. As shown in FIG. 24, the game server 1 according to the present embodiment includes a reinforcing unit 54.

In the present embodiment, the user can perform a reinforcing operation by specifying a target object for reinforcement and a reinforcing member for reinforcing the target object from among the objects owned by the user (player cards in this embodiment). The reinforcing unit 54 has a function of executing a reinforcing processing according to the above information on the reinforcing operation, to improve the ability of the target object based on the ability of the reinforcing member, and to delete the reinforcing member from the objects owned by the user. This reinforcing processing is so-called a synthesizing processing between player users.

An example of the reinforcing processing by the reinforcing unit 54 is shown. In this example, the reinforcing unit 54 executes the arithmetic operation:

$$C1 \leftarrow C1 + a \times C2,$$

wherein C1 is an ability value of the player card of the target object for reinforcement, C2 is an ability value of the player card of the reinforcing member, and a is a variable number (for instance, $0.05 \leq a \leq 0.2$), and 5% to 20% of the ability value of the player card of the reinforcing member is added to the ability value of the target player card for reinforcement. However, this is merely an example, and a reinforcing processing based on other data processing may be executed.

As a result of performing the reinforcement processing, the player card used for the reinforcing member is deleted from the objects owned by the user, and it is no longer possible to use this player card in the game. Here, it may be configured that only the browsing of this player card is permitted for the collection of player cards owned in the past.

The priority setting unit 52 according to the present embodiment sets the priorities for the player characters owned by the first user in the following manner. That is, the priority setting unit sets priorities of objects not owned by the second user among the objects owned by the first user respectively, based on the second user's game history of the second user's game information in the order from the highest priority of "an object obtained in the past and used as the reinforcing member in the game by the second user", "an object not ever obtained in the past", and "an object obtained in the past by the second user but released without being used in the game. The priorities are set in this manner for the following reason.

That is, for the object such as a character, an item or the like obtained in the past and not currently owned as being used as the reinforcing member in the game by the second user, it is very likely that the second user actually wishes to use the object again for the reinforcing member. On the other hand, for the object not ever obtained by the second user in the past, it is uncertain if the user wishes to have such object. On the other hand, the "object obtained in the past by the second user but released without being used as the reinforcing member in the game" can be assumed to be an unnecessary object for the second user. Therefore, in consideration of the possibility of being wished by the user of gift destination, the priorities are set in the above order from the highest priority.

An example of the priority setting processing according to the configuration of the present embodiment is explained with reference to the flowchart of FIG. 25. This flowchart shows another example of the step S52 of FIG. 15. Also in this example, explanations are given through the case of performing an operation of selecting the user B in the terminal device 3 of the user A as an operation of selecting a user of gift destination.

Figure 25:
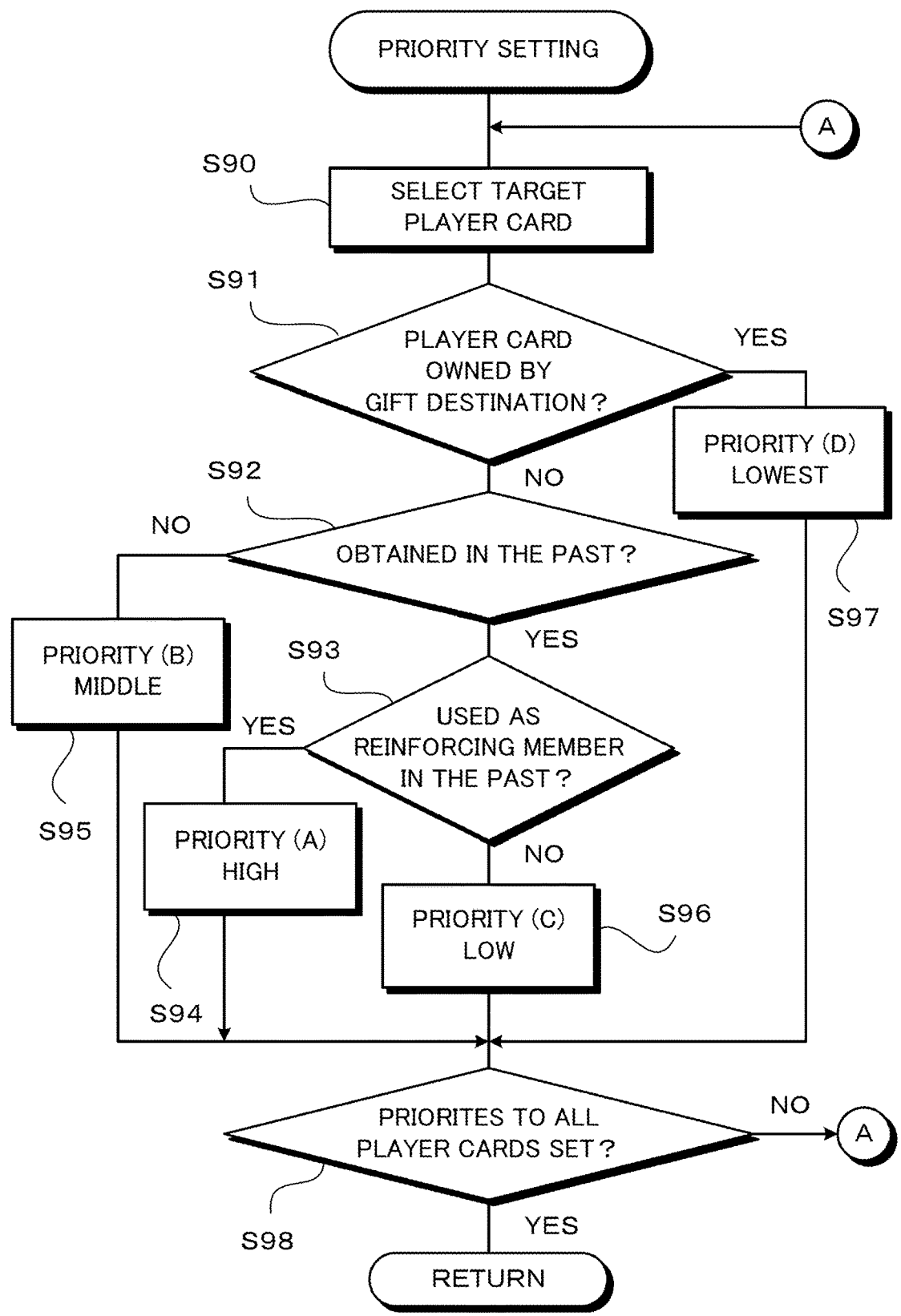
FIG. 25 is a flowchart showing another example of the priority setting processing.

As shown in FIG. 25, the priority setting unit 52 selects an arbitrary target player card for the priority setting processing from all player cards owned by the user A (S90). Then, for the selected player card of the user A, the processing in steps S91 to S97 is executed.

The priority setting unit 52 determines based on the information on the player cards owned by the user B, if each player card of the user A (the target player card for the priority setting processing) is the player card owned by the user B (S91). If the player card of the user A is a player card not owned by the user B (S91; NO), the priority setting unit 52 determines based on the game history of the user B (see FIG. 21), if the player card of the user A is the player card obtained in the past by the user B (S92). If YES in this step S92, the priority setting unit 52 determines based on the game history of the user B, if the player card of the user A is the player card used in the game in the past as the reinforcing member by the user B (S93). If the same player card as the player card of the user A was used for the reinforcing member in the game in the past by the user B (S93; YES), the priority setting unit 52 sets the priority of the player card of the user A to "(A) high" (S94). On the other hand, the player card of the user A is a player card not ever obtained in the game in the past by the user B (S92; NO), the priority setting unit 52 sets the priority of the player card of the user A to "(B) middle" (S95). Furthermore, if the same player card as the player card of the user A is a player card deleted by selling it, for instance without being used for the reinforcing member in the game in the past by the user B (S93; NO), the priority setting unit 52 sets the priority of the player card of the user A to "(C) low".

If the player card of the user A is a player card owned by the user B (S91; YES), the priority setting unit 52 sets the priority of the player card of the user A to "(D) lowest".

Thereafter, it is determined if the priority setting process has been completed for all player cards owned by the user A (S98). If NO in this step S64, the priority setting unit 52 goes back to step S98, and the processing in steps S90 to S98 is repeated until the priority setting process has been completed for all player cards owned by the user A. Then, if YES in step S98, the sub routine is ended. Then, the sequence goes back to step S53 of FIG. 15.

Figure 26:
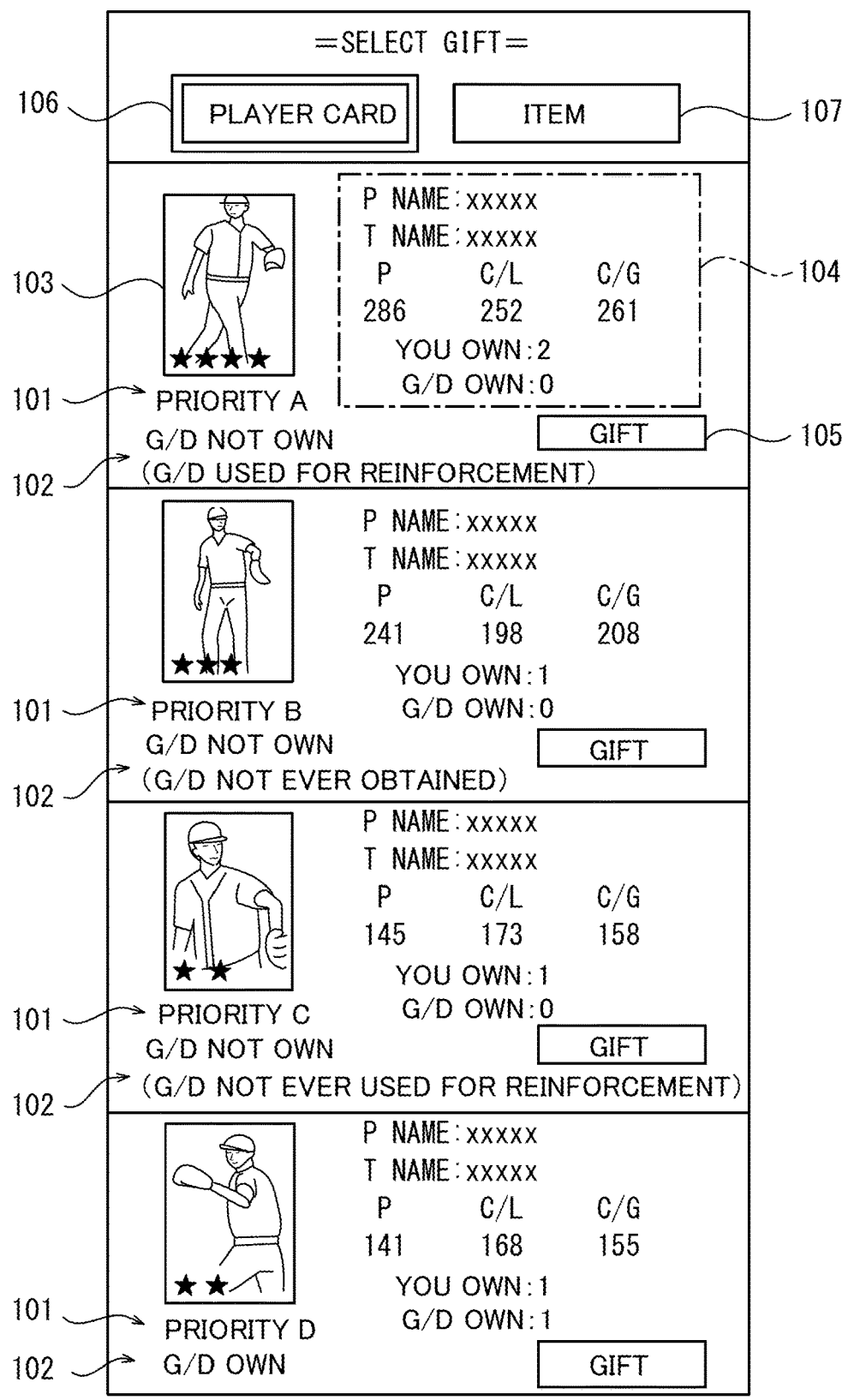
FIG. 26 is an explanatory diagram showing another example of the gift selection screen.

FIG. 26 shows an example of notifying the set priorities according to the present embodiment. FIG. 26 shows the gift selection screen for displaying a list of player cards owned by the user A in the order from the highest priority. In this screen, displayed are a priority information 101 ("priority A", "priority B", "priority C", and "priority D" in this order from the highest priority) set for each of the player cards owned by the user A, and a criteria information 102 indicative of the criteria for setting the priority. In this example, for the criteria information 102 for setting the "priority A", displayed is a message "the player card is not owned by the gift destination (used by the gift destination for reinforcement in the past); for the criteria information 102 for setting the "priority B", displayed is a message "the player card is not owned by the gift destination (not ever obtained by the gift destination in the past); for the criteria information 102 for setting the "priority C", displayed is a message "the player card is not owned by the gift destination (not ever used for reinforcement by the gift destination in the past); and for the criteria information 102 for setting "priority C", displayed is a message "the player card is owned by the gift destination".

As described, as shown in FIG. 24, the game management device according to the present embodiment further comprises the reinforcing unit 54, wherein the priority setting unit 52 sets priorities for objects not owned by the second user among the objects owned by the first user respectively based on the second user's game history of the second user's game information in the order from a highest priority of; an object obtained in the past and used as the reinforcing member in the game by the second user, an object not ever obtained in the past, and an object obtained in the past by the second user but released without being used in the game. As described, by setting the priorities for player cars or the like based on the game history indicating if each character or the like was used as a reinforcing member in the past, it is possible to accurately reflect in the priorities, the possibility of the object being wished by the user of gift destination.

The foregoing configuration may be applied in combination with each of the above-described configurations of the embodiment. Specifically, the configuration in which the highest priority is set for the second user's wish object may be applied to the foregoing configuration.

Next, in the game in which the objects which can be owned in the game by each user include an object to which a rarity level indicative of a level of rarity of the object is set, the configuration of setting priorities based on the rarities is explained.

In the present embodiment, a rarity level is set to each of the player cards owned by the user. For instance, five levels are set for rarity: 1 (the number of stars displayed on the player card is 1) to 5 (the number of stars displayed on the player card is 5). In general, the higher the rarity level is, the more each user is likely to obtain. Here, the priority setting unit 52 according to the present embodiment sets a priority to the object not owned by the second user among the objects owned by the first user such that the higher the rarity level is, the higher the priority is.

An example of the priority setting processing according to the configuration of the present embodiment is explained with reference to the flowchart of FIG. 27. This flowchart shows another example of the step S52 of FIG. 15. Also in this example, explanations are given through the case of performing an operation of selecting the user B in the terminal device 3 of the user A as an operation of selecting a user of gift destination.

Figure 27:
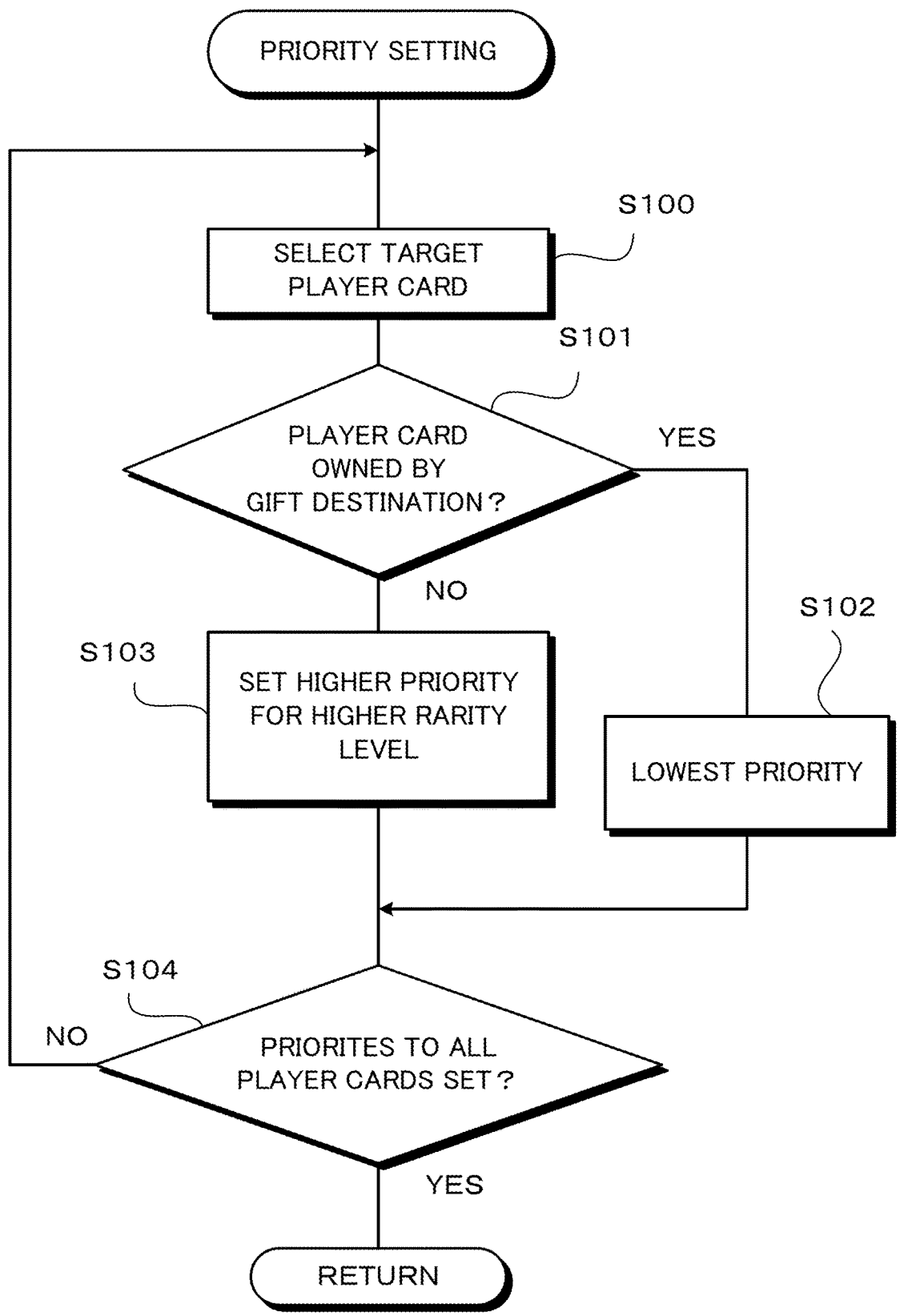
FIG. 27 is a flowchart showing another example of the priority setting processing.

As shown in FIG. 27, the priority setting unit 52 selects an arbitrary target player card for the priority setting processing from all player cards owned by the user A (S100). Then, for the selected player card of the user A, the processing in steps S101 to S103 is executed.

The priority setting unit 52 determines based on the information on the player cards owned by the user B, if each player card of the user A (the target player card for the priority setting processing) is the player card owned by the user B (S101). If the player card of the user A is the player card owned by the user B (S101; YES), the priority setting unit 52 sets the priority of the player card of the user A to "lowest" (S102). On the other hand, when the player card of the user A is the player card not owned by the user B (S101;

NO), the priority setting unit 52 sets the priority such that the higher is the rarity level of the player card, the higher the priority is (S103).

Thereafter, it is determined if the priority setting process has been completed for all player cards owned by the user A (S104). If NO in this step S104, the priority setting unit 52 goes back to step S100, and the processing in steps S100 to S104 is repeated until the priority setting processing has been completed for all player cards owned by the user A. Then, if YES in step S104, the sub routine is ended. Then, the sequence goes back to step S53 of FIG. 15.

As described, the priority setting unit 52 according to the present embodiment sets priorities of the objects owned by the first users which are not owned by the second user such that the higher is the rarity level of the object, the higher the priority is. Therefore, it is possible to accurately reflect what are likely to be wished by the second user into the priorities.

The foregoing configuration may be applied in combination with each of the above-described configurations of the embodiment. Specifically, the configuration in which the highest priority is set for the second user's wish object may be applied to the foregoing configuration.

Furthermore, it may be configured such that the user is allowed to arbitrary switch the criteria for setting priorities for the objects not owned by the second user either between the criteria based on the rarity level in the order from the highest rarity level, and the criteria based on the game history. Namely, it may be configured such that the criteria for setting priorities can be changed or customized by the user's operation using the terminal device 3.

For instance, in the priority setting screen of FIG. 28 displayed in the terminal device 3, the user confirms the criteria for setting priorities which can be changed as necessary. In the example of the screen of FIG. 28, displayed are option buttons 111 and 112 which allow a user to select either one of the criteria for setting priorities for the player cards not owned by the gift destination, i.e., the user wishes to set priorities based on the play history (game history) of the gift destination) or based on the rarity of the player card in order from the highest rarity. Specifically, it may be configured such that the option button 111 is selected in the default state, and the user is allowed to change the criteria for setting priorities as necessary. When an operation of changing the criteria for setting priorities is performed using the terminal device 3 of the user, the game server 1 applies the change in criteria for setting priorities according to the information on the operation.

Next, explained is the configuration wherein the player cards owned by the user of gift destination are not displayed on the gift selection screen.

Among the player cards owned by the first user, for the player card already owned by the second user, it is very likely that the second user will not be pleased even if it is given as a gift from the first player. In view of this, the priority notification unit 53 according to the present embodiment is configured such that when sending to the terminal device 3 of the first user, the display control information (for instance, the gift selection screen data described in HTML) for displaying the player cards owned by the first user based on the respective priorities set therefor, the information on the player cards owned by the second user is not included in the display control information.

An example of the priority setting processing according to the configuration of the present embodiment is explained with reference to the flowchart of FIG. 29. Also in this example, explanations are given through the case of performing an operation of selecting the user B in the terminal device 3 of the user A as an operation of selecting a user of gift destination.

Figure 29:
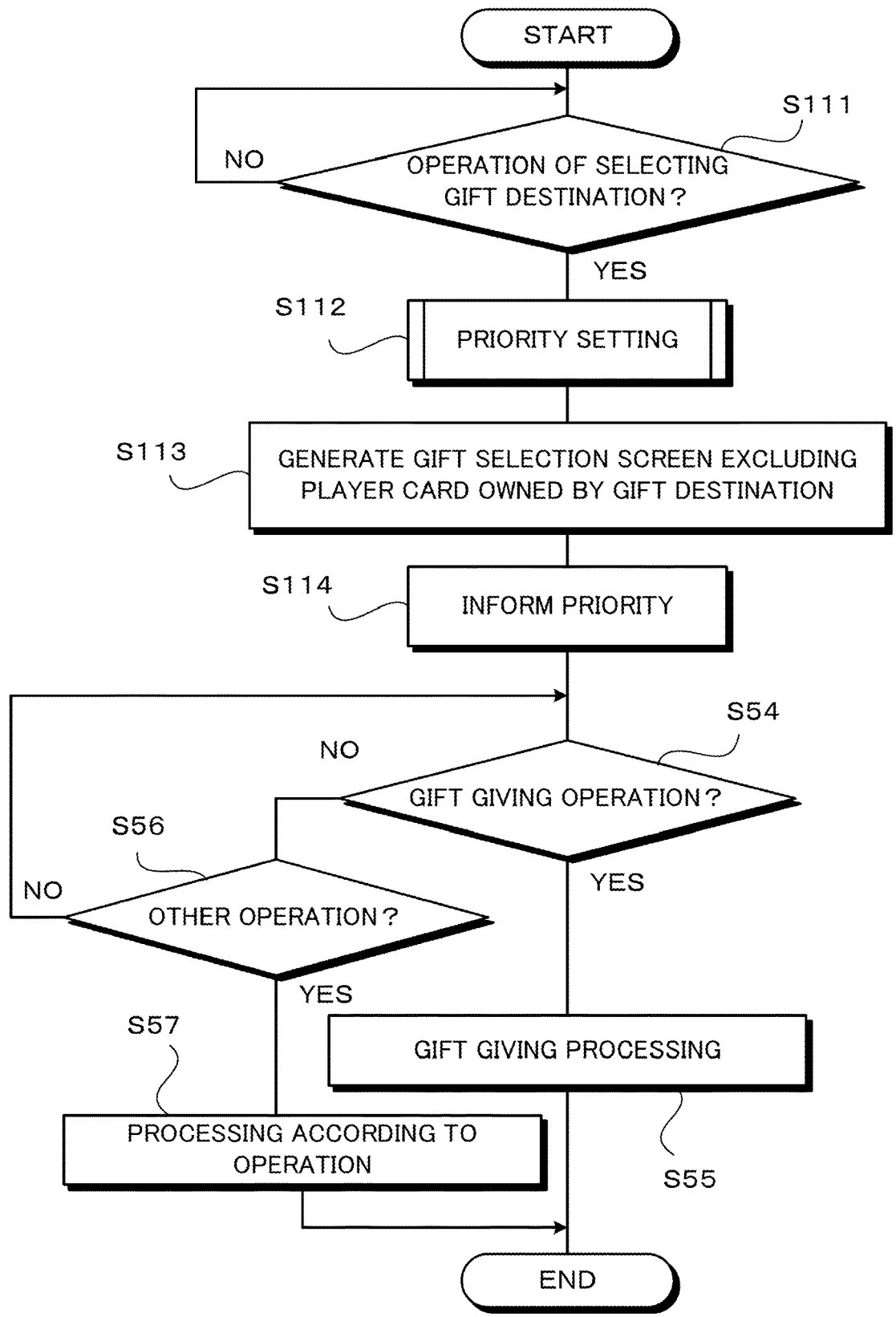
FIG. 29 is a flowchart showing another example of the processing of the game server.

As shown in FIG. 29, upon receiving the information on the gift destination selecting operation (S111), the game server 1 sets proprieties for recommendation for a gift to the user B for the objects owned by the user A based on the user B's game information (S112). Thereafter, the priority notification unit 53 generates the gift selection screen data (display control information) for the screen data for notifying the priorities set for respective player cards of user A. In this gift selection screen, the player cards of the user A listed in the order, for example, from the highest priority are displayed, without including the player cards owned by the user B. Namely, the priority notification unit 53g generates the gift selection screen excluding the player card owned by the user B (S113). Then, the priority notification unit 53 sends the gift selection screen data thus generated to the terminal device 3 of the user A to notify the priorities (S114).

Figure 15:
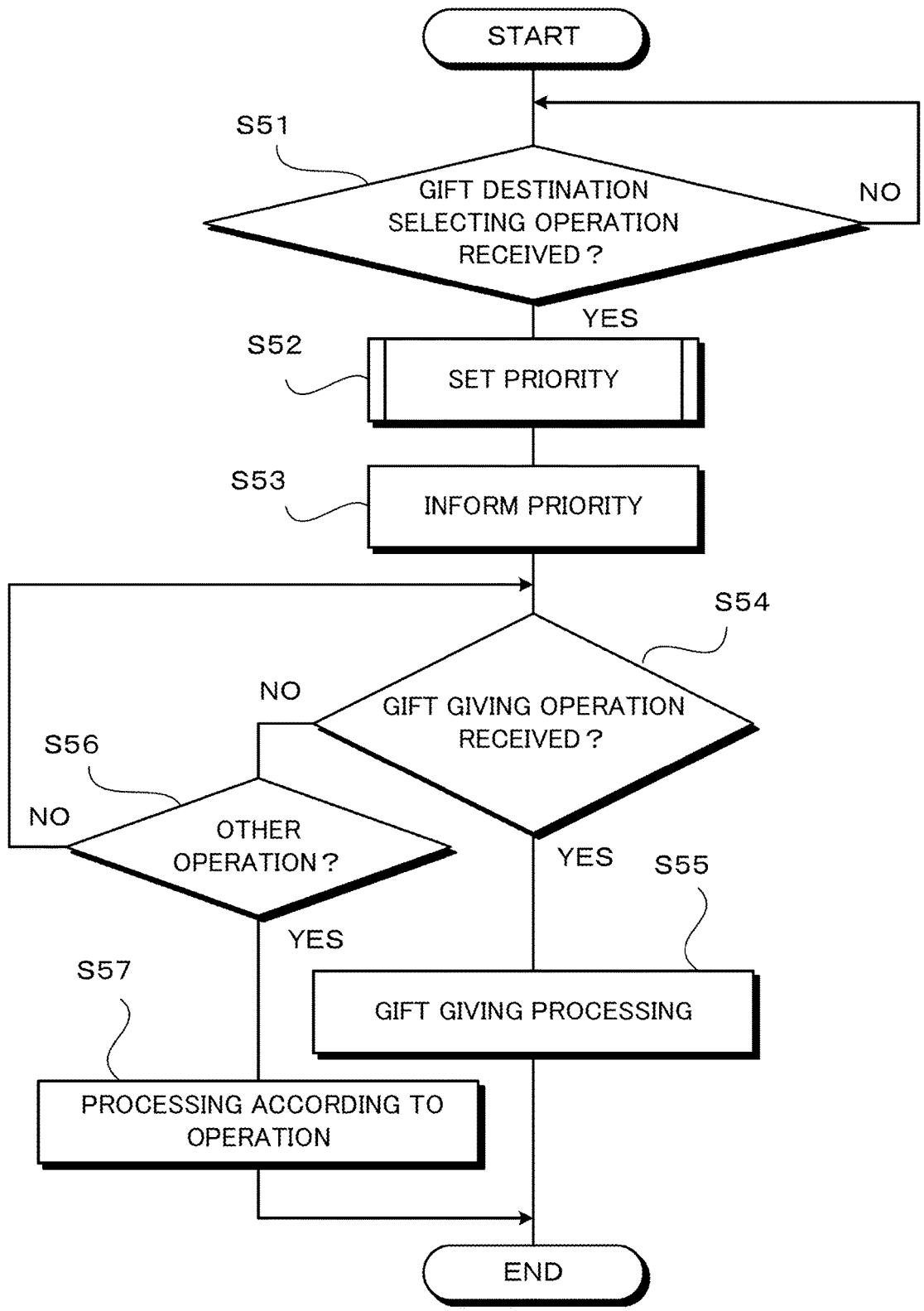
FIG. 15 is a flowchart showing an example of the processing of the game server.

The subsequent processing in steps S54 to S57 is the same as the processing in the flowchart of FIG. 15, and therefore the explanations thereof are omitted here.

Furthermore, it may be configured to allow a user to select whether or not to display the player cards owned by the gift destination by switching as described in the gift selection screen. For instance, in the example of the screen of FIG. 28, displayed are option buttons 113 and 114 which allow a user to select either one of the mode in which the player cards owned by the gift destination are displayed and the mode in which the player cards owned by the gift destination are not displayed in the priority setting screen of FIG. 28. It may be further configured such that in the default state, the option button 114 is selected (namely, the player cards owned by the gift destination are not displayed), and the user is allowed to change the mode as necessary.

As described, the priority notification unit 53 according to the present embodiment is configured such that when sending to the terminal device 3 of the first user, the display control information (for instance, the gift selection screen data) for displaying the objects owned by the first user based on the respective priorities set therefor, displayed based on the priority, the information on the objects owned by the second user is not included in the display control information. With this structure, in the terminal device 3 of the first user, from among the objects owned by the first user, only the objects which are not owned by the second user are displayed for candidate gifts. As a result, it is possible to avoid such situation of giving as a gift, the same object such as an item or the like as the object already owned by the second user.

Next, explained is the configuration of setting priorities using the information on user wish attributes (the team attribute in the present embodiment).

By performing an operation using the terminal device 3 of the user, each user is allowed to register any one of the plurality of attributes as the user's wish attribute. In the present embodiment, each user is allowed to register any one of the team attributes (for instance, 12 team attributes corresponding to 12 professional baseball teams in Japan in the real world). For instance, when a user plays a first game after the user has been registered for the game service, the user is allowed to register a desired team attribute.

Figure 30:
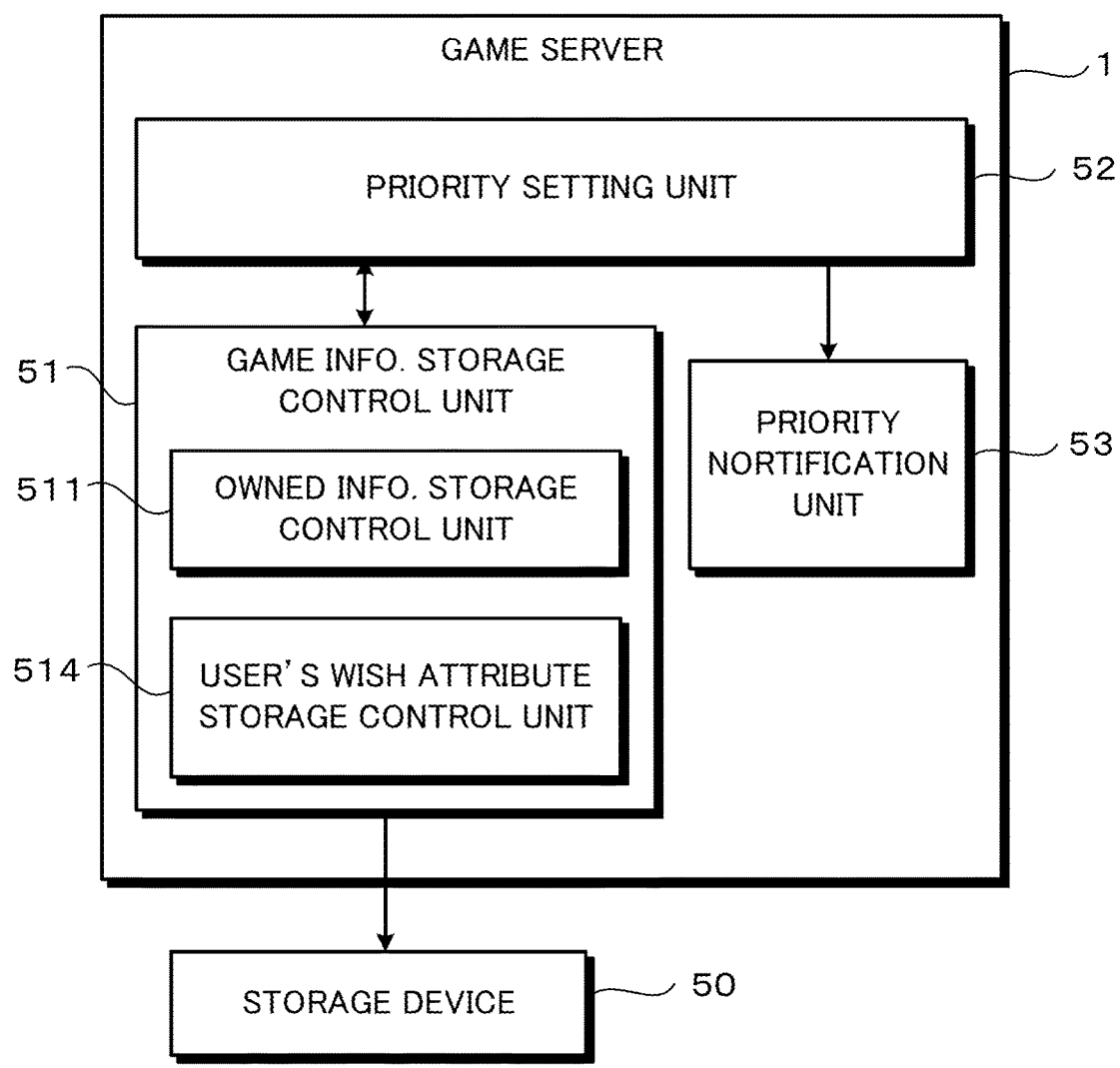
FIG. 30 is a functional block diagram showing another example of the functional configuration of the game management device.

As shown in FIG. 30, the game information storage control unit 51 according to the present embodiment comprises a user's wish attribute storage control unit 514. This user's wish attribute storage control unit 514 has a function of storing in the storage device 50, any one of the plurality of team attributes as an each user's desired attribute, according to the attribute registration request from the terminal device 3 which is operated by each user. For instance, as shown in FIG. 7, the user's wish attribute storage control unit 514 associates the user's desired team attributes with the user's IDs respectively, and stores the association in a predetermined storage region of the database server 2.

Furthermore, the player cards according to the present embodiment are player character cards corresponding to existent players who belong to any one of the 12 professional baseball teams in Japan in the real world. Therefore, any one of the plurality of team attributes is set for each player card owned in the game by each user.

The priority setting unit 52 according to the present embodiment is configured to set priorities based on the second user's wish team attribute of the second user's game information such that the priority of the player character owned by the first user which has the same team attribute as the second user's wish attribute is set higher than the priority of the player character owned by the first user which has a different team attribute from the second user's wish attribute. As described, among objects owned by the first user, by setting priority of the player character having the same team attribute as the wish team attribute registered by the gift destination is set higher than the priority of the player character having other team attribute, it is possible to accurately reflect the gift destination wish object into the priority.

This configuration can be combined with each of the foregoing configurations of the embodiment. For instance, this configuration (the priority setting in consideration of desired team attributes) can be applied to the case of the above described embodiment in which a plurality of player cards having the same priority exist as a result of setting priorities to the player cards owned by the first user, and therefore further priorities are set based on other criteria for these player cards having the same priority.

In the above example, explanations have been given through the case of setting priorities using information on user's wish team attribute. However, other attributes than the team attribute may be adopted. For instance, the foregoing configuration of setting priorities may be applied in a game in which three attributes are provided: the attribute A (the attribute A has a good affinity to the attribute B but has a bad affinity to the attribute C); the attribute B (the attribute B has a good affinity to the attribute C but has a bad affinity to the attribute A); and the attribute C (the attribute C has a good affinity to an attribute A but has a bad affinity to an attribute B), and further any one of these three attributes is applied to a character, an item or the like. Namely, in the game in which a user is allowed to register any one of the attributes A, B and C as desired, it is possible to set priorities in the same manner as the case of using team attributes.

As described, the objects which can be owned in the game by each user include an object to which any one of a plurality of attributes is set, and the game management device according to the present embodiment further comprises the user's wish attribute storage control unit 514 for storing an each user's wish attribute of any one of the plurality of attributes in the storage device 50 according to an attribute registration request from the terminal device 3 operated by each user, wherein the priority setting unit 52 sets attributes based on the second user's wish attribute such that the priority of the object having the same attribute as the second user's wish attribute is set higher than the priority of the object having a different attribute from the second user's wish attribute. With this configuration, it is possible to reflect the information on the gift destination wish attribute into the polarity.

Furthermore, it is natural to assume that the first user does not wish to release the player card having the same team attribute as the first user's wish attribute. In view of this, in the above configuration of the present embodiment, a plurality of player cards having the same priority exist as a result of setting priorities for the player cards owned by the first user, and therefore further priorities are set based on other criteria for these player cards having the same priority that the priority of the player card having the same team attribute as the first user's team attribute is set lower than the priority of player cards having other team attributes than the first user's team attribute. With this configuration, it is possible to set priorities in consideration of what the first user is less likely to wish to release it (an object having the same polarity as the first user's wish attribute). In this configuration, not only the player cards but also other items may be adopted in the same manner.

This configuration can be combined with each of the foregoing configurations of the embodiment. For instance, this configuration (the priority setting in consideration of desired team attributes) can be applied to the case of the above described embodiment in which a plurality of player cards having the same priority exist as a result of setting priorities to the player cards owned by the first user, and therefore further priorities are set based on other criteria for these player cards having the same priority.

Indeed, it is preferable that an object having a second user's wish attribute is given a higher priority. Therefore, when setting priorities for the objects owned by the first user, it is preferable to set priorities for an object having the second user's wish attribute, an object having other attribute than the first user's wish attribute, and an object having the first user's wish object in this order from the highest priority.

Next, explained is the configuration of setting priorities based on the first user's game history, in which objects which can be given as gifts are the objects whose attributes can be changed in the game (player cards in the present embodiment).

Each player card according to the present embodiment has the attribute of capability, and the attribute of capability of the target player card for reinforcement can be changed (improved) by synthesizing the player cards while playing a game in the above described reinforcement mode of the game. As described, according to the present embodiment, objects whose attributes can be changed while playing a game by the user (attribute changeable objects) are subjected to gifts, for which priorities are set by the priority setting unit 52.

Examples of target gifts include other than player cards of the present embodiment, characters in various sports games, combat games, or the like, whose attributes can be changed (improved) by virtually training them in a predetermined mode (a developing mode, a training mode, a practice mode, etc.). Other examples of the target gifts include an item for adding a special ability to a character equipped with the item (for instance, a baseball glove, baseball spikes in a baseball game), which is capable of changing the attribute of the special ability by virtually using or maintaining it in the game; in games of growing plants, characters of plants whose attributes of leaves, flowers, and numbers or sizes of fruits correspond to the above objects; in games of growing characters imitating animals, human being, characters whose attributes such as the size (height, weight), ages, etc., can be changed; in cooking games, items of dishes, which can change the attribute of taste (sweet taste, hot taste, etc.).

These are merely examples, and other attribute variable objects such as characters, items or the like whose attributes can be changed in the game would fall under the objects which can be given as gifts (targets objects for which priorities are set).

As shown in FIG. 20 or FIG. 24, the game information storage control unit 51 according to the present embodiment includes a game history storage control unit 513 for storing each user's game history in the storage device 50. Here, examples of the user's game information include the information indicative of that an attribute of an object owned by the user has been changed (i.e., reinforced, trained, etc.) in the game. In the present embodiment, for the information indicative of that the capability of the player card has been changed, the game history including indicative of that the player card has been reinforced is stored in the storage device 50 in the game history storage control unit 513. For instance, in the example of the game history shown in FIG. 21, the information of history ID="3", and history ID="7" is stored in the storage device 50 as the information indicative of that the player card with the player card ID="0007" is stored in the storage device 50.

Then, in the case where a plurality of objects having the same priority exist as a result of setting the priorities based on the second user's game information for the objects owned by the first user, the priority setting unit 52 according to the present embodiment further set priorities for the objects having the same priority set based on the second user's game information in the following manner. That is, based on the first user's game information, the priority setting unit 52 sets the priority of the object having a used history for reinforcement (the attribute thereof has been changed) in the game by the first user is set lower than the priority of the object without having the used history for reinforcement has been changed in the game by the first user. The priorities are set in this manner for the following reason.

Namely, it is likely that the first user is going to use the player character which has been reinforced in the game by the first user. Namely, it is likely that the first user wishes to keep such player card, and therefore, the priority for recommendation as a gift target is set to be relatively low. On the other hand, it is less likely that the first user will use a player character which does not have a used history for reinforcement by the first user than the player card which has a used history for reinforcement by the first user. Therefore, it can be assumed that the player card which has not been reinforced is a player card which the first user can give for a gift. Therefore, the priority for recommendation for a gift of the player card which has not been reinforced by the first user is set higher than the player card which has been reinforced by the first user.

Figure 31:
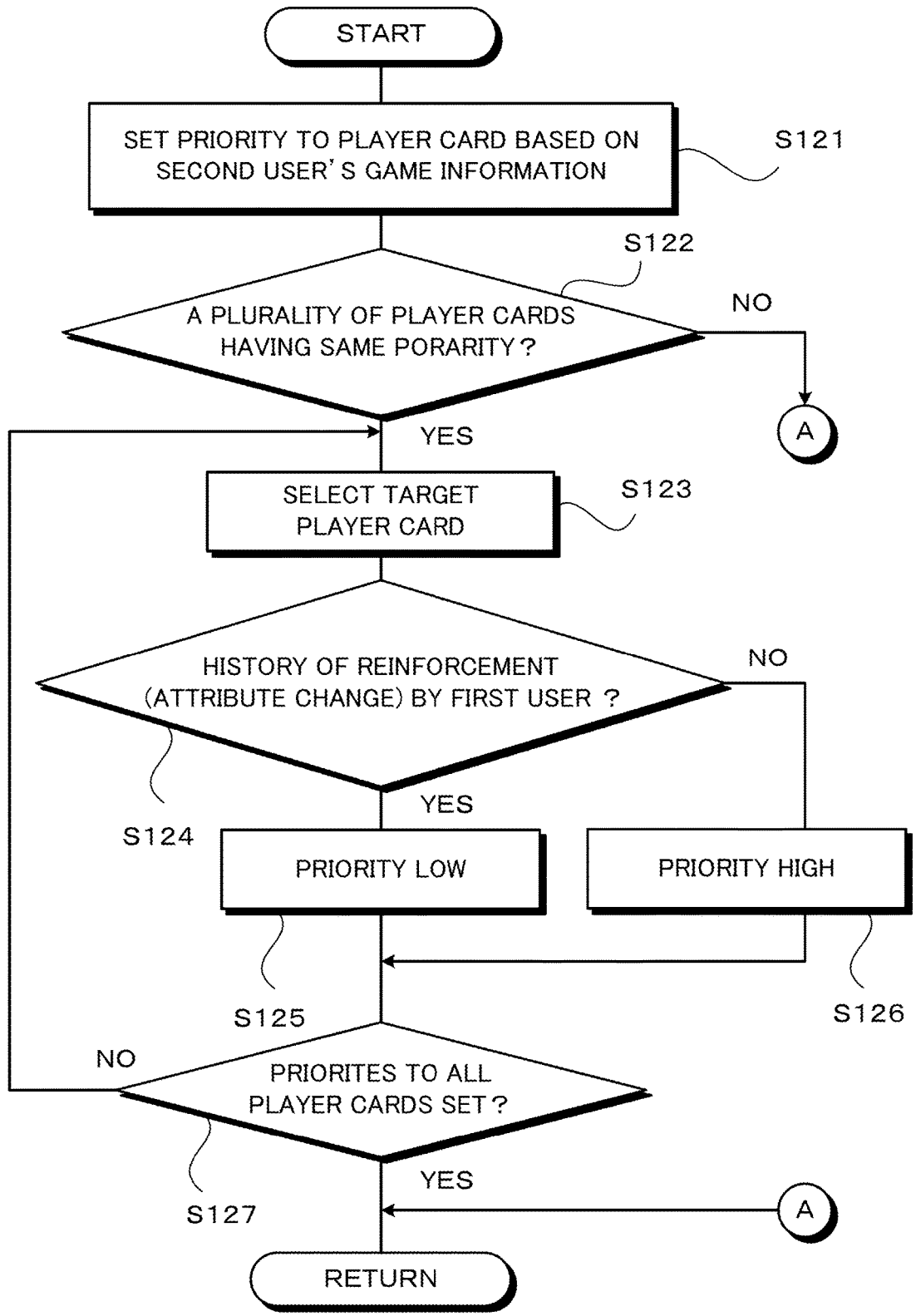
FIG. 31 is a flowchart showing another example of the priority setting processing.

An example of the priory setting processing according to the present embodiment of is explained with reference to the flowchart of FIG. 31.

First, the priority setting unit 52 sets priorities for all the player cards owned by the first user based on the second user's game information (S121). For this priority setting processing in this step S121, the processing in the flowcharts shown in FIG. 16, FIG. 18, FIG. 22, FIG. 25, FIG. 27, etc., can be applied.

As a result of the priority setting processing in step S121, if a plurality of player cards are given the same priority (S122; YES), the priority setting unit 52 sets priorities based on other criteria in the loop processing of steps S123 to S27 for the player cards having the same priority. For instance, considered is the case where the number of player cards having the priority "(A) high" is "a", the number of player cards having the priority "(B) middle" is "b", and the number of player cards having the priority "(C) low" is "c", as a result of setting the priorities for respective player cards according to the processing in the flowchart of FIG. 18. In this case, by applying the processing in steps S123 to S127 to the player cards in the number of "a" having the priority A, priorities are further set for the player cards having the priority A based on the first user's game history. Similarly, by applying the processing in steps S123 to S127 respectively to the player cards in the number of "b" having the priority B, and to the player cards in the number of "c" having the priority C, priorities are further set to the player cards having the priority B and to the player cards having the priority C respectively.

Specifically, the priority setting unit 52 first selects an arbitrary player card from among the player cards having the same priority (S123), and determines based on the first user's game history (see FIG. 21), if the subject player card is the one having a history that a reinforcement (attribute change) has been made in the game by the first user (S124). If YES in step S124, the priority setting unit 52 sets the priority of the player card to a "low priority" (the "low priority" among the player cards having the same priority based on the former criteria) (S125). On the other hand, if NO in step S124, the priority setting unit 52 sets the priority of the player card to a "high priority" (the "high priority" among the player cards having the same priority based on the former criteria) (S126).

Thereafter, it is determined if the priority setting process has been completed for all player cards owned by the user A (S127). If NO in this step S127, the priority setting unit 52 goes back to step S123, and the processing in steps S123 to S127 is repeated until the priority setting process has been completed for all player cards owned by the user A. Then, if YES in step S127, the sub routine is ended. Then, the sequence goes back to step S53 of FIG. 15.

The priority setting unit 52 may be configured such that the priority setting processing based on the first user's game history only for the player characters having the priority set based on the second user's game information of not lower than a predetermined level. Specifically, for example, the processing in steps S123 to S127 is applied only to the player cards having the priority "B" or higher, and further priorities based on the first user's game history are not set for the player cards in the number of "c" having the priority "C".

As described, the game management device according to the present embodiment comprises the game history storage control unit 513, wherein the priority setting unit 52 sets priorities to the objects owned by the first user, which can be given as gifts based on the second user's game information, and whose attributes can be changed in the game, wherein the priority setting unit has a function of setting priorities based on the first user's game information, to the objects having a same priority set based on the second user's game information such that a priority of the object having a history that the attribute thereof has been changed in the game by the first user is set lower than a priority of the object without having the history that the attribute thereof has been changed in the game by the first user. With this configuration, it is possible to appropriately set priorities in consideration of what the first user is not likely to wish to release (the object whose polarity has been changed, for example, by reinforcement).

Here, for the objects whose attributes have been changed by the reinforcement, etc., in the game, it is likely that the first user does not wish to obtain. In view of this, it may be configured to exclude such objects from the candidates. For the configuration which realizes the foregoing, the priority notification unit 53 is configured such that when sending to the terminal device 3 of the first user, the display control information (for instance, the gift selection screen data described in HTML) for displaying the player cards owned by the first user based on the respective priorities set therefor, the information on the player cards owned by the second user is not included in the display control information. With this configuration, in the terminal device of the first user, from among the player cards owned by the first user, only the player cards without having a history that the attributes thereof have been changed in the game by the first user are displayed as gift candidates. Therefore, the first user can select a gift target with ease.

By the way, between only one player card owned by the first user and a plurality of player cards owned by the first user, it is natural to assume that the first user does not wish to release the only one player card. In view of this, in the above configuration of the present embodiment, a plurality of player cards having the same priority exist as a result of setting priorities for the player cards owned by the first user, and therefore further priorities are set based on other criteria for these player cards having the same priority that the priority of only one player card owned by the first user is set lower than the priority of a plurality of player cards owned by the first user. With this configuration, it is possible to set priorities in consideration of what the first user is not likely to wish to release (only one object owned by the first user). In this configuration, not only the player cards but also other items may be adopted in the same manner.

Various criteria and conditions for setting priorities have been explained. However, it is needless to mention that priorities can be set for characters, items or the like owned by the first user based on appropriate selections and combinations of these criteria and conditions.

Other Embodiment

In the foregoing embodiment, an application example to a game system was explained where the game execution program is loaded to the game server 1 side, the game server 1 executes the arithmetic processing and data processing for advancing the game according to the input operation of the termination device 3 of each user, and the screen data reflecting the execution result is sent to the terminal device 3 in order to advance the game, but the configuration is not limited thereto. This is a so-called client server-type game system, but the configuration is not limited thereto. For example, the game management device, game management method, and program according to the present embodiment can also be applied to a game system where the game server 1 manages game information including user's owned information on items, etc., and provides users with a game service such as a gift management in a game while the game execution processing for advancing the game is basically performed on the user's terminal device side.

In other words, the present invention can also be applied to a game system where a part or all of the game execution program is downloaded or installed in the user's terminal device, and the game execution processing is also performed by the terminal device. For example, it is possible to execute peer-to-peer game, with a user terminal device being peer-to-peer connected to another user terminal device via the Internet communication, wireless LAN communication, near filed communication in use of a predetermined frequency band (e.g., frequency band of 2.4 GHz), wired LAN communication.

Thus, as the user's terminal device, applied may be, for example, in addition the foregoing portable phone terminal, smartphones, PHS terminal, portable digital assistant (PDA), personal computer and tablet-type computer terminal, a domestic video game device having a network connection function (game device configured by connecting a domestic video game machine to a domestic television), a portable game-dedicated device or the like that can be connected to the game server (game management device) via the network and receive the provision of the game service.

Regarding the configuration having the storage control function of storing various kinds of information in the memory device (the user's information storage control unit 51$a$, the level information storage control unit 51$b$, and the owned information storage control unit 511 (the owned player card storage control unit 51$c$, the owned point storage control unit 51$d$, the owned coin storage control unit 51$e$, and the owned item storage control unit 51$f$), etc.), the storage device itself is not included in the configuration, since the storage device itself is not included in the configuration, the storage device may be provided irrespective of inside or outside the game management device, the server device or the game system. For instance, the storage device can be the RAM 5 or the memory 18 of the game device 100, the RAM or the auxiliary storage device 14 of the server device, or a file server (on-line storage) or the like having other configuration from the game management device or the server device.

Moreover, the computer-readable programs according to this embodiment are recorded in various computer-readable recording mediums such as a hard disk, optical disc (CD-ROM, DVD-ROM, or the like), flexible disk, and semiconductor memory, and the programs are read from the recording medium and executed by the CPU 11 of the game server 1. Moreover, the means for providing the program to the game server 1 is not limited to the foregoing recording mediums, and the program can also be provided to the game server 1 via a communication network such as the internet.

Summary of Embodiments

1) As described above, the game management device according to one aspect of the present invention is a game management device for managing a game, which communicates with a terminal device, and which permits a user to give an object owned by the user in the game to other user, the game management device comprising: a game information storage control unit for storing in a storage device, an each user's information, the game information storage control unit including an owned object information storage control unit for storing in a storage device, an object owned by each user; a priority setting unit for setting a priority for an object owned by a first user according to a first user's gift destination selecting operation of selecting a second user as a gift destination, the priority setting unit setting the priority based on a second user's game information for recommending the object owned by the first user for a gift to the second user; and a priority notification unit for transmitting to the terminal device of the first user, an information for notifying the priority set for the object owned by the first user.

The game management device of the foregoing configuration can be configured by an information processing device such as a server. This game management device manages a game in which a user is permitted to give an object owned by the user in a game to other user, such as social games or on-line games where users become fellow players and enjoy interacting with each other.

Here, the act of "giving a gift" includes an act of giving a user's possession in a game to other user virtually, or transferring from a user's possession to other user's possession, and the gift includes a user's possession in a game virtually given from the user to the other user, or virtually transferred from the user's possession to the other user's possession. Furthermore, the virtual relationship between users who exchange gifts is not particularly limited. Examples of the relationship between users include friends, colleagues, family members, boss and follower, superior and subordinate, senior and junior, and the like. The act of "giving a gift" of the present embodiment includes the act of giving a gift performed between users of any relationship.

The game management device according to this embodiment comprises the game information storage control unit for storing in a storage device, an each user's information, and this game information storage control unit includes an owned information storage control unit for storing in a storage device, an each user's possession. Here, since the storage device itself is not included in this configuration, it can be provided anywhere within or outside the game management device. Examples of the "user's possession" include various types of objects can be obtained and owned by a user in a game, such as characters, items (equipment of characters such as treasure items, weapons, defense tools, etc., recovery items, magic items, special items, and other various items), various points, game coins and the like. A user (first user) can give an object owned by the user to the second user of gift destination as a gift by performing an operation of selecting the second user as the user of gift destination.

Here, the first user himself/herself cannot precisely grasp what are owned by the second user (gift destination). However, since the game management device manages each the user's game information, it is possible to recognize the second user's owned object, etc. Then, the priority setting unit of the game management device according to this embodiment sets a priority for an object owned by the first user according to a first user's gift destination selecting operation of selecting a second user as a gift destination, and the priority setting unit sets the priority based on a second user's game information for recommending the first user's possession for a gift to the second user. This priority is set by surmising an object desired by the second user in such a manner that the more the second user is likely to wish the object, the higher the priority of the object is. Examples of the second user's game information used for setting this priority include information on "second user's owned object". Examples of the second user's game information used for setting this priority include information on "second user's owned object". Like the configuration 2) indicated below, the priority may be set based on this game information such that among the first user's possessions, the propriety of the object which is not owned by the second user is set higher than the priority of the object which is owned by the second user. Other examples of the second user's game information include various kinds of information such as "an object desired by the second user" defined in the configuration 3) indicated below, "second user's game history" defined in the configuration 4) indicated below.

Indeed, it is not guaranteed that the recommended order based on the priorities, set by the priority setting unit, 100% agrees with the order wished by the second user (including a subjective factor). However, since the game management device manages each user's game information, it is possible to recognize what are owned by the second user, etc., in the game. Therefore, by taking into consideration the priorities set by the game management device managing the second user's game information, based on the second user's game information, it is possible to significantly increase the possibility that the first user, who cannot grasp the second user's game information, is able to give an object wished by the second user as a gift as compared to the case where the first user, who cannot grasp the second user's game information, does not take anything into consideration.

Then, the information for notifying the priority set for the first user's possession is transmitted to the first user's terminal device by the priority notification unit. Upon receiving the information transmitted by the priority notification unit, the first user's terminal device performs a display of the priority set for the object owned by the first user so that the priority can be recognized (for instance, displayed is the list of items or the like of the first user's possessions in the priority order).

As described, according to the foregoing configuration, when the first user is going to give a gift to the second user, the game management device sets the priorities to the items or the like owned by the first user for making a recommendation of a gift to the second user, and the game management device further notifies the first user of the set priorities. With this configuration, by taking the priorities set by the game management device into consideration, it is possible for the first user to determine if an item or the like owned by the first user is what the user of the gift destination is likely to wish. The foregoing processing of notifying the priorities for making a recommendation of a gift to the second user (the user of gift destination) is performed automatically by the game management device which manages the second user's game information without requiring the first user to perform complicated operations of contacting the second user and the like. Namely, according to this configuration, it is possible to provide a user with such a desirable game environment, who wishes to give a gift to another user (the user of gift destination) an item or the like of the object owned by the user, etc., that the user can recognize with ease if the item or the like is what the user of gift destination is likely to wish (or what the user of the gift destination is likely to wish).

2) In the foregoing configuration of the above 1), it is preferable that the priority setting unit sets the priority of the object owned by the first user based on a second user's owned object information of the second user's game information such that a priority of the object which is owned by the first user and which is not owned by the second user is set higher than a priority of the object which is owned by the first user and which is also owned by the second user.

According to the foregoing configuration, when setting a priority to an object including an item or the like owned by the user, based on the second user's owned object information (the second user's game information), the priority of the object not owned by the second user is given a higher priority than a priority of the object owned by the second user. The priority is set in this manner for the following reason. That is, it is more likely that the second user wishes to have the object not owned by the second user than an object already owned by the second user. As described, by making a selection of an object for a gift from objects owned by the first user, including an item or the like taking the priority thus set into consideration, it is possible to avoid such situation of giving as a gift, the same object such as an item or the like as the object already owned by the user of gift destination.

3) In the foregoing configuration, the game information storage control unit comprises a wish object storage control unit for storing an object wished by each user in a storage device based on an information on an operation of registering the object wished by each user, wherein the priority setting unit sets the priority based on the second user's wish information and the second user's owned object information of the second user's game information in an order from a highest priority of an object wished by the second user, an object not owned by the second user, and an object owned by the second user.

According to the foregoing configuration, each user can register the user's wish object (a user's wish object from characters, items or the like which can be owned by the user) by operating the terminal device. The wish object storage control unit of the game management device stores each user's wish object in a storage device based on an information on an operation of registering an object wished by each user.

Furthermore, according to the foregoing configuration, priorities are set for items or the like owned by the first user, in the following manner. That is, based on the second user's wish object information and the second user's owned object information of the second user's game information, the priorities are set in the order from the highest priority of a second user's wish object, an object not owned by the second user, and an object owned by the second user. The priorities are set based on the above criteria for the following reason. That is, since the second user's wish object is an object which is clearly indicated by the second user beforehand as a wish object, the possibility of the object actually being wished by the second user is extremely high as compared with other objects. Therefore, it is desirable to set the highest priority to the second user's wish object. Furthermore, the reason why the priority of the object not owned by the second user is set higher than the priority of the object owned by the second user for the reason explained for the above configuration 2).

As described, by setting a priority for an object registered in a wish list by the user of gift destination among objects owned by the first user higher than a priority of any other object owned by the first user, it is possible to accurately reflect in the priority, the possibility of the object being wished by the user of gift destination.

4) In the foregoing configuration, it is preferable that the game information storage control unit includes a game history storage control unit for storing each user's game history in a storage device, wherein the priority setting unit sets the priority for an object not owned by the second user among objects owned by the first user based on a second user's game history of the second user's game information such that a priority of an object used in the game by the second user in a past is higher than a priority of an object not used in the game by the second user in the past.

According to the foregoing configuration, the game history storage control unit stores each user's game history in the storage device. Here, examples of the user's game history includes an information on characters or the like obtained in a game, an information on characters or the like used in the game, and an information on characters or the like released from the user's possession as a result of being used in the game.

According to the foregoing configuration, in the case where a plurality of objects not owned by the second user exist among objects owned by the first user, priorities are set for these objects respectively in the following manner. Namely, based on the second user's game history (the second user's game information), the priority of the object obtained and used in the game by the second user in the past is set higher than the priority of the object not used in the game by the second user in the past for the following reason.

Namely, it can be assumed that the second user wishes to use again an object such as a character, an item or the like obtained and used in the game by the second user in the past but is not currently owned by the second user. On the other hand, for the object not ever used in the game in the past by the second user (for instance, an object not ever obtained in the past), it is unclear if the second user wishes to have it. Therefore, it is more likely that the second user is pleased with the former object (with higher possibility) than the latter object when the second user receives it as a gift. Therefore, the priority of the former object is set higher than the priority of the latter object.

As described, among the objects owned by the first user, by setting the priority of the object obtained and used in the game by the user of gift destination in the past is set higher than the priority of the object not used in the game by the user of gift destination in the past, it is possible to accurately reflect in the priorities, the possibility of the object being wished by the user of gift destination.

5) It is preferable that the foregoing configuration further comprises a reinforcing unit which executes a reinforcing processing according to an information on a reinforcing operation performed by specifying a target object for reinforcement and a reinforcing member for reinforcing the target object, the target object and the reinforcing member being specified from among the objects owned by the user, the reinforcing processing being performed to improve an ability of the target object based on an ability of the reinforcing member, and to delete the reinforcing member from the objects owned by the user, wherein the priority setting unit sets priorities of objects not owned by the second user among the objects owned by the first user respectively, based on the second user's game history of the second user's game information in an order from a highest priority of an object obtained in the past and used as the reinforcing member in the game by the second user, an object not ever obtained in the past, and an object obtained in the past by the second user but released without being used in the game.

According to the foregoing configuration, the user can perform a reinforcing operation by specifying a target object for reinforcement and a reinforcing member for reinforcing the target object from among the objects including characters, items or the like owned by the user. The reinforcing processing is performed to improve an ability of the target object based on an ability of the reinforcing member, and to delete the reinforcing member from the objects owned by the user. When the foregoing reinforcing processing is performed, the game history storage control unit stores the information on the reinforcing member used for reinforcement as a user's game history in a storage device.

Furthermore, according to the foregoing configuration, in the case where a plurality of objects not owned by the second user exist among the objects owned by the first user, the priorities are set for these objects in the following manner. That is, based on the second user's game history (the second user's game information), the priorities are set in the order from the highest priority of "an object obtained in the past and used as the reinforcing member in the game by the second user", "an object not ever obtained in the past", and "an object obtained in the past by the second user" and released without being used as the reinforcing member. The priorities are set based on the above criteria for the following reason.

That is, for the object such as a character, an item or the like obtained in the past and not currently owned as being used as the reinforcing member in the game by the second user, it is very likely that the second user actually wishes to use the object again for the reinforcing member. On the other hand, for the object not ever obtained by the second user in the past, it is uncertain if the user wishes to have such object. On the other hand, the "object obtained in the past by the second user but released without being used as the reinforcing member in the game" can be assumed to be an unnecessary object for the second user. Therefore, in consideration of the possibility of being wished by the user of gift destination, the priorities are set in the above order from the highest priority.

As described, by setting the priorities for characters or the like based on the game history indicating if each character or the like was used as a reinforcing member in the past, it is possible to accurately reflect in the priorities, the possibility of the object being wished by the user of gift destination.

6) In the foregoing configuration, it is preferable that the objects which can be owned in the game by each user include an object to which a rarity level indicative of a level of rarity of the object is set, and the priority setting unit sets the priority to the object not owned by the second user among the objects owned by the first user such that the higher is the rarity level, the higher is the priority.

According to the foregoing configuration, the objects such as characters or the like which can be owned in the game by each user includes an object to which a rarity level indicative of a level of rarity is set. In general, it can be assumed that the higher the rarity level of an object, the more it is likely that each user wishes to obtain the object. In view of this, according to the foregoing embodiment, in the case where a plurality of objects not owned by the second user exist among the objects owned by the first user, the priorities are set such that the higher is the rarity level, the higher is the priority. As a result, it is possible to accurately reflect in the priority, the possibility of the object being wished by the user of gift destination.

7) In the foregoing configuration, it is preferable that when a display control information, for displaying the object owned by the first user based on the priority, is sent to a terminal device of the first user, the priority notification unit does not include the second user's owned object information in the display control information.

According to the foregoing configuration, in the case of performing an operation of selecting the second user as the operation of selecting a user of gift destination, the priorities are set for the object owned by the first user by the priority setting unit. Then, the display control information (for instance, an information of displaying a list arranged in the order from the highest priority) for displaying the objects owned by the user (candidate gifts) based on the priorities is sent to the terminal device of the first user. Here, the information on the object owned by the second user is not included in the display control information. With this configuration, of the objects owned by the first user, only the objects not owned by the second user are displayed for candidate gifts in the terminal device of the first user. As a result, it is possible to avoid such situation of giving as a gift, the same object such as an item or the like as the object already owned by the second user.

8) In the foregoing configuration, it is preferable that the game information storage control unit includes a game history storage control unit for storing each user's game history in a storage device, wherein the priority setting unit sets priorities to the objects owned by the first user, which can be given as gifts based on the second user's game information, and whose attributes can be changed in the game, wherein the priority setting unit has a function of setting priorities based on the first user's game history, to the objects having a same priority set based on the second user's game information such that a priority of the object having a history that the attribute thereof has been changed in the game by the first user to be lower than a priority of the object without having the history that the attribute thereof has been changed in the game by the first user.

According to the foregoing configuration, the priority setting unit sets priorities to objects which can be given as gifts and which are owned by the first user and whose attributes can be changed in the game (attribute variable objects). Here, examples of the objects which can be given as gifts "whose attributes can be changed in the game" include a character whose attribute can be changed (improved) by reinforcing or training; an item for adding a special ability to a character equipped with the item (for instance, a baseball glove, baseball spikes in a baseball game), which is capable of changing the attribute of the special ability by virtually using or maintaining it in the game; in games of growing plants, characters of plants whose attributes of leaves, flower, and numbers or sizes of nuts correspond to the above objects; in games of growing characters imitating animals, human being, characters whose attributes such as the size (height, weight), ages, etc., can be changed; in cooking games, items of dishes, which can change the attribute of taste (sweet taste, hot taste, etc.). These are merely examples, and other attribute variable objects such as characters, items or the like whose attributes can be changed in the game would fall under the objects which can be given as gifts (targets objects for which priorities are set).

According to the foregoing configuration, the game history storage control unit stores each user's game history in the storage device. Here, examples of user's game history include information indicative of that an attribute of the object owned by the user has been changed in the game (i.e., reinforcing, training, or the like).

Then, in the case where a plurality of objects having the same priority exist as a result of setting the priorities based on the second user's game information for the objects owned by the first user, which can be given for gifts, the priority setting unit of the foregoing configuration has a function of setting priorities based on the first user's game information for the objects having the same priority set based on the second user's game information such that the priority of the object having a history that the attribute thereof has been changed in the game by the first user is lower than the priority of the object without having the history that the attribute thereof has been changed in the game by the first user. The priorities are set in this manner for the following reason.

Namely, it is likely that the first user is going to use a character, etc., whose attribute has been changed in the game by the first user (namely, it is likely that the user wishes to keep such character). In comparison, it is less likely that the first user is going to use a character, etc., whose attribute has been changed in the game by the first user. Therefore, the priority of the former character or the like is set lower than the priority of the latter character or the like. As a result, it is possible to set the priorities appropriately in consideration of the objects which the first user does not wish to release.

9) A game system according to another aspect of the present invention is a game system which includes a game management device for managing a game, which permits a user to give an object owned by the user in a game to other user, and a terminal device for communicating with the game management device, wherein either the game management device or the terminal device comprises: a game information storage control unit for storing in a storage device, an each user's information, the game information storage control unit including an owned object information storage control unit for storing in a storage device, an object owned by each user; a priority setting unit for setting a priority for an object owned by a first user according to a first user's gift destination selecting operation of selecting a second user as a gift destination, the priority setting unit setting the priority based on a second user's game information for recommending the object owned by the first user for a gift to the second user; and a priority notification unit for transmitting to the terminal device of the first user, an information for notifying the priority set for the object owned by the first user.

10) A recording medium according to yet another aspect of the present invention is a non-transitory computer-readable recording medium having recorded thereon a program for causing a computer to operate as the game management device according to any one of the foregoing configurations.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A game management device for managing a game, which communicates with a terminal device, and which permits a user to give an object owned by the user in the game to other user, the game management device comprising:
  a game information storage control unit for storing in a storage device, game information of each user, the game information storage control unit including an owned object information storage control unit for storing in a storage device, an object owned by the each user;
  a priority setting unit for setting a priority for an object owned by a first user according to a first user's gift destination selecting operation of selecting a second user as a gift destination, the priority setting unit identifying an owned object already owned by the second user based on the object owned by the each user stored in the storage device, comparing the owned object already owned by the second user with the object owned by the first user to identify, among the object owned by the first user, a first object which is already owned by the second user and a second object which is not owned by the second user, the priority setting unit setting the priority based on the game information of the second user stored in the storage device including the object stored in the storage device for recommending the object owned by the first user for a gift to the second user without contacting the second user based on the identified first object and identified second object; and
  a priority notification unit for transmitting to the terminal device of the first user, an information for notifying the priority set for the object owned by the first user.

2. The game management device according to claim 1, wherein:
  the priority setting unit sets the priority of the object owned by the first user based on a second user's owned object information of the second user's game information such that a priority of the object which is owned by the first user and which is not owned by the second user is set higher than a priority of the object which is owned by the first user and which is also owned by the second user.

3. The game management device according to claim 2, wherein:
  the game information storage control unit comprises a wish object storage control unit for storing an object wished by each user in a storage device based on an information on an operation of registering the object wished by each user, wherein the priority setting unit sets the priority based on the second user's wish information and the second user's owned object information of the second user's game information in an order from a highest priority of an object wished by the second user, an object not owned by the second user, and an object owned by the second user.

4. The game management device according to claim 2, wherein:
  the game information storage control unit includes a game history storage control unit for storing each user's game history in a storage device, wherein the priority setting unit sets the priority for an object not owned by the second user among objects owned by the first user based on a second user's game history of the second user's game information such that a priority of an object used in the game by the second user in a past is higher than a priority of an object not used in the game by the second user in the past.

5. The game management device according to claim 4, further comprising:
  a reinforcing unit which executes a reinforcing processing according to an information on a reinforcing operation performed by specifying a target object for reinforcement and a reinforcing member for reinforcing the target object, the target object and the reinforcing member being specified from among the objects owned by the user, the reinforcing processing being performed to improve an ability of the target object based on an ability of the reinforcing member, and to delete the reinforcing member from the objects owned by the user,
  wherein the priority setting unit sets priorities of objects not owned by the second user among the objects owned by the first user respectively, based on the second user's game history of the second user's game information in an order from a highest priority of an object obtained in the past and used as the reinforcing member in the game by the second user, an object not ever obtained in the past, and an object obtained in the past by the second user but released without being used in the game.

6. The game management device according to claim 2, wherein:
  the objects which can be owned in the game by each user include an object to which a rarity level indicative of a level of rarity of the object is set, and the priority setting unit sets the priority to the object not owned by the second user among the objects owned by the first user such that the higher is the rarity level, the higher the priority is.

7. The game management device according to claim 2, wherein:
when a display control information, for displaying the object owned by the first user based on the priority, is sent to the terminal device of the first user, the priority notification unit does not include the second user's owned object information in the display control information.

8. The game management device according to claim 2, wherein:
the game information storage control unit includes a game history storage control unit for storing each user's game history in a storage device, wherein the priority setting unit sets priorities to the objects owned by the first user, which can be given as gifts based on the second user's game information, and whose attributes can be changed in the game,
wherein the priority setting unit has a function of setting priorities based on the first user's game history, to the objects having a same priority set based on the second user's game information such that a priority of the object having a history that the attribute thereof has been changed in the game by the first user to be lower than a priority of the object without having the history that the attribute thereof has been changed in the game by the first user.

9. A game system comprising a game management device for managing a game, which permits a user to give an object owned by the user in a game to other user; and a terminal device for communicating with the game management device, wherein either the game management device or the terminal device comprises:
a game information storage control unit for storing in a storage device, game information of each user, the game information storage control unit including an owned object information storage control unit for storing in a storage device, an object owned by the each user;
a priority setting unit for setting a priority for an object owned by a first user according to a first user's gift destination selecting operation of selecting a second user as a gift destination, the priority setting unit identifying an owned object already owned by the second user based on the object owned by the each user stored in the storage device, comparing the owned object already owned by the second user with the object owned by the first user to identify, among the object owned by the first user, a first object which is already owned by the second user and a second object which is not owned by the second user, the priority setting unit setting the priority based on the game information of the second user stored in the storage device including the object stored in the storage device for recommending the object owned by the first user for a gift to the second user without contacting the second user based on the identified first object and identified second object; and
a priority notification unit for transmitting to the terminal device of the first user, an information for notifying the priority set for the object owned by the first user.

10. A non-transitory computer-readable recording medium having recorded thereon a program for causing a computer to operate as a game management device for managing a game, which communicates with a terminal device, and which permits a user to give an object owned by the user in the game to other user, the game management device comprising:
a game information storage control unit for storing in a storage device, game information of each user, the game information storage control unit including an owned object information storage control unit for storing in a storage device, an object owned by the each user;
a priority setting unit for setting a priority for an object owned by a first user according to a first user's gift destination selecting operation of selecting a second user as a gift destination, the priority setting unit identifying an owned object already owned by the second user based on the object owned by the each user stored in the storage device, comparing the owned object already owned by the second user with the object owned by the first user to identify, among the object owned by the first user, a first object which is already owned by the second user and a second object which is not owned by the second user, the priority setting unit setting the priority based on the game information of the second user stored in the storage device including the object stored in the storage device for recommending the object owned by the first user for a gift to the second user without contacting the second user based on the identified first object and identified second object; and
a priority notification unit for transmitting to the terminal device of the first user, an information for notifying the priority set for the object owned by the first user.

* * * * *